(12) United States Patent
Tateyama et al.

(10) Patent No.: US 7,062,579 B2
(45) Date of Patent: Jun. 13, 2006

(54) DATA TRANSMISSION APPARATUS, SYSTEM AND METHOD, AND IMAGE PROCESSING APPARATUS

(75) Inventors: Jiro Tateyama, Yokohama (JP); Naohisa Suzuki, Yokohama (JP); Koji Fukunaga, Tokyo (JP); Kiyoshi Katano, Chiba (JP); Atsushi Nakamura, Kawasaki (JP); Makoto Kobayashi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 91 days.

(21) Appl. No.: 09/025,129

(22) Filed: Feb. 17, 1998

(65) Prior Publication Data
US 2003/0158979 A1    Aug. 21, 2003

(30) Foreign Application Priority Data

| Feb. 14, 1997 | (JP) | 9-030982 |
| Apr. 10, 1997 | (JP) | 9-092302 |
| May 16, 1997 | (JP) | 9-127631 |
| May 16, 1997 | (JP) | 9-127698 |

(51) Int. Cl.
  *G06F 13/00*   (2006.01)
(52) U.S. Cl. .................... 710/104; 710/11
(58) Field of Classification Search .......... 710/100, 710/104, 305, 29, 30, 10, 105, 8; 713/1, 100; 370/231, 232, 233, 234; 709/233
See application file for complete search history.

(56) References Cited

U.S. PATENT DOCUMENTS

| 4,635,132 A | * | 1/1987 | Nakamura | .......... 358/296 |
| 4,648,061 A | | 3/1987 | Foster | |
| 4,759,017 A | * | 7/1988 | Allan et al. | .......... 370/438 |
| 4,959,833 A | | 9/1990 | Mercola et al. | .......... 371/32 |
| 5,012,470 A | | 4/1991 | Shobu et al. | |

(Continued)

FOREIGN PATENT DOCUMENTS

| EP | 0191177 | 8/1986 |
| EP | 0 051 585 B1 | 11/1987 |
| EP | 0 317 466 | 5/1989 |
| EP | 0364866 | 4/1990 |

(Continued)

OTHER PUBLICATIONS

Compcon '95 Paper, IEEE 1394: A Ubiquitos Bus, Hoffman and Moore, Mar. 5–9, 1995.*

Teener, M., "A Bus on a Diet—The Serial Bus Alternative An Introduction to the P1394 High Performance Serial Bus", Intellectual Leverage, San Francisco, Feb. 24–28, 1992, No. Conf. 37, Feb. 24, 1992, pp. 316–321.

*Primary Examiner*—Paul R. Myers
(74) *Attorney, Agent, or Firm*—Fitzpatrick, Cella, Harper & Scinto

(57) ABSTRACT

In a system where a digital still camera 1101 is connected to a printer 1102 on a 1394 serial bus, when the digital still camera 1101 as a data transfer originator node transfers image data to the printer 1102 as a data transfer destination node, the printer 1102 sends information on the data processing capability of the printer 1102 to the digital still camera 1101 prior to data transfer. The digital still camera 1101 determines the block size of image data to be transferred in accordance with the data processing capability of the printer 1102, and sends image data of the block size to the printer 1102. The information indicates the capacity of a memory of the printer for storing print data, or the printing capability of a printer engine, i.e., printing resolution, printing speed and the like. Thus, data transfer is always efficiently performed regardless of the data processing capability of the printer 1102.

67 Claims, 66 Drawing Sheets

U.S. PATENT DOCUMENTS

| | | | |
|---|---|---|---|
| 5,136,716 A | 8/1992 | Harvey et al. ............... 395/800 |
| 5,142,528 A | 8/1992 | Kobayashi et al. |
| 5,263,025 A * | 11/1993 | Torii et al. .................. 370/468 |
| 5,303,336 A | 4/1994 | Kageyama et al. ......... 394/114 |
| 5,349,649 A | 9/1994 | Iijima ........................ 395/275 |
| 5,386,512 A * | 1/1995 | Crisman et al. ............ 709/228 |
| 5,432,775 A | 7/1995 | Crayford ...................... 370/10 |
| 5,452,420 A | 9/1995 | Engdahl et al. ............. 395/285 |
| 5,473,691 A * | 12/1995 | Menezes et al. .............. 380/25 |
| 5,483,656 A | 1/1996 | Oprescu et al. ............. 395/750 |
| 5,504,757 A | 4/1996 | Cook et al. .................... 370/84 |
| 5,507,003 A | 4/1996 | Pipkins ...................... 395/851 |
| 5,535,334 A | 7/1996 | Merkley et al. ........ 395/200.15 |
| 5,550,957 A | 8/1996 | Davidson, Jr. et al. ...... 395/114 |
| 5,559,967 A | 9/1996 | Oprescu et al. ............. 395/285 |
| 5,581,708 A | 12/1996 | Iijima .................... 395/200.14 |
| 5,586,117 A | 12/1996 | Edem et al. |
| 5,634,074 A | 5/1997 | Devon et al. ................ 395/828 |
| 5,638,333 A | 6/1997 | Davidson, Jr. et al. ...... 395/114 |
| 5,689,244 A | 11/1997 | Iijima et al. ............ 350/825.07 |
| 5,696,606 A | 12/1997 | Sakayama et al. .......... 358/468 |
| 5,748,915 A | 5/1998 | Iijima ........................ 395/285 |
| 5,751,975 A | 5/1998 | Gillespie et al. ............. 395/306 |
| 5,790,648 A * | 8/1998 | Bailis et al. ................. 379/201 |
| 5,799,171 A | 8/1998 | Kondou ....................... 395/500 |
| 5,828,855 A | 10/1998 | Walker ........................ 395/309 |
| 5,847,836 A * | 12/1998 | Suzuki ........................ 358/296 |
| 5,905,906 A | 5/1999 | Goffinet et al. ............. 395/828 |
| 5,930,264 A | 7/1999 | Nguyen ....................... 370/466 |
| 5,933,430 A * | 8/1999 | Osakabe et al. ............. 370/395 |
| 6,018,816 A | 1/2000 | Tateyama .................... 714/746 |
| 6,044,107 A * | 3/2000 | Gatherer et al. ............. 375/222 |
| 6,061,149 A | 5/2000 | Hosokawa et al. .......... 358/442 |
| 6,125,122 A | 9/2000 | Favichia et al. ............. 370/466 |
| 6,128,316 A | 10/2000 | Takeda et al. ............... 370/468 |
| 6,266,346 B1 | 7/2001 | Takeda et al. ............... 370/468 |
| 6,334,161 B1 | 12/2001 | Suzuki et al. ................. 710/29 |
| 6,425,019 B1 | 7/2002 | Tateyama et al. .............. 710/11 |
| 6,445,716 B1 | 9/2002 | Favichia et al. ............. 370/446 |
| 6,559,962 B1 | 5/2003 | Fukunaga et al. ......... 358/1.15 |
| 6,567,421 B1 | 5/2003 | Takeda et al. ............... 370/468 |
| 6,577,646 B1 | 6/2003 | Takeda et al. ............... 370/468 |
| 6,587,477 B1 | 7/2003 | Takeda et al. ............... 370/468 |
| 2002/0054606 A1 | 5/2002 | Takeda et al. ............... 370/468 |
| 2002/0057714 A1 | 5/2002 | Takeda et al. ............... 370/468 |
| 2002/0064180 A1 | 5/2002 | Takeda et al. ............... 370/468 |

FOREIGN PATENT DOCUMENTS

| | | |
|---|---|---|
| EP | 0 431 949 | 6/1991 |
| EP | 0 588 744 A1 | 3/1994 |
| EP | 0 589 499 | 3/1994 |
| EP | 0 596 648 A1 | 3/1994 |
| EP | 0 596 648 | 5/1994 |
| EP | 0 260 085 B1 | 6/1994 |
| EP | 0613274 | 8/1994 |
| EP | 0652668 | 5/1995 |
| EP | 0681387 | 11/1995 |
| EP | 0 682 430 | 11/1995 |
| EP | 0 689 296 | 12/1995 |
| EP | 0 689 296 A2 | 12/1995 |
| EP | 0 889 298 A2 | 12/1995 |
| EP | 0 889 298 A3 | 12/1995 |
| EP | 0705023 | 4/1996 |
| EP | 0 739 112 | 10/1996 |
| EP | 0 749 071 | 12/1996 |
| EP | 0 762 684 | 3/1997 |
| EP | 0 803 803 | 10/1997 |
| EP | 0822510 | 2/1998 |
| EP | 0 679 014 B1 | 7/2000 |
| EP | 0 800 299 B1 | 8/2003 |
| GB | 2 288 954 A | 11/1995 |
| JP | 60-062260 | 4/1985 |
| JP | 61-205070 | 9/1986 |
| JP | 62-145450 | 6/1987 |
| JP | 63-023444 | 1/1988 |
| JP | 4-052844 | 2/1992 |
| JP | 4-227524 | 8/1992 |
| JP | 4-273320 | 9/1992 |
| JP | 5-276344 | 10/1993 |
| JP | 6-197133 | 7/1994 |
| JP | 6-216970 | 8/1994 |
| JP | 06-225103 | 8/1994 |
| JP | 6-303285 | 10/1994 |
| JP | 7-036807 | 2/1995 |
| JP | 7-046294 | 2/1995 |
| JP | 07-240831 | 9/1995 |
| JP | 07-306760 | 11/1995 |
| JP | 8-70486 | 3/1996 |
| JP | 08-125714 | 5/1996 |
| JP | 08-242357 | 9/1996 |
| JP | 08-267828 | 10/1996 |
| JP | 08-336163 | 12/1996 |
| JP | 8-340338 | 12/1996 |
| JP | 9-026860 | 1/1997 |
| JP | 09-081334 | 3/1997 |
| JP | 09-083774 | 3/1997 |
| JP | 10-051610 | 2/1998 |
| JP | 10-108113 | 4/1998 |
| WO | WO 87/01484 | 3/1987 |
| WO | WO94/16387 | 7/1994 |
| WO | WO 94/16389 | 7/1994 |
| WO | WO 95/10912 | 4/1995 |
| WO | WO 95/30960 | 11/1995 |
| WO | WP95/31054 | 11/1995 |
| WO | WO96/1377 | 5/1996 |
| WO | WO 96/13776 | 5/1996 |

OTHER PUBLICATIONS

Anonymous, "Hardware Control of Isochronous Data Transfer between P1394 and PCI Busses", IBM Technical Disclosure Bulletin, vol. 38, No. 5, May 1995, pp. 83–88.

Nass, R., "Firewire Interface Connects PCS to Consumer Electronics Device", Electronic Design, vol.44, No. 16, Aug. 5, 1996, pp. 57, 58, and 60.

Pat.Abs.Jp., vol.097, No.003, Mar. 31, 1997 (JP 08 298612 A).

"A Byte about Bi–Directional Parallel Protocol", A Review of the IEEE–1284 Standard, Dec. 9, 1994, pp. 1–2.

R. Nass, "Firewire Interface Connects PCs To Consumer Electronics Devices", Electronic D sign, vol. 44, No. 16, Aug. 5, 1996, pp. 57–60.

* cited by examiner

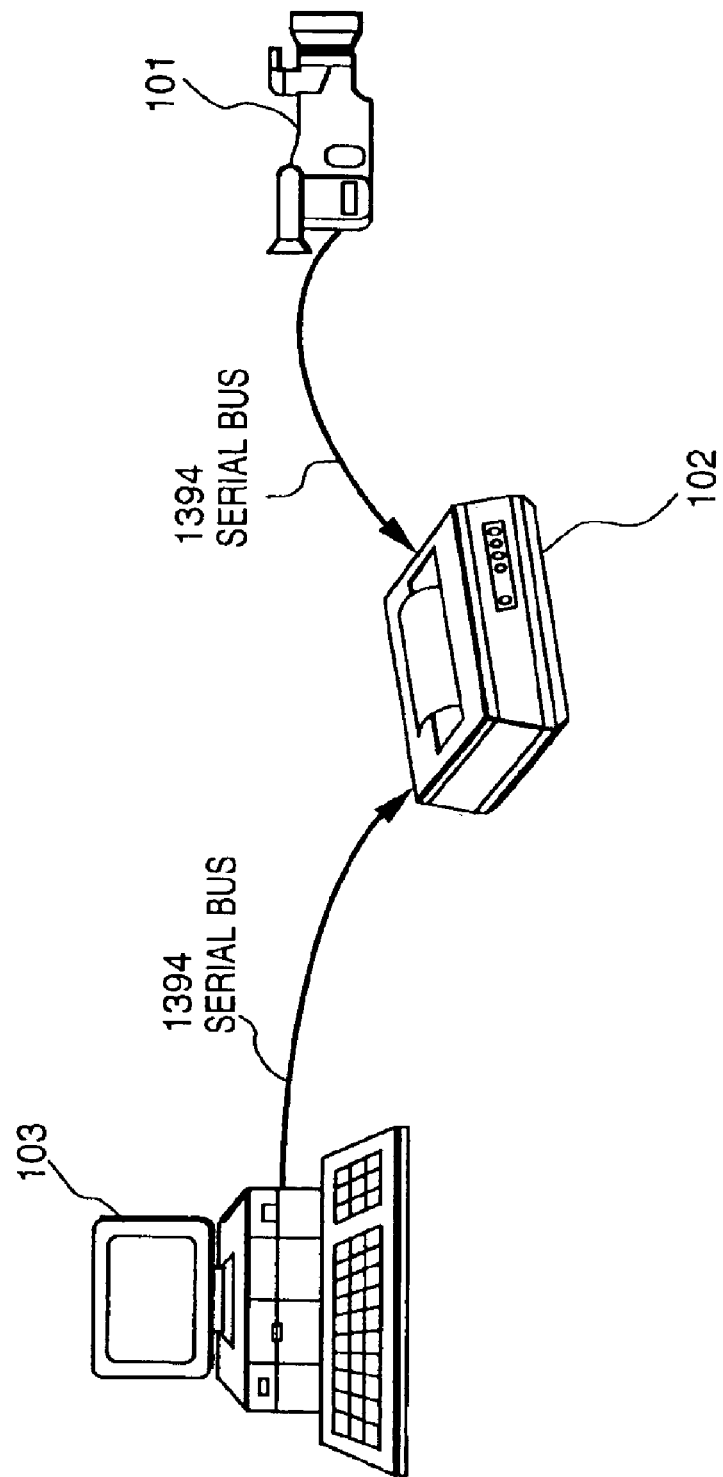

CLOCK : EXCLUSIVE-OR SIGNAL BETWEEN DATA AND STROBE

BRANCH : NODE WITH TWO OR MORE NODE CONNECTIONS

LEAF : NODE WITH SINGLE PORT CONNECTION

□ : PORT
c : PORT CORRESPONDING TO CHILD NODE
p : PORT CORRESPONDING TO PARENT NODE

FIG. 15B

| ABBREVIATION | NAME | CONTENT |
|---|---|---|
| destination_ID | destination identifier | ID OF DESTINATION NODE (ASYNCHRONOUS ONLY) |
| tl | transaction label | LABEL INDICATING A SERIES OF TRANSACTIONS (ASYNCHRONOUS ONLY) |
| rt | retry code | CODE INDICATING RETRANSMISSION STATUS (ASYNCHRONOUS ONLY) |
| tcode | transaction code | CODE INDICATING PACKET TYPE (ASYNCHRONOUS ONLY) |
| pri | priority | PRIORITY ORDER (ASYNCHRONOUS ONLY) |
| source_ID | source identifier | SOURCE NODE (ASYNCHRONOUS ONLY) |
| destination_offset | destination memory address | MEMORY ADDRESS OF DESTINATION NODE (ASYNCHRONOUS ONLY) |
| rcode | response code | RESPONSE STATUS (ASYNCHRONOUS ONLY) |
| quadlet_data | quadlet(4bytes) data | 4-BYTE LENGTH DATA (ASYNCHRONOUS ONLY) |
| data_length | length of data | LENGTH OF data_field (EXCEPT pad bytes) |
| extended_tcode | extended transaction code | EXTENDED TRANSACTION CODE (ASYNCHRONOUS ONLY) |
| chanel | isochronous identifier | IDENTIFICATION OF ISOCHRONOUS PACKET |
| sy | synchronization code | SYNCHRONIZATION OF VIDEO IMAGE AND AUDIO INFORMATION |
| cycle_time_data | contents of the CYCLE_TIME register | CYCLE TIMER REGISTER VALUE OF CYCLE MASTER NODE (CYCLE PACKET ONLY) |
| data_field | data + pad bytes | DATA STORAGE (ISOCHRONOUS AND ASYNCHRONOUS) |
| header_CRC | CRC for header field | CRC FOR HEADER |
| data_CRC | CRC for data field | CRC FOR DATA |
| tag | tag label | ISOCHRONOUS PACKET FORMAT |

FIG. 26A

CSR CORE REGISTER

| OFFSET (hexadecimal) | REGISTER NAME | FUNCTION |
|---|---|---|
| 000 | STATE_CLEAR | INFORMATION ON STATUS AND CONTROL |
| 004 | STATE_SET | INFORMATION ON WRITE ENABLE/DISABLE STATUS OF STATE_CLEAR |
| 008 | NODE_IDS | BUS ID + NODE ID |
| 00C | RESET_START | TO RESET BUS BY WRITING INTO THIS AREA |
| 010~014 | INDIRECT_ADDRESS, INDIRECT_DATA | REGISTER TO ACCESS ROM AREA GREATER THAN 1KB |
| 018~01C | SPLIT_TIMEOUT | TIMER VALUE TO DETECT TIME-OUT OF SPLIT TRANSACTION |
| 020~02C | ARGUMENT, TEST_START, TEST_STATUS | REGISTER FOR DIAGNOSIS |
| 030~04C | UNITS_BASE, UNITS_BOUND, MEMORY_BASE, MEMORY_BOUND | NOT INSTALLED IN IEEE 1394 |
| 050~054 | INTERRUPT_TARGET, INTERRUPT_MASK | REGISTER OF INTERRUPTION NOTIFICATION |
| 058~07C | CLOCK_VALUE, CLOCK_TICK_PERIOD, CLOCK_STOROBE_ARRIVED, CLOCK_INFO | NOT INSTALLED IN IEEE 1394 |
| 080~0FC | MESSAGE_REQUEST, MESSAGE_RESPONSE | REGISTER FOR MESSAGE NOTIFICATION |
| 100~17C | | RESERVATION |
| 180~1FC | ERROR_LOG_BUFFER | TO RESERVE FOR IEEE 1394 |

FIG. 26B
SERIAL BUS REGISTER

| OFFSET (hexadecimal) | REGISTER NAME | FUNCTION |
|---|---|---|
| 200 | CYCLE_TIME | COUNTER FOR ISOCHRONOUS TRANSFER |
| 204 | BUS_TIME | REGISTER FOR TIME SYNCHRONIZATION |
| 208 | POWER_FAIL_IMMINENT | REGISTER RELATING TO POWER SUPPLY |
| 20C | POWER_SOURCE | |
| 210 | BUSY_TIMEOUT | TO CONTROL RETRY IN TRANSACTION LAYER |
| 214~218 | | RESERVATION |
| 21C | BUS_MANAGER_ID | NODE ID OF BUS MANAGER |
| 220 | BANDWIDTH_AVAILABLE | TO MANAGE ISOCHRONOUS TRANSFER BAND |
| 224~228 | CHANNELS_AVAILABLE | TO MANAGE CHANNEL NUMBER FOR ISOCHRONOUS TRANSFER |
| 22C | MAINT_CONTROL | REGISTER FOR DIAGNOSIS |
| 230 | MAINT_UTILITY | |
| 234~3FC | | RESERVATION |

FIG. 26C

SERIAL-BUS NODE RESOURCE REGISTER

| OFFSET (hexadecimal) | REGISTER NAME | FUNCTION |
|---|---|---|
| 800~FFC | | RESERVATION |
| 1000~13FC | TOPOLOGY-MAP | INFORMATION ON SERIAL BUS STRUCTURE |
| 1400~1FFC | | RESERVATION |
| 2000~2FFC | SPEED-MAP | INFORMATION ON TRANSFER SPEED OF SERIAL BUS |
| 3000~FFFC | | RESERVATION |

FIG. 26D

MINIMUM FORMAT CONFIGURATION ROM

| 01 | VENDOR ID |
|---|---|

FIG. 26E

GENERAL FORMAT CONFIGURATION ROM

| LENGTH OF bus_info_block | LENGTH OF ROM | CRC |
|---|---|---|
| bus_info_block (ASCII CODE OF 1394 BUS AND INFORMATION ON WHETHER OR NOT NODE HAS CAPABILITIES OF ISOCHRONOUS RESOURCE MANAGEMENT, CYCLE MASTER, AND BUS MANAGEMENT) | | |
| root_directory (INDICATE VENDOR ID AND NODE FUNCTION) | | |
| unit_directories (INDICATE UNIT TYPE AND DRIVER SOFT VERSION) | | |
| root & unit_leaves | | |
| vendor_dependent_information | | |

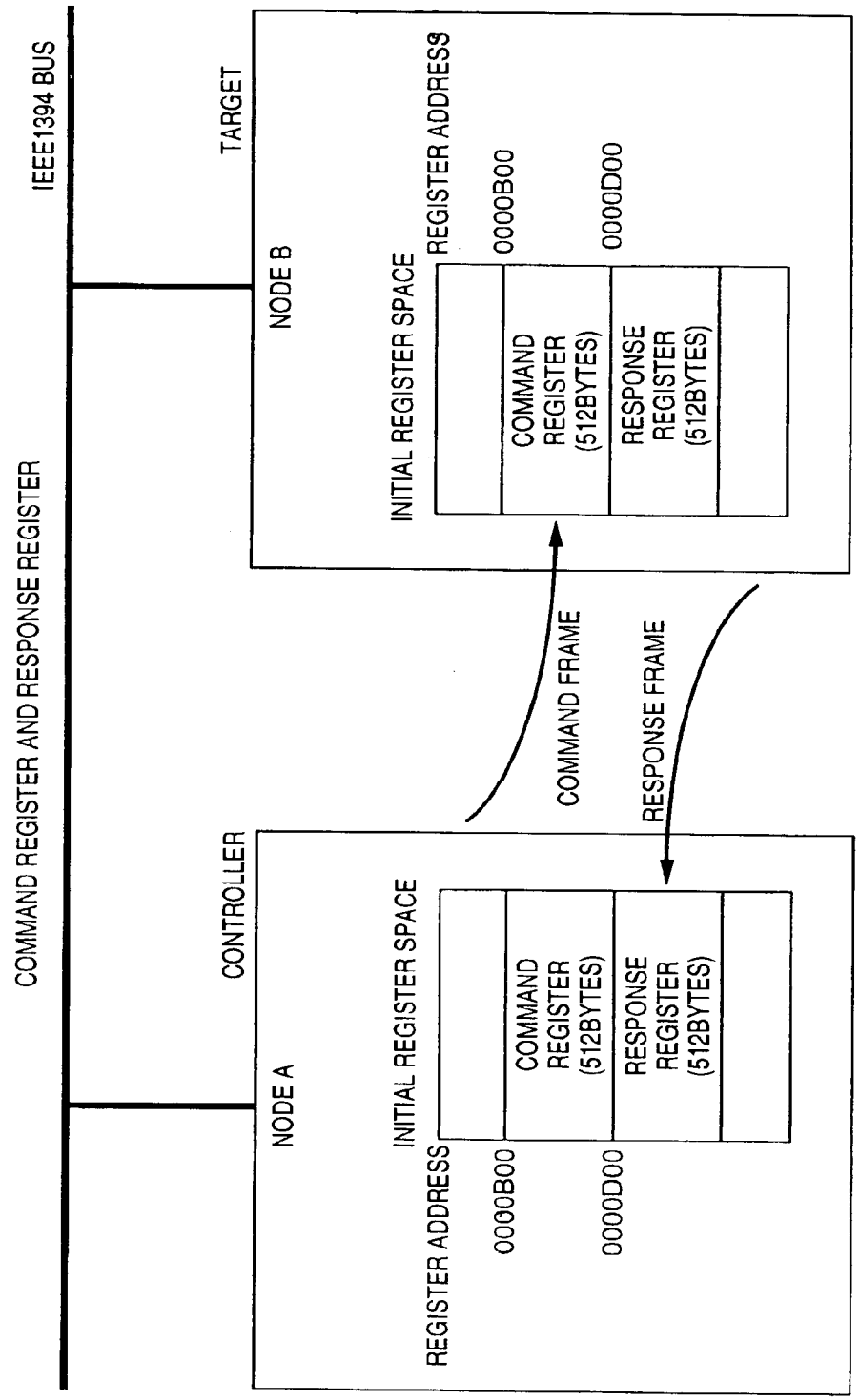

AV/C COMMAND FRAME

AV/C RESPONSE FRAME

FIG. 33

FFFFF0000B00

COMMAND REGISTER (512 BYTES) — 42-1

FFFFF0000D00

RESPONSE REGISTER (512 BYTES) — 42-2

FFFFF0003000

DATA REGISTER — 42-3

FORMAT REGISTER ADDRESS

FORMAT REGISTER — 42-4

FIG. 41

| COMMAND CLASSIFICATION | COMMAND | RESPONSE | |
|---|---|---|---|
| STATUS | GetStatus | GetStatusResponse | 50-1 |
| CONTROL | PrintReset | Print ResetResponse | 50-2 |
| | PrintStart | PrintStartResponse | 50-3 |
| | PrintStop | PrintStopResponse | 50-4 |
| | InsertPaper | InsertPaperResponse | 50-5 |
| | EjectPaper | EjectPaperResponse | 50-6 |
| | CopyStart | CopyStartResponse | 50-7 |
| | CopyEnd | CopyEndResponse | 50-8 |
| BLOCK / BUFFER | BlockSize | BlockSizeResponse | 50-9 |
| | BlockAddress | BlockAddressResponse | 50-10 |
| | FreeBlock | FreeBlockResponse | 50-11 |
| | WriteBlocks | WriteBlocksResponse | 50-12 |
| | BufferConfig | BufferConfigResponse | 50-13 |
| | SetBuffer | SetBufferResponse | 50-14 |
| CHANNEL | OpenChannel | OpenChannelResponse | 50-15 |
| | CloseChannel | CloseChannelResponse | 50-16 |
| TRANSFER | TransferMethod | TransferMethodResponse | 50-17 |
| FORMAT | SetFormat | SetFormatResponse | 50-18 |
| LOG-IN | Login | LoginResponse | 50-19 |
| | Logout | LogoutResponse | 50-20 |
| | Reconnect | ReconnectResponse | 50-21 |
| DATA | WriteBlock | | 50-22 |
| | WriteBuffer | | 50-23 |
| | PullBuffer | | 50-24 |

FIG. 42

| EXIF(TIFF, JPEG) | EXIF NON-COMPRESSED AND COMPRESSED DATA |
|---|---|
| TIFF/EP | TIFF EXTENDED VERSION |
| RGB | RGB RAW IMAGE |
| YUV | YUV RAW IMAGE |
| YCrCb | YCrCb RAW IMAGE |
| CMYK | CMYK RAW IMAGE |
| Vendor Specific | VENDOR DEFINITION |

FIG. 73

| BIT NO OF WORD 0<br>1, 2 | DATA TRANSFER REQUEST |
|---|---|
| 0, 0 | NO, REQUEST |
| 0, 1 | — |
| 1, 0 | STAND BY |
| 1, 1 | TRANSFER REQUEST |

FIG. 74

| BIT NO OF WORD 1<br>3, 4, 5 | MEMORY TYPE |
|---|---|
| 0, 0, 0 | TYPE A |
| 0, 0, 1 | TYPE B |
| 0, 1, 0 | TYPE C |
| 0, 1, 1 | TYPE D |
| 1, X, X | RESERVE |

FIG. 75

| BIT NO OF WORD 2<br>(10 BITS) | 6 TO 15 | ADDRESS OF COORDINATE Xs |
|---|---|---|
| BIT NO OF WORD 3<br>(10 BITS) | 16 TO 25 | ADDRESS OF COORDINATE Ys |
| BIT NO OF WORD 3<br>(10 BITS) | 26 TO 35 | ADDRESS OF COORDINATE Xe |
| BIT NO OF WORD 4<br>(10 BITS) | 36 TO 45 | ADDRESS OF COORDINATE Ye |

| BITS IN WORD 6 | IMAGE DATA FORMAT |
|---|---|
| 1XXXXXXX | YUV 4 : 4 : 4 |
| X1XXXXXX | YUV 4 : 2 : 2 |
| XX1XXXXX | YUV 4 : 1 : 1 |
| XXX1XXXX | RESERVE |
| XXXX1XXX | RGB |
| XXXXX1XX | MONO |
| XXXXXX1X | RESERVE |
| XXXXXXX1 | RESERVE |

DATA TRANSMISSION APPARATUS, SYSTEM AND METHOD, AND IMAGE PROCESSING APPARATUS

BACKGROUND OF THE INVENTION

1. Field of the Invention

The present invention relates to a data transmission apparatus, system and method and an image processing apparatus, and more particularly, to a data transmission apparatus, system and method and an image processing apparatus used in a case where an image providing device such as a digital camera is directly connected to an image processing device such as a printer via a serial interface based on, e.g., the IEEE 1394 standards.

Further, the present invention relates to a data transmission apparatus, system and method and an image processing apparatus which interconnect a plurality of electronic devices by using a data communication bus capable of performing data communication by intermixing control signals and data and among the devices.

2. Description of Related Art

Various types of systems which transfer data to a printer via a bus are known. For example, a known technique is to output data from a computer to the printer by using a defacto standard interface such as a SCSI (Small Computer System Interface) or Centronics interface.

In other words, the printer is connected to a personal computer (PC) as a host device via a parallel or serial interface such as a centronics or RS232C interface.

Further, digital devices as image providing devices such as a scanner, a digital still camera and a digital video camera, are also connected to the PC.

Image data inputted by the respective digital devices is temporarily stored in a hard disk or the like on the PC, then processed by an application software program or the like on the PC and converted into print data for the printer, and transferred via the above interface to the printer.

In the above system, the PC has driver software programs respectively for controlling the digital devices and the printer. The image data outputted from the digital devices is held by these driver software programs in data format which can be easily handled and displayed on the PC.

The stored data is converted into the print data by an image processing method in consideration of image characteristics of the input and output devices.

In this manner, the digital devices are connected to the PC as the host device, and the printer print-outputs image data provided from one of the digital devices as an image providing device, via the PC.

However, the above interface such as an SCSI interface has various inconveniences such as the low data transfer rate, the bulky communication cable, the limitation on the type and number of connectable peripheral devices, the limitation on connection methods and the like.

Further, a general PC has a large connector for connecting the SCSI interface and other cables on its rear surface. At such connector, attachment/detachment is troublesome. For example, when a portable device such as a digital still camera or a video camera is connected to the PC, it is very tiresome to connect cables to the connector provided on the rear surface of the PC.

Generally, a personal computer is already connected to a number of peripheral devices. The number of types of peripheral devices will increase, and further, by improvement of interfaces and the like, communication will be performed with a number of digital devices interconnected on a network, as well as between the personal computer with the peripheral devices. In this case, the network communication is very useful, however, as communication handling a large amount of data is frequently performed, the traffic on the network may increase and influence data communication on the network. For example, a user wants to continue image printing or to perform printing quickly while not noticing the communication traffic performed between other devices is very large. In this case, as the load on the overall network or the PC as a host device increases, the printing may not be normally performed or delayed. In this manner, the trouble occurs in data communication on the network due to increase of the network traffic or in accordance with the operational status of the PC.

On the other hand, in a new interface such as an interface based on the IEEE 1394 standards (hereinafter referred to as "1394 serial bus"), it is possible to directly connect an image providing device and a printer, thus avoiding the normal traffic.

In case of directly connecting the image providing device to the printer by the 1394 serial bus, an FCP (Function Control Protocol) operand may include print data.

Further, in the 1394 serial bus, a register area for may be provided such that data transfer is performed by writing data into the register area.

Further, as the 1394 serial bus has a plurality of data-transfer control procedures, data transfer can be performed in methods appropriate to the respective devices.

Further, to designate data transfer, a command instructing to start of data transfer and a response to the command may be employed.

As described above, the image data outputted from the image providing device is converted into print data by the PC and print-outputted by the printer, accordingly, even if the image providing device and the printer are directly connected, printing cannot be performed without the PC.

A video printer which directly print-outputs image data outputted from a digital video camera is known, however, even in case of using this printer, connection is made only between specific devices. There is no video printer which is directly connected to a number of image providing devices for general printing purposes.

That is, it is impossible to directly send image data from the image providing device to the printer for printing, by utilizing a function to directly connect devices, which is characteristic of the 1394 serial bus or the like.

In the above method which directly connects the image providing device to the printer with the 1394 serial bus and includes print data into an FCP operand, the control commands cannot be separated from the print data. Further, in this method, the transfer efficiency is low since a response is always required with respect to a command.

The above method providing a register area for data transfer requires processing to determine whether or not data can be written into the register area at every data transfer. Accordingly, the overhead of the determination processing is great, which degrades the transfer efficiency.

Further, in the case where data transfer is designated by using a command instructing to start of data transfer and a response to the command may be employed, transmission and reception of command and response occur at each data transfer of a predetermined unit, which also degrades the transfer efficiency.

SUMMARY OF THE INVENTION

The present invention has been made to solve the above problems, and has its object to provide a data transmission apparatus, system and method and an image processing apparatus, which perform high efficient data transfer by notifying information on data processing capability of a destination node of data transfer, from the destination node to a transfer originator node.

According to the present invention, the foregoing object is attained by providing a data transmission method for devices connected by a serial bus, the method comprising the steps of: notifying processing capability information indicative of a data processing capability of a receiving device of data transfer, from the receiving device to a transmitting device of the data transfer, prior to start of the data transfer; determining the data block size of data to be transferred by the transmitting device, in accordance with the notified processing capability information; and transmitting the data in the determined data block size from the transmitting device to the receiving device.

Further, the foregoing object is attained by providing an image processing system having devices connected by a serial bus, comprising: recognition means for recognizing processing capability information indicative of the image-data processing capability of the receiving device of image data transfer, prior to the image data transfer; determination means for determining the data block size of image data transmitted by a transmitting device, in accordance with the processing capability information recognized by the recognition means; and transfer means for sequentially transferring the image data in the data block size determined by determination means from the transmitting device to the receiving device.

Further, the foregoing object is attained by providing an image processing apparatus for processing image data received from a host device through a serial bus, comprising: notification means for notifying processing capability information indicative of an image-data processing capability to the host device, prior to image data transfer; and reception means for receiving image data, in a data block size based on the processing capability information, from the host device.

Further, another object of the present invention is to provide a data transmission apparatus, system and method and an image processing apparatus, appropriate for directly connecting a host device with a target device by the 1394 serial bus or the like and processing image data, directly sent from the host device to the target device, by the target device.

Further, another object of the present invention is to provide a data transmission apparatus, system and method and an image processing apparatus which separate control commands from data and attain high transfer efficiency.

Further, another object of the present invention is to provide a data transmission apparatus, system and method and image processing apparatus which remove overhead required for determining whether or not data can be written into a data transfer area.

Further, another object of the present invention is to provide a data transmission apparatus, system and method and image processing apparatus which transmit and receive data of an amount corresponding to the number of available blocks in a data transfer area for one data transfer.

Further, another object of the present invention is to provide a data transmission apparatus, system and method and an image processing apparatus which unnecessitate transmission and reception of command and response at each data transfer of a predetermined unit.

According to the present invention, the foregoing object is attained by providing a data transmission method for host and target devices connected by a serial bus, the method comprising the steps of: transmitting data amount information indicative of the amount of data to be transferred between the host device and the target device by asynchronous transfer; transferring the data in accordance with the data amount information; and if next data transfer is performed, performing the next data transfer without transmission of the data amount information.

Further, the foregoing object is attained by providing an image processing apparatus for processing image data received from a host device through a serial bus, comprising: communication means for communicating data amount information indicative of the amount of data to be transferred with the host device, by asynchronous transfer; and reception means for receiving image data transferred from the host device in accordance with the data amount information, wherein if next data transfer is performed, the next data transfer is performed without communication of the data amount information.

Further, the foregoing object is attained by providing an image processing apparatus for processing image data sent to a target device through a serial bus, comprising: communication means for communicating data amount information indicative of the amount of data to be transferred with the target device, by asynchronous transfer; and transmission means for transmitting image data to the target device in accordance with the data amount information, wherein if next data transfer is performed, the next data transfer is performed without communication of the data amount information.

Other features and advantages of the present invention will be apparent from the following description taken in conjunction with the accompanying drawings, in which like reference characters designate the same name or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 1A is an explanatory view showing a general construction of a system to which the present invention is applied;

FIG. 15B is a table showing the details of packet format fields for the isochronous transfer in a 1394 serial bus;

FIG. 26A is a table showing functions of a CSR architecture of the 1394 serial bus;

FIG. 26B is a table showing registers for the 1394 serial bus;

FIG. 26C is a table showing registers for node resources of the 1394 serial bus;

FIG. 26D is an example of a minimum format of a configuration ROM of the 1394 serial bus;

FIG. 26E is an example of a general format of the configuration ROM of the 1394 serial bus;

FIG. 29 is an explanatory view showing an AV/C transaction in the 1394 serial bus;

FIG. 33 is a schematic view showing a register map;

FIG. 41 is a table showing commands and responses to the commands;

FIG. 42 is an example of an image data formats supported by the DPP protocol;

FIG. 73 is a table showing the statuses of a data transfer request indicated by a WORD 0 in FIG. 72;

FIG. 74 is a table showing memory types indicated by a WORD 1 in FIG. 72;

FIG. 75 is a table showing addresses of the coordinates of SPA (Start Point Address) and EPA (End Point Address);

DETAILED DESCRIPTION OF THE PREFERRED EMBODIMENTS

Hereinbelow, preferred embodiments of a data transfer method of the present invention will now be described in detail in accordance with the accompanying drawings.

[First Embodiment]

FIG. 1A shows an example of general construction of a system to which the present invention is applied, where a PC 103, a printer 102 and a digital video camera (DVC) 101 are connected via a 1394 serial bus. Then the outline of the 1394 serial bus will be described below.

[Outline of 1394 Serial Bus]

With the appearance of general digital video cam recorder (VCR) and digital video disk (DVD) player, there is a need for transferring realtime and large amount data such as video data and audio data (hereinafter referred to as "AV data"). To transfer AV data in realtime to a personal computer (PC) or other digital devices, an interface capable of high-speed data transfer is required. The 1394 serial bus has been developed from the above point.

Figure 1B:
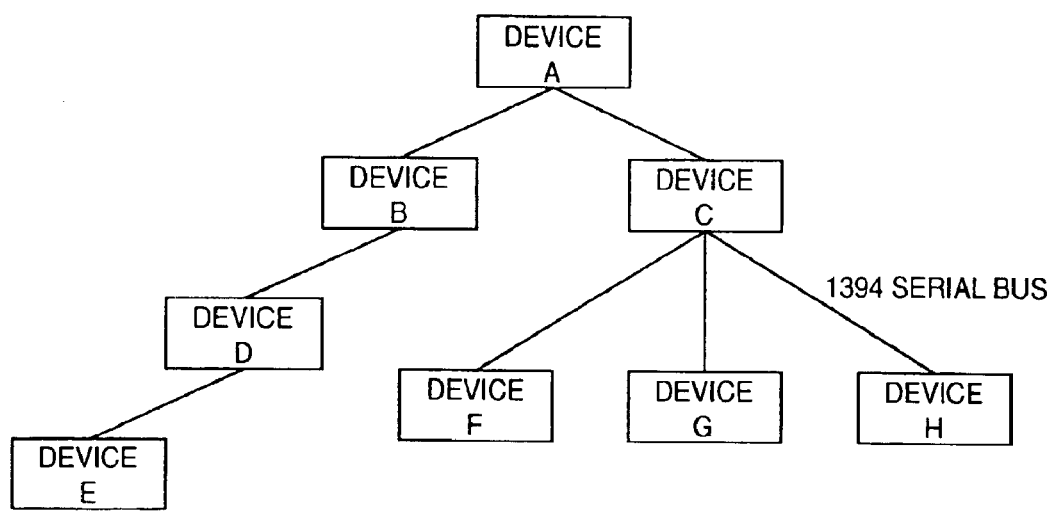
FIG. 1B is a block diagram showing an example of a network system constructed with an IEEE 1394 serial interface.

FIG. 1B shows an example of a network system constructed with a 1394 serial bus. This system comprises devices A to H, and the devices A and B, the devices A and C, the devices B and D, the devices D and E, the devices C and F, the devices C and G, and the device C and H are respectively connected by a twisted pair cable for the 1394 serial bus. These devices A to H may be computers such as a personal computer, or most computer-peripheral devices such as a digital VCR, a DVD player, a digital still camera, a storage device using a storage medium such as a hard disk or an optical disk, a monitor such as a CRT or an LDC, a tuner, an image scanner, a film scanner, a printer, a MODEM, and a terminal adapter (TA).

Note that the printing method of the printer may be any method, e.g., a laser-beam printing, an electrophotographic method using an LED, an ink-jet method, a thermal-transfer method of ink melting or ink sublimation type and a thermo-sensitive printing method.

The connection between the devices may be made by mixedly using a daisy chain method and a node branching method, thus realizing high-freedom of connecting.

The respective devices have an ID, and they construct a network by identifying each ID within a range connected by the 1394 serial bus. For example, the devices respectively take a relaying role only by daisy-chain connecting the devices with cables for the 1394 serial bus, thus constructing a network.

As the 1394 serial bus corresponds to Plug and Play function, it automatically recognizes a device connected to the cable, thus recognizes connection status. In the system as shown in FIG. 1B, when a device is removed from the network, or a new device is added to the network, the bus is automatically reset (i.e., the current network constructing information is reset), and a new network is constructed. This function enables realtime setting and recognition of network construction.

The 1394 serial bus has a data transfer speed defined as 100/200/400 Mbps. A device having a high transfer speed supports a lower transfer speed, thus maintaining compatibility. As data transfer modes, an asynchronous transfer mode (ATM) for transferring asynchronous data such as a control signal, an isochronous transfer mode for transferring isochronous data such as realtime AV data are available. In data transfer, within each cycle (generally 125 μs/cycle), a cycle start packet (CSP) indicating the start of cycle is transferred, and then asynchronous and isochronous data are mixedly transferred such that the isochronous data transfer is transferred prior to the asynchronous data.

Figure 2:
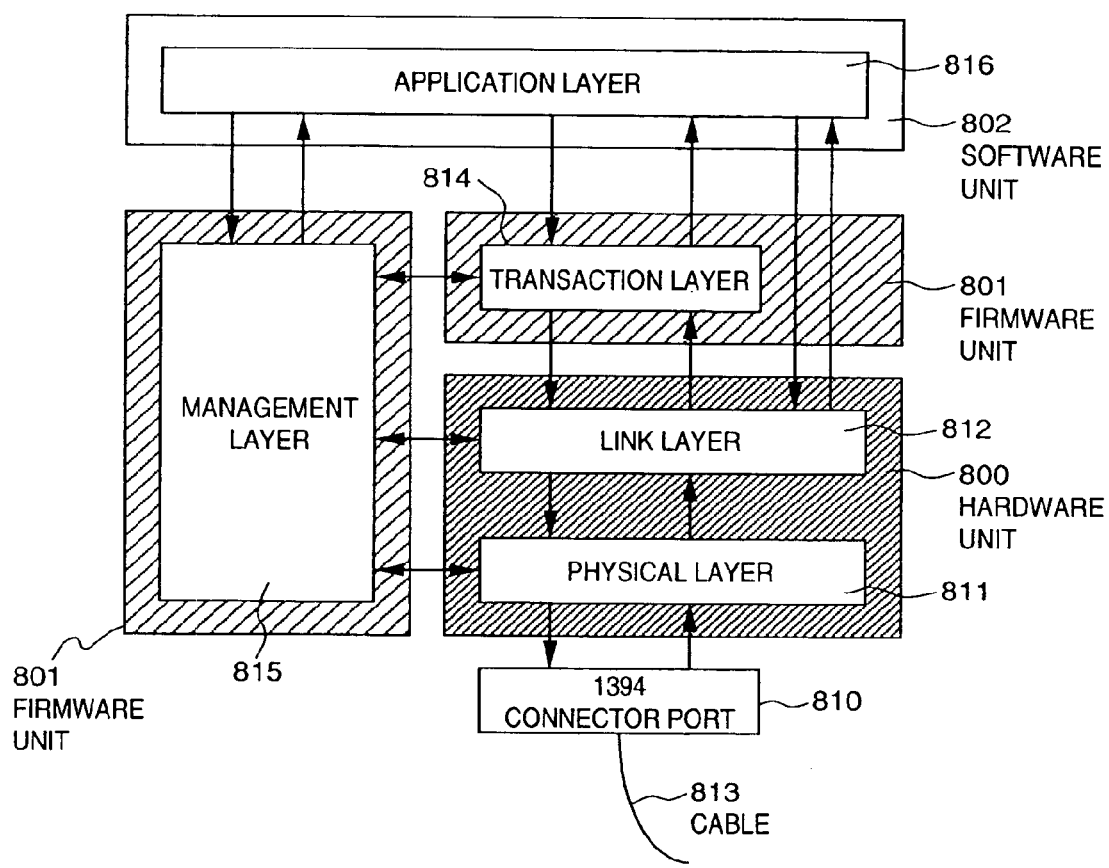
FIG. 2 is a block diagram showing the construction of the IEEE 1394 serial interface.

FIG. 2 shows the construction of the 1394 serial bus, as a layer structure. As shown in FIG. 2, a connector port 810 is connected to a connector at the end of a cable 813 for the 1394 serial bus. A physical layer 811 and a link layer 812 in a hardware unit 800 are positioned as upper layers with respect to the connector port 810. The hardware unit 800 comprises interface chips. The physical layer 811 performs coding, connection-related control and the like, and the link layer 812, packet transfer, cycle-time control and the like.

In a firmware unit 801, a transaction layer 814 manages data to be transferred (transaction data), and outputs commands Read, Write and Lock. A management layer 815 in the firmware unit 801 manages connection statuses and ID's of the respective devices connected to the 1394 serial bus, thus manages the network construction. The above hardware and firmware units substantially constructs the 1394 serial bus.

In a software unit 802, an application layer 816 differs in software used by the system, and the data transfer protocol indicating how to transfer data on the interface is defined by a protocol such as a printer protocol or an AVC protocol.

Figure 3:
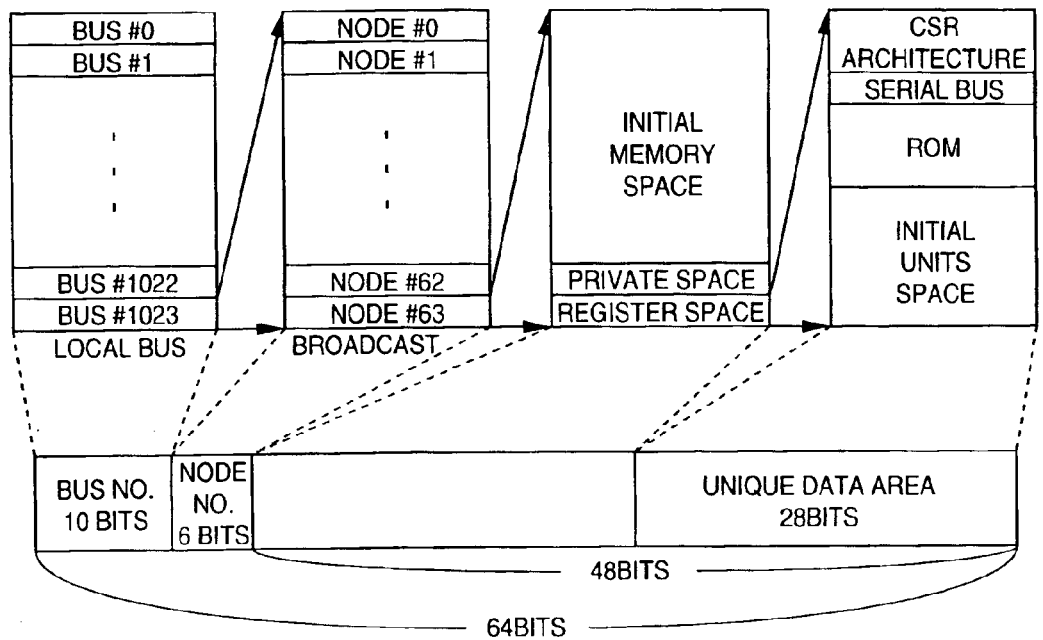
FIG. 3 is an explanatory view showing address space of the IEEE 1394 serial interface.

FIG. 3 shows address space of the 1394 serial bus. All the devices (nodes) connected to the 1394 serial bus have a unique 64 bit address. The 64 bit address is stored in a memory of the devices. Data communication with a designated destination device can be performed by always recognizing the node addresses of the transmitting- and receiving-side nodes.

Addressing of the 1394 serial bus is made based on the IEEE 1212 standards, such that first 10 bits are allocated for designating a bus number, then next 6 bits are allocated for designating an node ID. 48-bit address used in the respective devices are divided into 20 bits and 28 bits, and utilized in the unit of 256 Mbytes. In the initial 20-bit address space, "0" to "0xFFFFD" is called a memory space; "0xFFFFE", a private space; "0xFFFFF", a register space. The private space is an address freely used in the device. The register space, holding information common to the devices connected with the bus, is used for communication among the respective devices.

In the register space, the initial 512 bytes are assigned to a register core (CSR core) as a core of a Command/Status Register (CSR) architecture; the next 512 bytes, to a register of the serial bus; the next 1024 bytes, to a configuration ROM; and the remaining bytes, to a register unique to the device in a unit space.

Generally, for the sake of simplification of bus system design for different node types, it is preferable that only the initial 2048 bytes are used for the nodes, and as a result, total 4096 bytes are used including the initial 2048 bytes for the CSR core, the register of the serial bus, the configuration ROM and the unit space.

The 1394 serial bus has the construction as described above. Next, the features of the 1394 serial bus will be described in more detail.

[Electrical Specification of 1394 Serial Bus]

Figure 4:
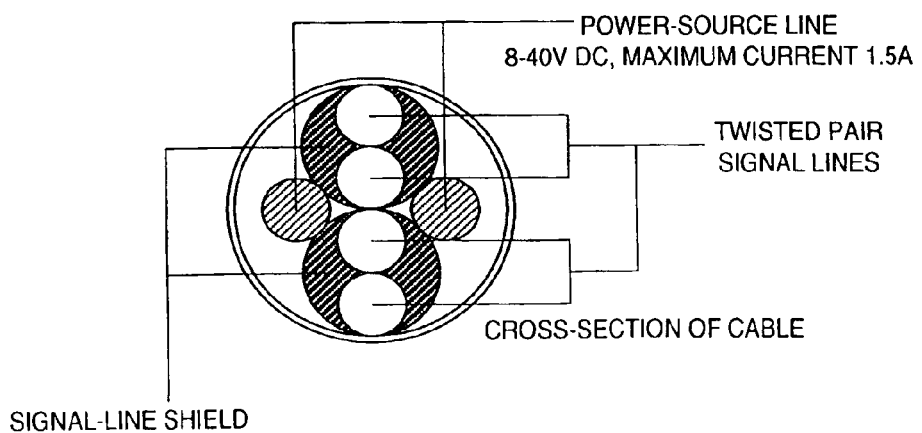
FIG. 4 is a cross-sectional view showing a cable for the IEEE 1394 serial interface.

FIG. 4 shows a cross-section of the cable of the 1394 serial bus. The 1394 serial cable comprises two sets of twisted pair signal lines and two power-source lines. This construction enables power supply to a device which lacks a power source, or a device where a voltage is degraded due to a failure or the like. The direct-current voltage supplied by the power-source lines is 8 to 40V; the current is maximum 1.5 A. Note that in the standards for so-called DV cable, four lines except the power-source line construct the cable.

[DS-Link]

Figure 5:
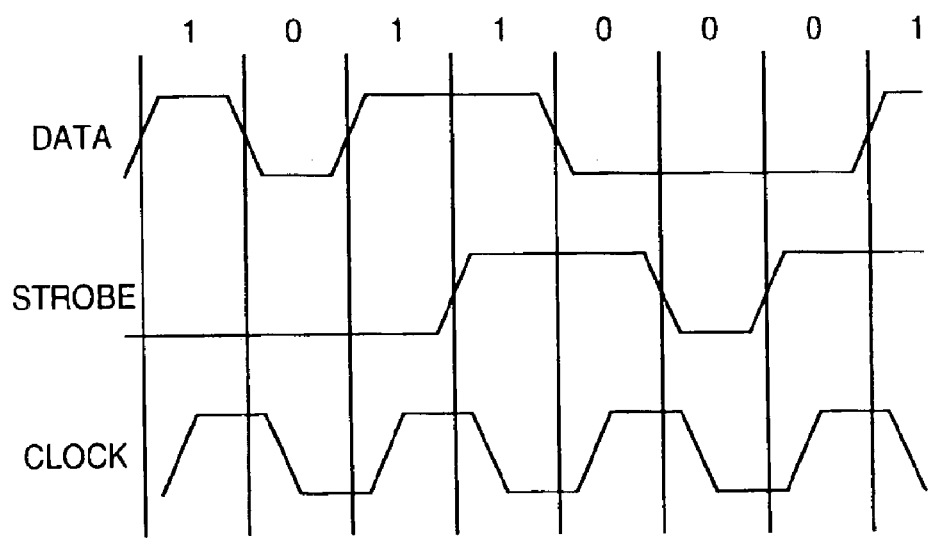
FIG. 5 is a timing chart explaining a Data/Strobe Link method.

FIG. 5 is a timing chart explaining a DS-Link (Data/Strobe-Link) method as a data transfer method.

The DS-Link method, appropriate for high-speed serial data communication, requires two sets of two signal lines. That is, one of the two sets of twisted-pair signal lines is used for sending a data signal, and the other one set of twisted-pair signal lines is used for sending a strobe signal. On the receiving side, an EXCLUSIVE-OR between the data signal and the strobe signal is obtained so as to generate a clock signal. In the DS-Link transfer, it is unnecessary to mix a clock signal into a data signal, therefore, transfer efficiency is higher than that in other serial-data transfer methods. Further, as a clock signal is generated from the data signal and the strobe signal, a phase locked loop (PLL) circuit can be omitted, which attains downsizing of the scale of a controller LSI. Further, in the DS-Link transfer, it is unnecessary to send information indicative of idle status when there is no data to be transferred, therefore, a transceiver of each device can be set in a sleep status, which reduces electric consumption.

[Bus-Reset Sequence]

The respective devices (nodes) connected to the 1394 serial bus are provided with a node ID, and are recognized as nodes constructing the network. For example, when increase/decrease of the number of nodes due to connection/disconnection or power ON/OFF status of network devices, i.e., network construction changes and it is necessary to recognize a new network construction, the respective nodes detect the change of network construction, send a bus-reset signal onto the bus, and enter a mode for recognizing the new network construction. The detection of change of network construction is made by detecting change of bias voltage at the connector port 810.

When the bus-reset signal is sent from one node, the physical layer 811 of the respective nodes receives the bus-reset signal, and at the same time, notifies the link layer 812 of the occurrence of bus reset, and forwards the bus-reset signal to the other nodes. When all the nodes have received the bus-reset signal, a bus-reset sequence is started. Note that the bus-reset sequence is started when the cable is attached/detached, or the hardware unit 800 has detected network abnormality or the like. Further, the bus-reset sequence is also started by a direct instruction to the physical layer 811 such as host control by a protocol. As the bus-reset sequence is started, data transfer is suspended during the bus reset, and after the bus reset, the data transfer is restarted in the new network construction.

[Node-ID Determination Sequence]

After the bus reset, the respective nodes start to obtain a node ID so as to construct a new network construction. A general sequence from the bus reset to node-ID determination will be described with reference to the flowcharts of FIGS. 6 to 8.

Figure 6:
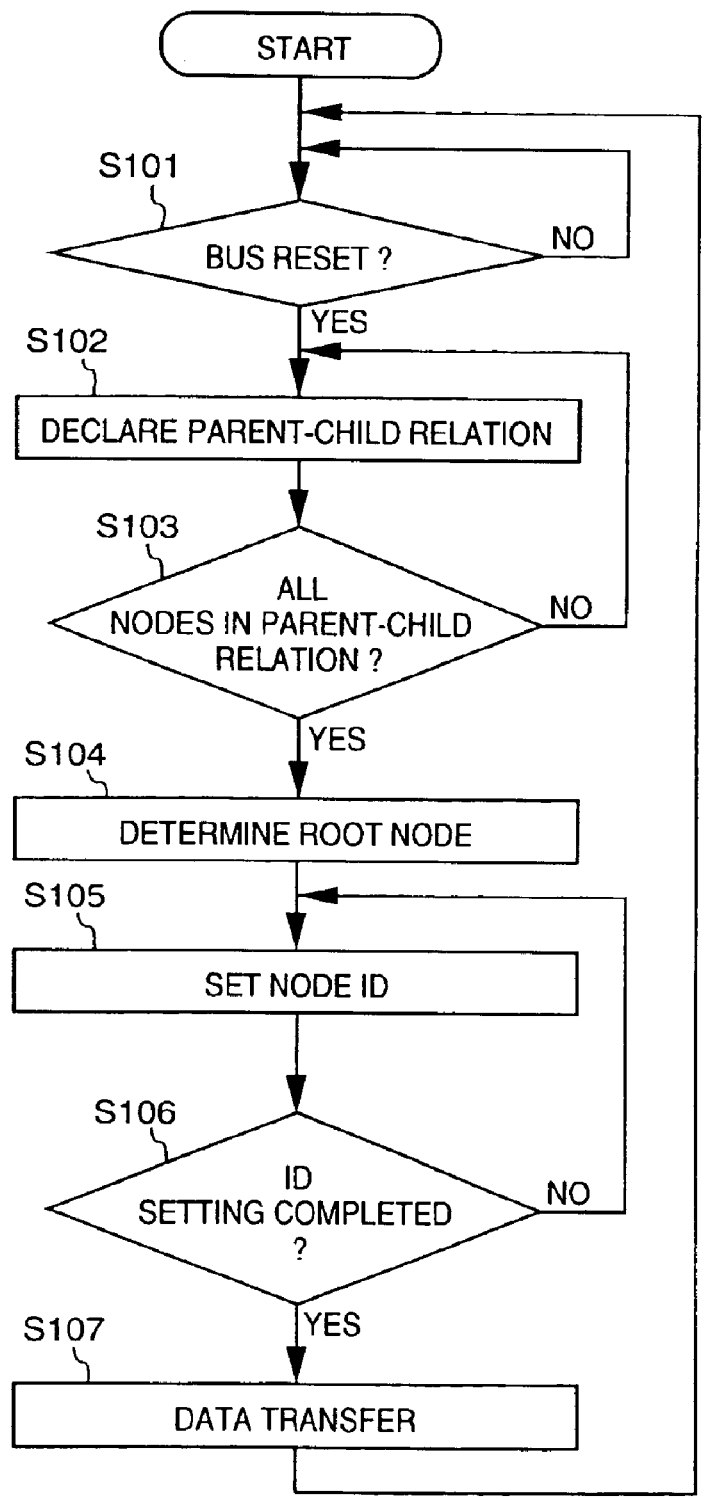
FIGS. 6 to 8 are flowcharts showing a procedure of network construction in the IEEE 1394 serial interface.

FIG. 6 is a flowchart showing a sequence from occurrence of bus-reset signal to node-ID determination and data transfer. At step S101, the respective nodes always monitor occurrence of bus-reset signal. When the bus-reset signal has occurred, the process proceeds to step S102, at which to obtain a new network construction in a state where the network construction has been reset, parent-child relation is declared between nodes connected to each other. Step S102 is repeated until it is determined at step S103 that the parent-child relation has been determined among all the nodes.

As the parent-child relation has been determined, the process proceeds to step S104, at which one "root (node)" is determined. At step S105, node-ID setting is performed so as to provide an ID to the respective nodes. The node-ID setting is made in a predetermined order of the nodes. Step S105 is repeated until it is determined at step S106 that the ID's have been given to all the nodes.

As the node-ID setting has been completed, since the new network construction has been recognized by all the nodes, data transfer among the nodes is possible. At step S107, data transfer is started, and the process returns to step S101, at which occurrence of bus-reset signal is monitored again.

Figure 7:
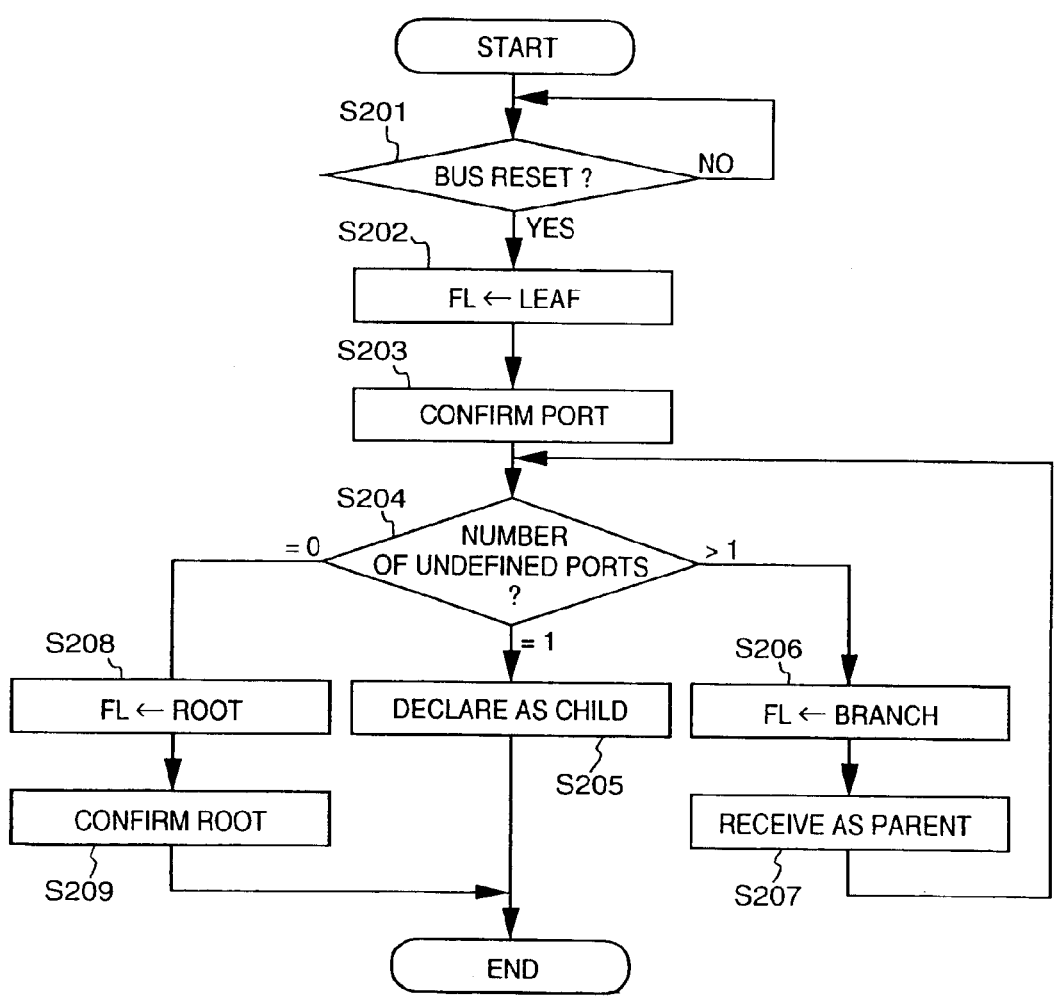
Figure 8:
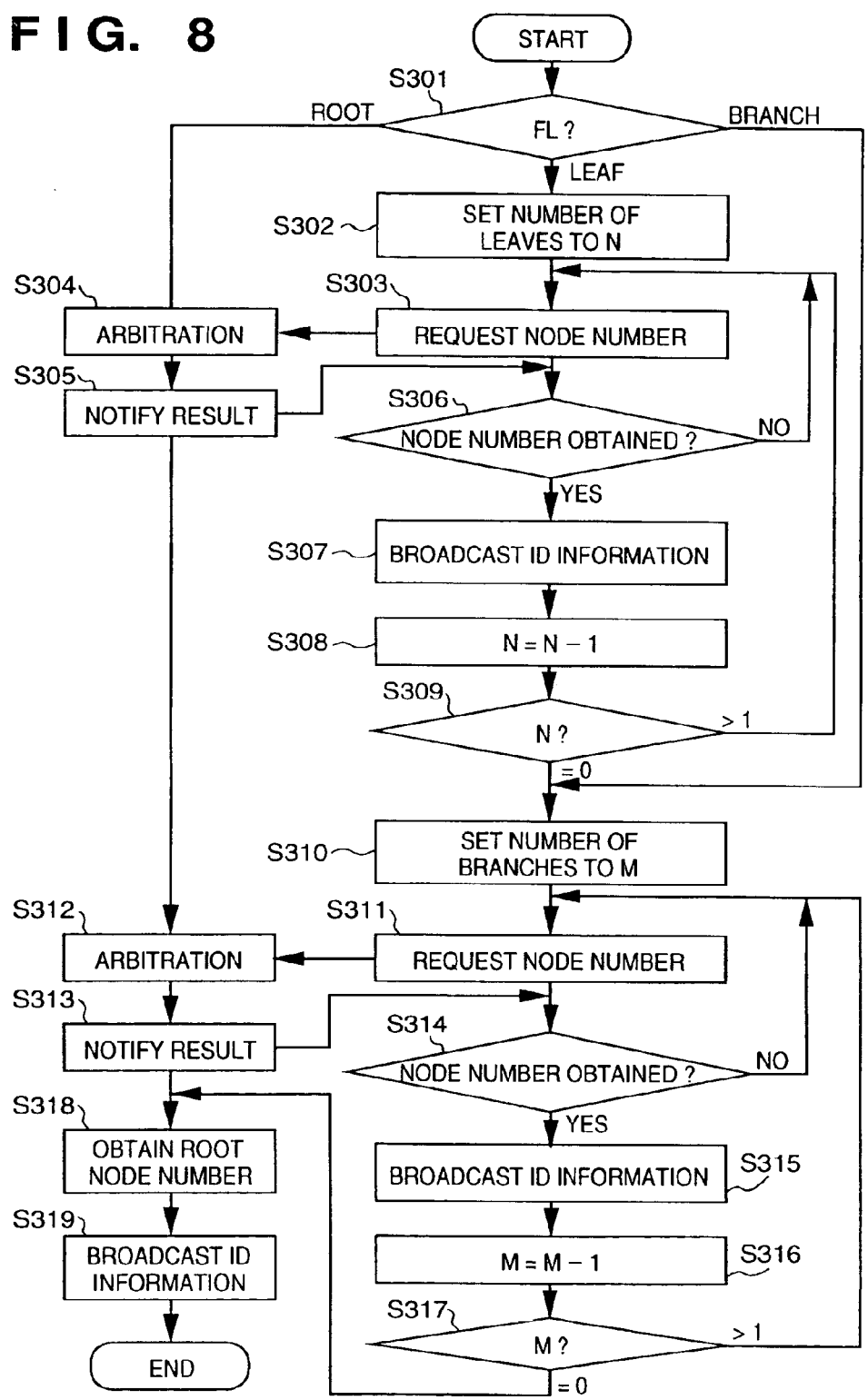

FIG. 7 is a flowchart showing the sequence from the monitoring of bus-reset signal (S101) to the root determination (S104) in detail. FIG. 8 is a flowchart showing the node-ID setting (S105 and S106) in detail.

In FIG. 7, at step S201, the occurrence of bus-reset signal is monitored, and as the bus-reset signal has occurred, the network construction is reset. Next, at step S202, as a first step for re-recognizing the reset network construction, the respective devices reset its flag FL with data indicative of "leaf (node)". At step S203, the respective devices examine the number of ports, i.e., the number of other nodes connected to them. At step S204, based on the result of examination at step S203, the devices examine the number of undefined (i.e., parent-child relation has not been determined) ports. The number of undefined ports is equal to that of the ports immediately after the bus reset, however, with the progress of determination of parent-child relation, the number of undefined ports detected at step S204 decreases.

Only actual leaf(ves) can declare parent-child relation immediately after the bus reset. Whether or not the node is a leaf is detected from the number of ports examined at step S203; i.e., if the number of ports is "1", the node is a leaf. The leaf declares that "this node is a child, and the connected node is a parent" at step S205, then terminates the operation.

On the other hand, a node that detected at step S203 that the number of ports is "two or more" is a "branch". Immediately after the bus reset, as "undefined ports>1" holds, the process proceeds to step S206, at which the flag FL is set with data indicative of "branch", then declaration of parent-child relation from another node is waited at step S207. When the parent-child relation is declared from another node, the process returns to step S204 at which the branch examines the number of undefined ports. If the number of undefined ports is "1", the branch can declare at step S205 that "this node is a child, and the connected node is a parent" to the node connected to the remaining port. If the number of undefined ports is still "two or more", the branch waits for declaration of parent-child relation from another node at step S207.

When any one of the branches (or exceptionally leaf(ves) which delayed declaring a child) detects that the number of undefined ports is "0", the parent-child declaration of the overall network has been completed. The only one node that has "0" undefined port, i.e., the parent of all the nodes, sets the flag FL with data indicative of a "root" at step S208. Then at step S209, the node is recognized as a root.

In this manner, the procedure from the bus reset to the parent-child declaration among all the nodes in the network ends.

Next, a procedure of providing each node with an ID will be described. First, the ID setting is performed at the leaves. Then, ID's are set in numerical order (from node number: 0) from leaves→branches→root.

In FIG. 8, at step S301, the process splits in accordance with node type, i.e., leaf, branch or root, based on the data set at the flags FL.

In case of leaf, at step S302, the number of leaves (natural number) in the network is set to a variable N. At step S303, the respective leaves request a node number to the root. If a plurality of requests have been made, the root performs arbitration at step S304, and provides a node number to one node at step S305, while notifies the other nodes of the result of acquisition of node-number indicating that the node number has been failed.

A leaf that has not obtained a node number (NO at step S306) repeats the request for node number at step S303. On the other hand, a leaf that has obtained a node number notifies all the nodes of the obtained node number by broadcasting ID information including the node number. As the broadcasting of the ID information has been completed, the variable N indicative of the number of leaves is decremented at step S308. Then, from the determination at step S309, the procedure from step S303 to step S308 is repeated until the variable N becomes "0" in the determination at step S309. When ID information on all the leaves have been broadcasted, the process proceeds to step S310, for setting ID's of branches.

The ID setting for branches is performed substantially similar to the ID setting for the leaves. First, at step S310, the number of branches (natural number) is set to a variable M. At step S311, the respective branches request the root for a node number. In response to the requests, the root performs arbitration at step S312, and provides a node number, subsequent to the last leaf node number, to a branch at step S313, while notifies the other branches of the result of acquisition of node-number indicating that the node number has been failed.

A branch that has not obtained a node number (NO at step S314) repeats the request for node number at step S315. On the other hand, a branch that has obtained a node number notifies all the nodes of the obtained node number by broadcasting ID information including the node number. As the broadcasting of the ID information has been completed, the variable M indicative of the number of branches is decremented at step S316. Then, from the determination at step S317, the procedure from step S311 to step S316 is repeated until the variable M becomes "0" in the determination at step S317. When ID information on all the leaves have been broadcasted, the process proceeds to step S318, for setting the ID of the root.

At this time, it is only the root that has not obtained a node ID. At step S318, the root obtains the smallest number that has not been provided to any other node as the node ID of the root, and at step S319, broadcasts ID information on the root.

As described above, the procedure until the node ID's for all the nodes have been set ends. Next, the sequence of node ID determination will be described with reference to the network example shown in FIG. 9.

Figure 9:
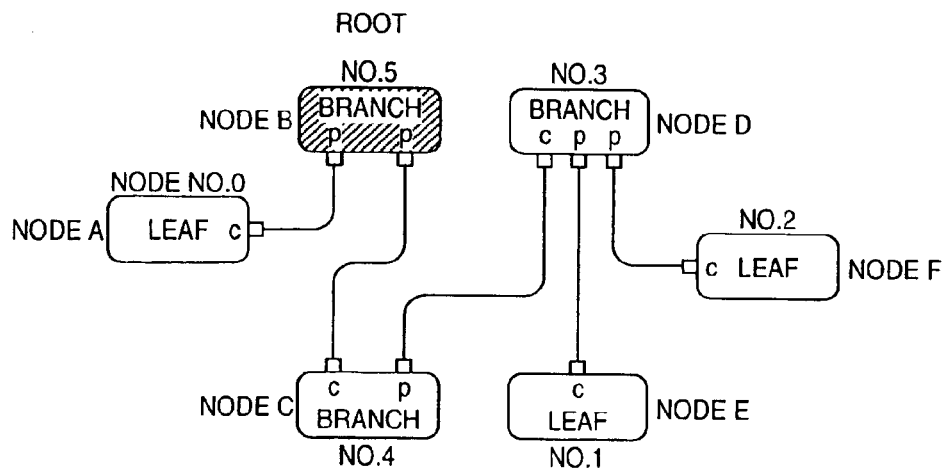
FIG. 9 is a block diagram showing an example of the network.

In the network in FIG. 9, a node B as a root is directly connected to its lower nodes A and C; the node C is directly connected to its lower node D; and the node D is directly connected to its lower nodes E and F. The procedure of determining this hierarchical structure, the root node and the node ID's will be described below.

After the bus reset has occurred, to recognize connection statuses of the respective nodes, parent-child relation is declared between ports of directly connected nodes. "parent" means a node at an upper level and "child" means a node at a lower level in the hierarchical structure. In FIG. 9, the node that first declared parent-child relation after the bus reset is the node A. As described above, nodes (leaves) where only one port is connected can start declaration of parent-child relation. That is, if the number of ports is "1", it is recognized that the node is the end of the network tree, i.e., a leaf. The declaration of parent-child relation is started from the leaf which has first taken action among these leaves. Thus, a port of the leave node is set as a "child", while the port of another node connected to the leave node is set as a "parent". In this manner, "child-parent" relation is sequentially set between the nodes A and B, between the nodes E and D, and between the nodes F and D.

Further, among upper nodes having a plurality of ports, i.e., branches, parent-child relation is sequentially declared with respect to upper node(s), from the node that first received declaration of parent-child relation from the leaf. In FIG. 9, first parent-child relation is determined between the nodes D and E and between the nodes D and F. Then the node D declares parent-child relation with respect to the node C, and as a result, a relation "child-parent" is set between the nodes D and C. The node C, that has received the declaration of parent-child relation from the node D, declares parent-child relation with respect to the node B connected to the other port, thus "child-parent" relation is set between the nodes C and B.

In this manner, the hierarchical structure as shown in FIG. 9 is constructed. The node B, that has finally become the parent at all the ports, is determined as a root. Note that a network has only one root. In a case where the node B that has received declaration of parent-child relation from the node A immediately declares parent-child relation with respect to another node, the other node, e.g., the node C, may be the root node. That is, any node may be a root depending upon timing of transmitting declaration of parent-child relation, and further, even in a network maintaining the same construction, a particular node is not always become a root.

As the root has been determined, the sequence of determining the respective node ID's is started. Each node has a broadcast function to notify its ID information to all the other nodes. ID information includes a node number, information on a connected position, the number of ports, the number of ports connected to other nodes, information on parent-child relation on the respective ports and the like.

As described above, the assignment of node numbers is started from the leaves. In numerical order, node number=0, 1, 2, . . . is assigned. Then, by the broadcasting of ID information, it is recognized that the node number has been assigned.

As all the leaves have obtained a node number, node numbers are assigned to the branches. Similar to the assignment of node numbers to the leaves, ID information is broadcasted from the branch that received a node number, and finally, the root broadcasts its ID information. Accordingly, the root always has the greatest node number.

Thus, as the ID setting of the overall hierarchical structure has been completed and the network has been constructed, then the bus initialization is completed.

[Control Information for Node Management]

The CSR core as shown in FIG. 3 exists on the register as a basic function of the CSR architecture for node management. FIG. 26A shows the positions and functions of the registers. In FIG. 26A, the offset is a relative position from "0xFFFFF0000000.

In the CSR architecture, the register for the serial bus is arranged from "0xFFFFF0000200". FIG. 26B shows the positions and functions of the registers.

Further, information on node resources of the serial bus is arranged from "0xFFFFF0000800". FIG. 26C shows the positions and functions of the registers.

The CSR architecture has a configuration ROM for representing functions of the respective nodes. The configuration ROM has a minimum format and a general format, arranged from "0xFFFFF0000400". As shown in FIG. 26D, the minimum format configuration ROM merely shows a vendor ID which is a unique numerical value represented by 24 bits.

As shown in FIG. 26E, the general format configuration ROM has information on a node. In this case, the vendor ID in this format is included in a "root_directory". Further, "bus_info_block" and "root&unit_leaves" include unique device number including the vendor ID, represented by 64 bits. The device number is used after network reconstruction by bus reset operation, to continue recognition of the node.

[Serial Bus Management]

As shown in FIG. 2, the protocol of the 1394 serial bus comprises a physical layer 811, a link layer 812 and a transaction layer 814. This provides, as the serial bus management, a basic function for node management and bus resource management, based on the CSR architecture.

Only one node which performs bus management (hereinafter referred to as "bus management node") exists on the same bus, and provides the other nodes on the serial bus with management function which includes cycle master control, performance optimization, power source management, transmission speed management, construction management and the like.

The bus management function briefly divides into a bus manager, an isochronous resource manager and a node control function. The node control is a management function which enables communication among the nodes in the physical layer 811, the link layer 812, the link layer 812, the transaction layer 814 and an application program by the CSR. The isochronous resource manager, which is a management function necessary for isochronous-type data transfer on the serial bus, manages assignment of transfer bandwidth and channel number to isochronous data. For this management, after bus initialization, the bus management node is dynamically selected from nodes having the isochronous resource manager function.

Further, in a construction without a bus management node on the bus, a node having the isochronous resource manager function performs a part of the bus management such as the power source management and cycle master control. Further, the bus management is a management function as service to provide a bus control interface to an application program. The control interface uses a serial-bus control request (SB_CONTROL.request), a serial-bus event control confirmation (SB_CONTROL.confirmation) and a serial-bus event indication (SB_EVENT.indication).

The serial-bus control request is used when an application program requires the bus management node to perform bus reset, bus initialization, representation of bus-status information, and the like. The serial-bus event control confirmation is the result of the serial-bus control request, and is notified from the bus management node to the application for confirmation. The serial-bus event control confirmation is made as notification of an synchronously-caused event from the bus management node to the application.

[Data Transfer Protocol]

The data transfer by using the 1394 serial bus simultaneously sends isochronous data (isochronous packet) which must be periodically transmitted, and asynchronous data (asynchronous packet) which can be transmitted/received at arbitrary timing, further, ensures real-time transmission of isochronous data. In the data transfer, a bus use right is requested prior to transfer, and bus arbitration is performed to obtain bus use permission.

In the asynchronous transfer, a transmitting node ID and a receiving node ID are sent with transfer data as packet data. The receiving node confirms the receiving node ID, i.e., its node ID, receives the packet, and returns an acknowledge signal to the transmitting node. Thus, one transaction is completed.

In the isochronous transfer, a transmitting node requires an isochronous channel with a transmission speed, and a channel ID is sent with transfer data as packet data. A receiving node confirms a desired channel ID and receives the data packet. The necessary channel number and transmission speed are determined by the application layer 816.

These transfer protocols are defined by the physical layer 811, the link layer 812 and the transaction layer 813. The physical layer 811 performs physical and electrical interface with the bus, automatic recognition of node connection, bus arbitration for a bus use right among nodes, and the like. The link layer 812 performs addressing, data checking, packet transmission/reception and cycle control for isochronous transfer. The transaction layer 814 performs processing relating to asynchronous data. Hereinbelow, the processings in the respective layers will be described.

[Physical Layer]

The bus arbitration in the physical layer 811 will be described.

The 1394 serial bus always performs arbitration of bus use right prior to data transfer. The devices connected to the 1394 serial bus respectively relay a signal transferred on the network, thus constructing a logical bus-type network transmitting the signal to all the devices within the network. This necessitates bus arbitration to avoid packet conflict. As a result of bus arbitration, one node can transfer data during a certain period.

Figure 10A:
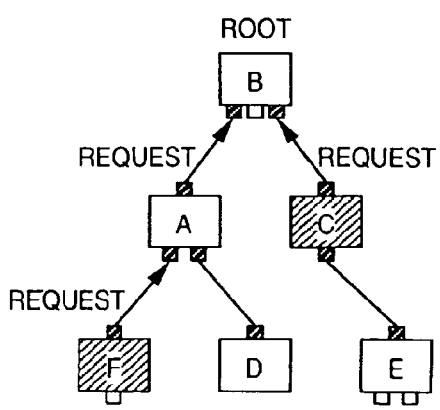
FIGS. 10A and 10B are block diagrams explaining bus arbitration.
Figure 10B:
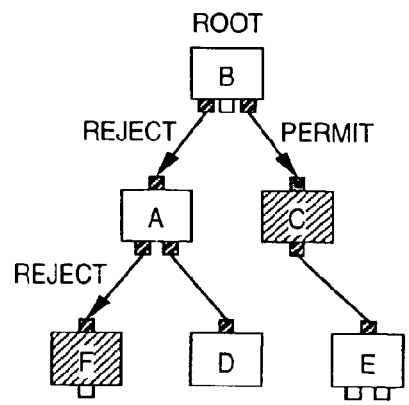

FIGS. 10A and 10B are block diagrams explaining the bus arbitration. FIG. 10A shows operation to request a bus use right; and FIG. 10B, operation to allow to use the bus.

When the bus arbitration is started, a single or plurality of nodes respectively request a bus use right to use the bus to its parent node. In FIG. 10A, the nodes C and F request a bus use right. The parent node (node A in FIG. 10A) that has received the request relays the request by further requesting a bus use right to its parent node. The request is forwarded to a root (node B in FIG. 10A) that finally performs arbitration.

The root that has received the request for bus use right determines a node to be provided with the bus use right. This arbitration can be performed only by the root. The node that dominated in the arbitration is provided with the bus use right. FIG. 10B shows that the node C has obtained the bus use right and the request from node F has been rejected.

The root sends a DP (data prefix) packet to nodes lost in the bus arbitration so as to notify that their requests have been rejected. The requests from those nodes are held by the next bus arbitration.

Thus, the node that obtained the bus use permission starts data transfer.

Figure 11:
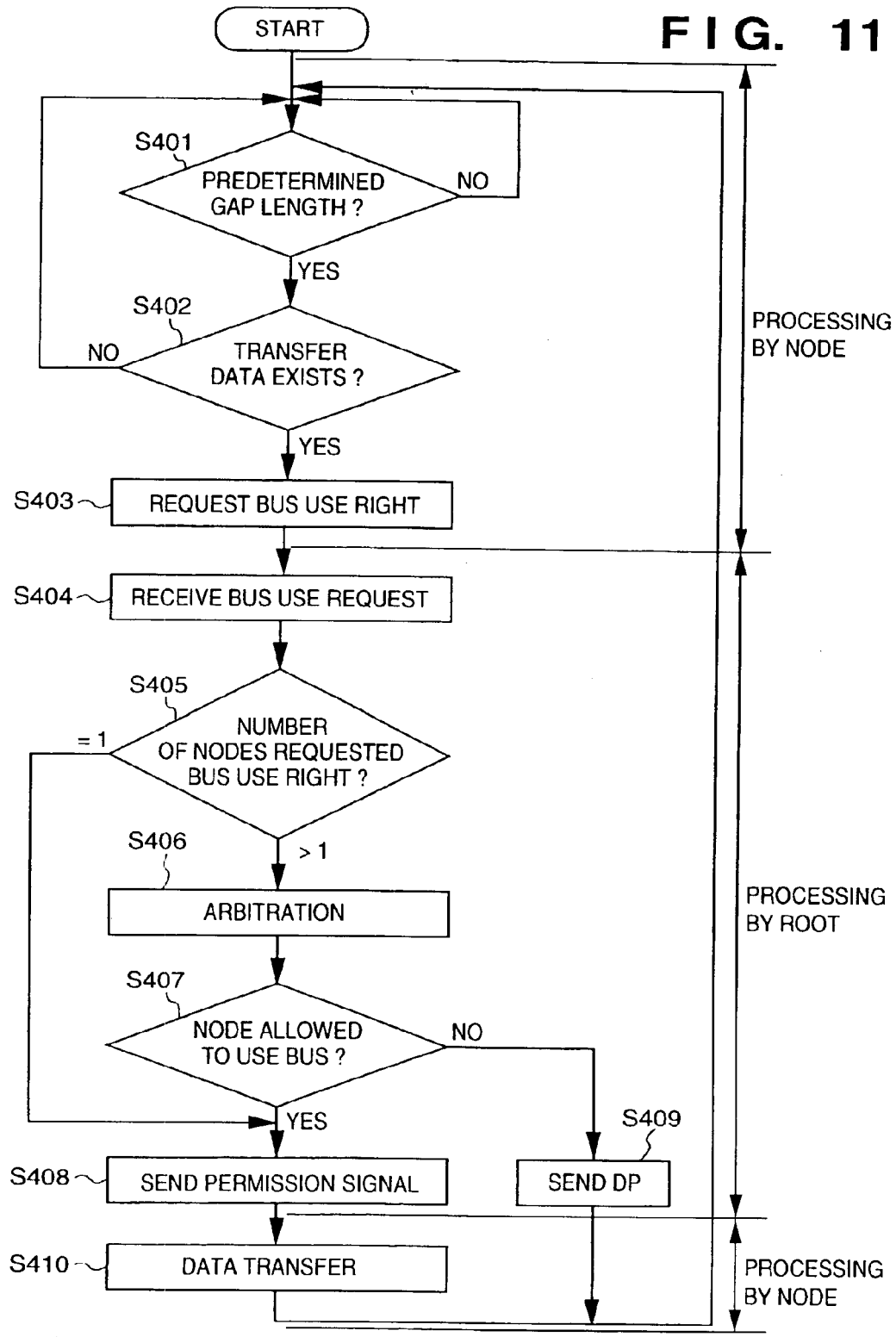
FIG. 11 is a flowchart showing a procedure of the bus arbitration.

The sequence of the bus arbitration will be described with reference to the flowchart of FIG. 11.

To start data transfer by a node, the bus must be in idle status. To confirm that data transfer has been completed and the bus is currently in idle status, each node detects a gap length of a predetermined idle period (e.g., sub-action gap) set in each transfer mode, and it determines whether or not the bus is currently in idle status based on the detection result.

At step S401, the node determines whether or not a predetermined gap length corresponding to asynchronous data or isochronous data to be transferred has been detected. So far as the node has not detected the predetermined gap length, it cannot request a bus use right to start data transfer, accordingly, the node waits until the predetermined gap length has been detected.

When the predetermined gap length has been detected at step S401, the node determines whether or not there is data to be transferred at step S402. If YES, it issues a signal requesting a bus use right to the root at step S403. As shown in FIG. 10A, this signal requesting the bus use right is relayed by the respective devices in the network, and forwarded to the root. If it is determined at step S402 that there is no data to be transferred, the process returns to step S401.

At step S404, if the root has received a single or plurality of request signals for the bus use right, it examines the number of nodes requesting the bus use right at step S405. From the determination at step S405, if the number of the nodes requested the bus use right is one, that node is provided with bus use permission immediately after the requirement. On the other hand, if the number of the nodes is more than one, arbitration is performed to determine one node to be provided with the bus use right immediately after the requirement. The arbitration does not always provide a bus use right to the same node, but equally provides a bus use right to the respective nodes (fair arbitration).

The processing at the root branches at step S407 into processing for the node dominated in the arbitration at step S406, and processing for the other nodes lost in the arbitration. In a case where there is one node that requested the bus use right, or one node has dominated in the arbitration, the node is provided with an permission signal indicative of bus use permission at step S408. The node starts data (packet) transfer immediately after it receives the permission signal (step S410). On the other hand, the nodes lost in the arbitration receive a DP (data prefix) packet indicative of rejection of the bus use request at step S409. The processing for the node that received the DP packet returns to step S401 to request a bus use right again. Also, the processing for the node that completed data transfer at step S410 returns to step S401.

[Transaction Layer]

The transaction layer includes a read transaction, a write transaction and a lock transaction.

In a read transaction, an initiator (requiring node) reads data from a specific address in the memory of a target (response node). In a write transaction, the initiator writes data into a specific address of the memory of the target. In a lock transaction, the initiator transfers reference data and update data to the target. The reference data is combined with data of the address of the target, into a designation address to specify a specific address of the target. Data at the designation address is updated by the update data.

Figure 27A:
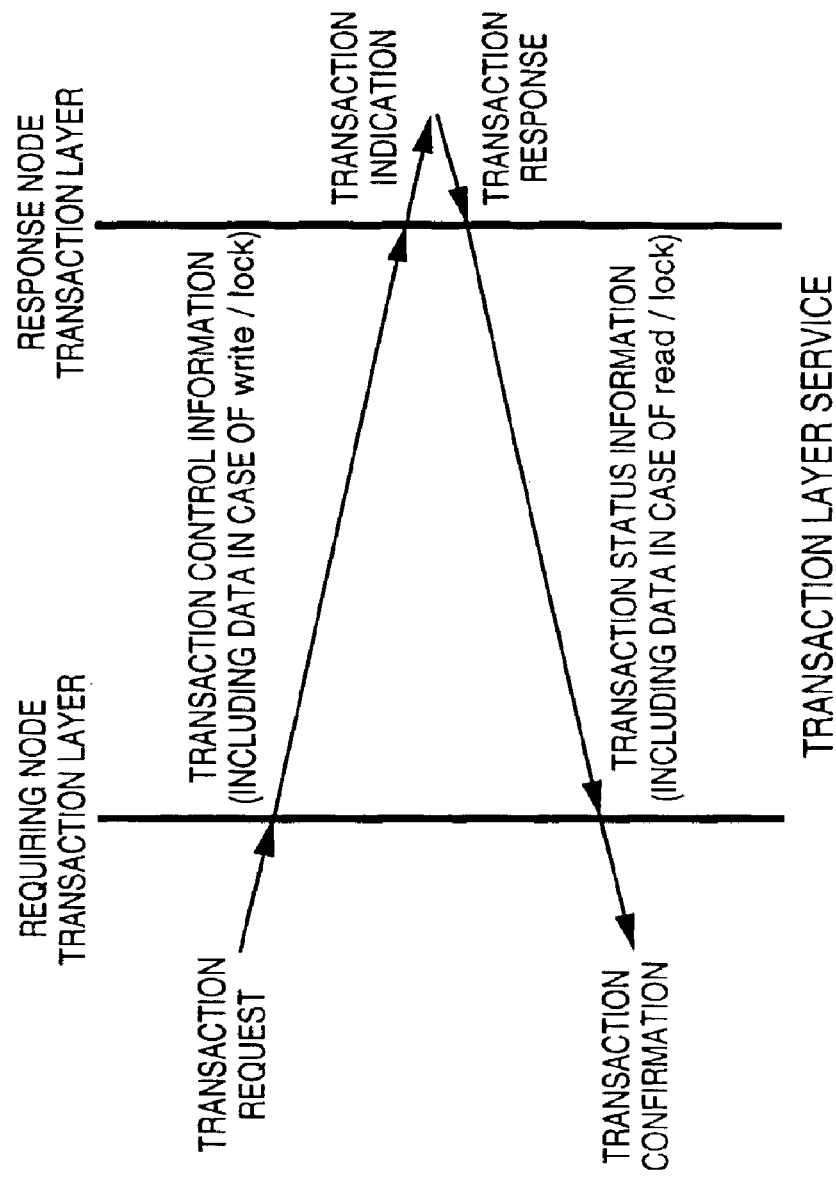
FIG. 27A is a timing chart showing a request-response protocol with read, write and lock commands, based on the CSR architecture in a transaction layer.

FIG. 27A shows a request-response protocol with read, write and lock commands, based on the CSR architecture in the transaction layer. In FIG. 27A, the request, notification, response and confirmation are service units in the transaction layer 814.

A transaction request (TR_DATA.request) is packet transfer to a response node; a transaction indication (TR-DATA.indication) is notification of arrival of the request to the response node; a transaction response (TR_DATA.response) is transmission of acknowledgment; and a transaction confirmation (TR_DATA.confirmation) is reception of acknowledgment.

[Link Layer]

Figure 27B:
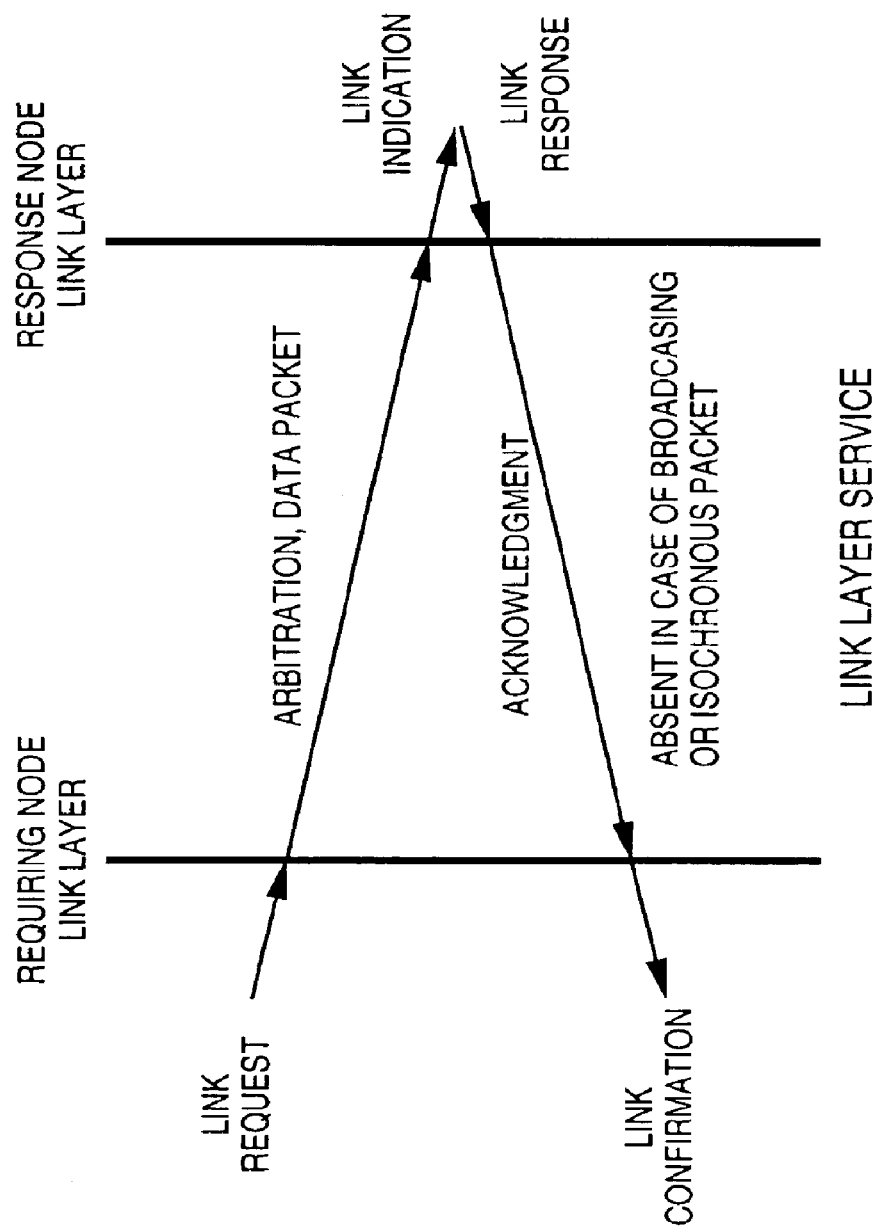
FIG. 27B is a timing chart showing services in a link layer.

FIG. 27B shows services in the link layer 812. The services are service units of a link request (LK_DATA.request) to require packet transfer from the response node, a link indication (LK_DATA.indication) indicating packet reception to the response node, a link response (LK_DATA.response) as acknowledgment transmitted from the response node, a link confirmation (LK_DATA.confirmation) as confirmation of the acknowledgment transmitted from the response node. One packet transfer process is called a sub-action including an asynchronous sub-action and an isochronous sub-action. Hereinbelow, the respective operations of the sub-actions will be described.

[Asynchronous Sub-Action]

The asynchronous sub-action is asynchronous data transfer.

Figure 12:
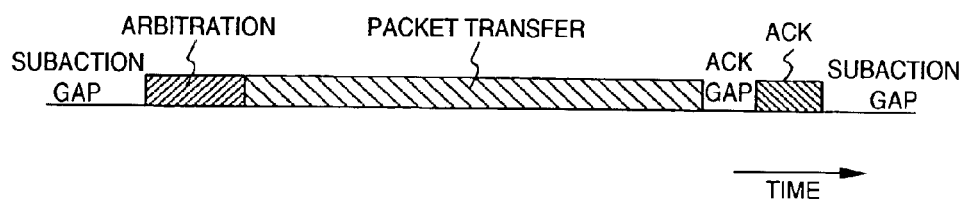
FIG. 12 is a timing chart showing transitional statuses in asynchronous data transfer.

FIG. 12 shows transition in the asynchronous transfer. In FIG. 12, the first sub-action gap represents the idle status of the bus. At a point where the idle time has become a predetermined value, a node which is to perform data transfer requests a bus use right, then bus arbitration is executed.

When the use of bus has been allowed by the arbitration, data in the form of packet is transferred, and a node which receives the data sends a reception acknowledgment code ACK as a response, or sends a response packet after a short gap called ACK gap, thus the data transfer is completed. The code ACK comprises 4-bit information and a 4-bit checksum. The code ACK, including information indicative of success, busy or pending status, is immediately sent to the data-sender node.

Figure 13:
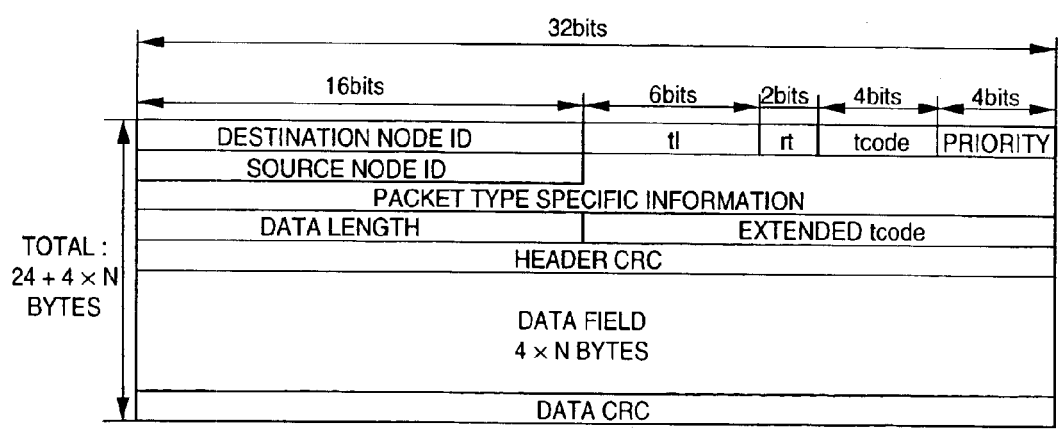
FIG. 13 is a diagram showing a packet format for the asynchronous transfer.

FIG. 13 shows a packet format for asynchronous transfer. The packet has a data area, a data CRC area for error correction, and a header area in which a destination node ID, a source node ID, a transfer data length and various codes are written.

The asynchronous transfer is one-to-one communication from a sender node to a receiver node. A packet sent from the sender node is relayed by the respective nodes in the network, however, as these nodes are not designated as the receiver of the packet, they ignore the packet, then only the receiver node designated by the sender node receives the packet.

[Split Transaction]

The services in the transaction layer 814 are performed as a set of transaction request and transaction response, as shown in FIG. 27A if the processings in the link layer 812 and the transaction layer 814 of the target (response node) are performed at a sufficiently high speed, the request and the response are not performed as independent sub-actions but as one sub-action in the link layer 812. However, if the processing speed of the target is low, the request and the response must be processed by independent sub-actions. This is called a split transaction.

Figure 28A:
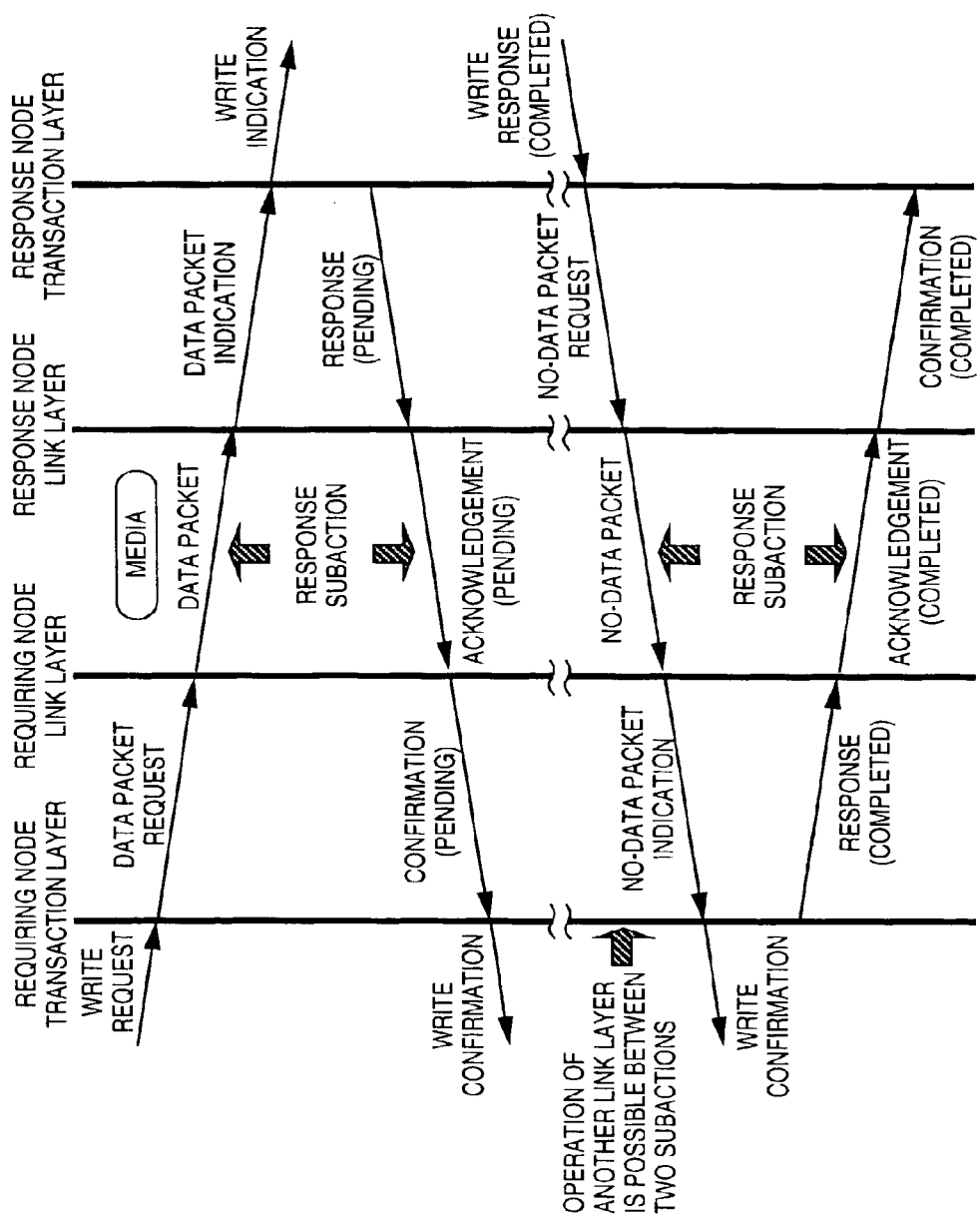
FIG. 28A is a timing chart showing an operation example of a split transaction.

FIG. 28A shows an operation example of the split transaction. In FIG. 28A, in response to a write request from a controller as an initiator (requiring node), a target returns a pending. The target returns confirmation information to the write request from the controller, thus gains time for data processing. When a sufficient period for the data processing has elapsed, the target sends a write response to the controller, thus completes the write transaction. Note that another node can perform the operation of the link layer 812 between the request and response sub-actions.

Figure 28B:
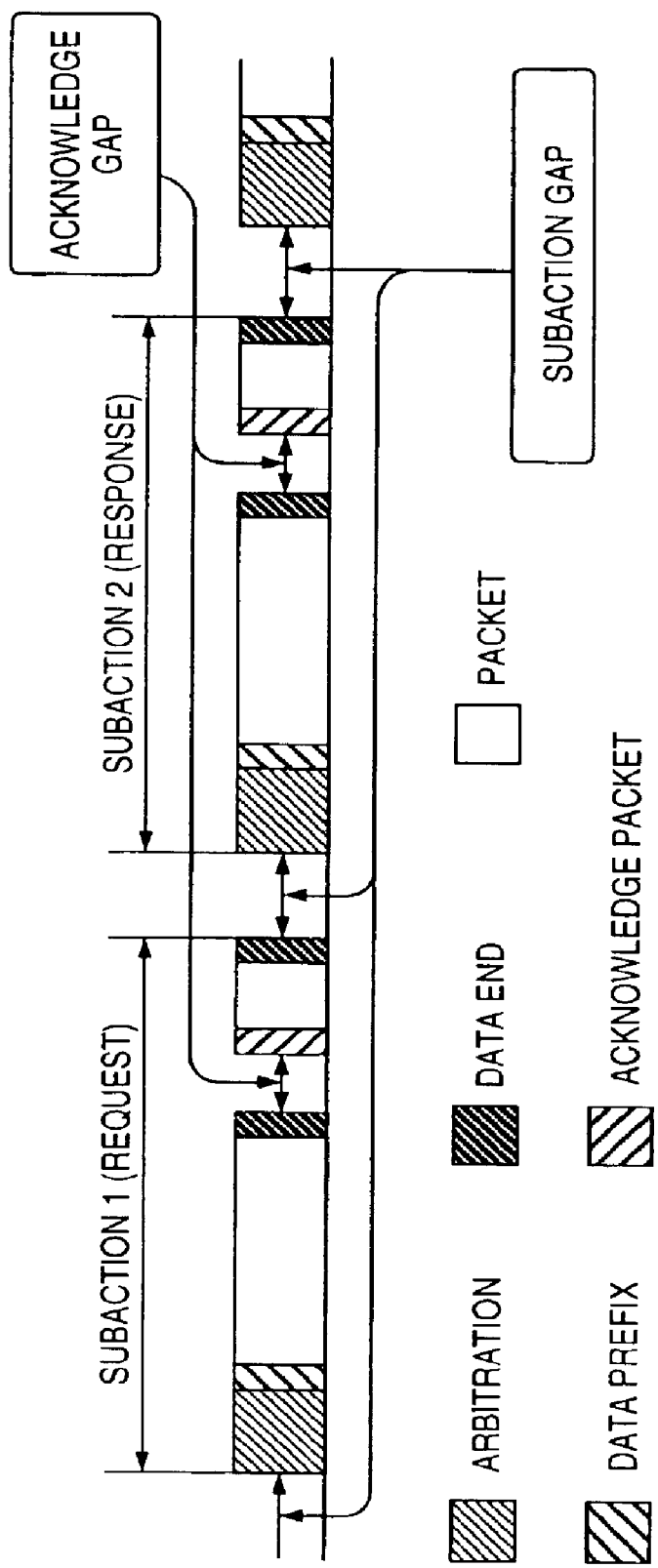
FIG. 28B is an explanatory view showing transitional statuses of transfer by the split transaction.

FIG. 28B shows transitional statuses of transfer in case of the split transaction. In FIG. 28B, a sub-action 1 represents the request sub-action; and a sub-action 2, the response sub-action.

In the sub-action 1, the initiator sends a data packet indicative of the write request to the target, and the target receives the data packet, returns "pending" indicative of the confirmation of the above information, as an acknowledge packet. Then, the request sub-action is completed.

Then, when a sub-action gap has been inserted, the target sends a write response as a data packet with no data, in the sub-action 2. The initiator receives the data packet, returns a "complete" response as an acknowledge packet. Then, the response sub-action is completed.

Note that the period from the completion of the sub-action 1 to the beginning of the sub-action 2 can be minimized to a period corresponding to the sub-action gap, while maximized to a period corresponding to a maximum waiting period set in the nodes.

[Isochronous Sub-Action]

Isochronous transfer, which can be regarded as the greatest feature of the 1394 serial bus is appropriate to multimedia data transfer which requires realtime transfer of, especially, AV data.

Further, the asynchronous transfer is one-to-one transfer, whereas the isochronous transfer is broadcasting transfer from one sender node to all the other nodes.

Figure 14:
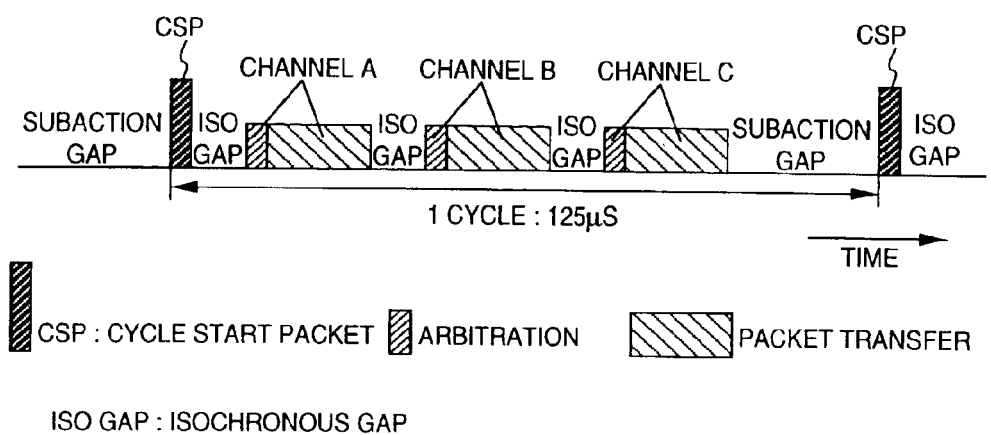
FIG. 14 is a timing chart showing transitional statuses in isochronous data transfer.

FIG. 14 shows transition in the isochronous transfer. The isochronous transfer is executed on the bus in a predetermined cycle, called "isochronous cycle". The period of the isochronous cycle is 125 μs. A cycle start packet (CSP) indicates the start of the isochronous cycle for asynchronizing the operations of the respective nodes. When data transfer in a cycle has been completed and a predetermined idle period (sub-action gap) has elapsed, a node which is called "cycle master" sends the CSP indicative of the start of the next cycle. That is, this interval between the issuance of CSP's is 125 μs.

As channel A, channel B and channel C in FIG. 14, the respective packets are provided with a channel ID, so that plural types of packets can be independently transferred within one isochronous cycle. This enables substantially-realtime transfer among the plural nodes. The receiver node can receive only data with a predetermined channel ID. The channel ID does not indicate an address of the receiving node, but merely indicates a logical number with respect to the data. Accordingly, one packet sent from a sender node is transferred to all the other nodes, i.e., broadcasted.

Similar to the asynchronous transfer, bus arbitration is performed prior to the packet broadcasting in isochronous transfer. However, as the isochronous transfer is not one-to-one communication like the asynchronous transfer, the reception acknowledgment code ACK used as a response in the asynchronous transfer is not used in the isochronous transfer.

Further, an isochronous gap (iso gap) in FIG. 14 represents an idle period necessary for confirming prior to isochronous transfer that the bus is in idle status. If the predetermined idle period has elapsed, bus arbitration is performed with respect to node(s) desiring isochronous transfer.

Figure 15A:
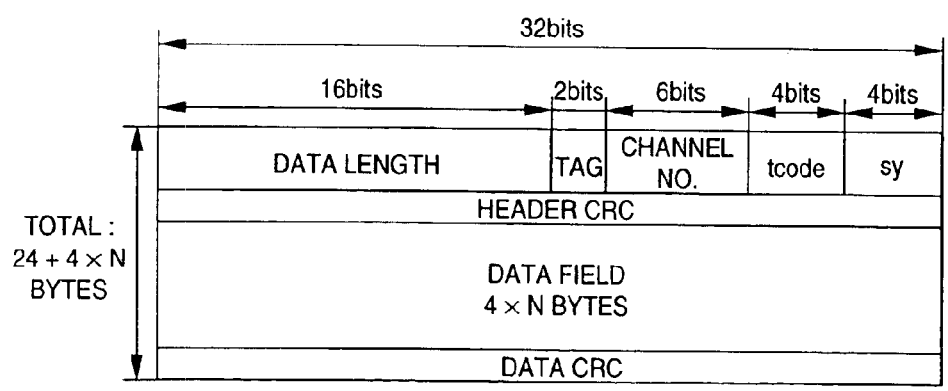
FIG. 15A is an example of a packet format for the isochronous transfer.

FIG. 15A shows a packet format for isochronous transfer. Various packets divided into channels respectively have a data field, a data CRC field for error correction and a header field containing information such as a transfer-data length, a channel No., various codes and error-correction header CRC as shown in FIG. 15B.

[Bus Cycle]

Figure 16:
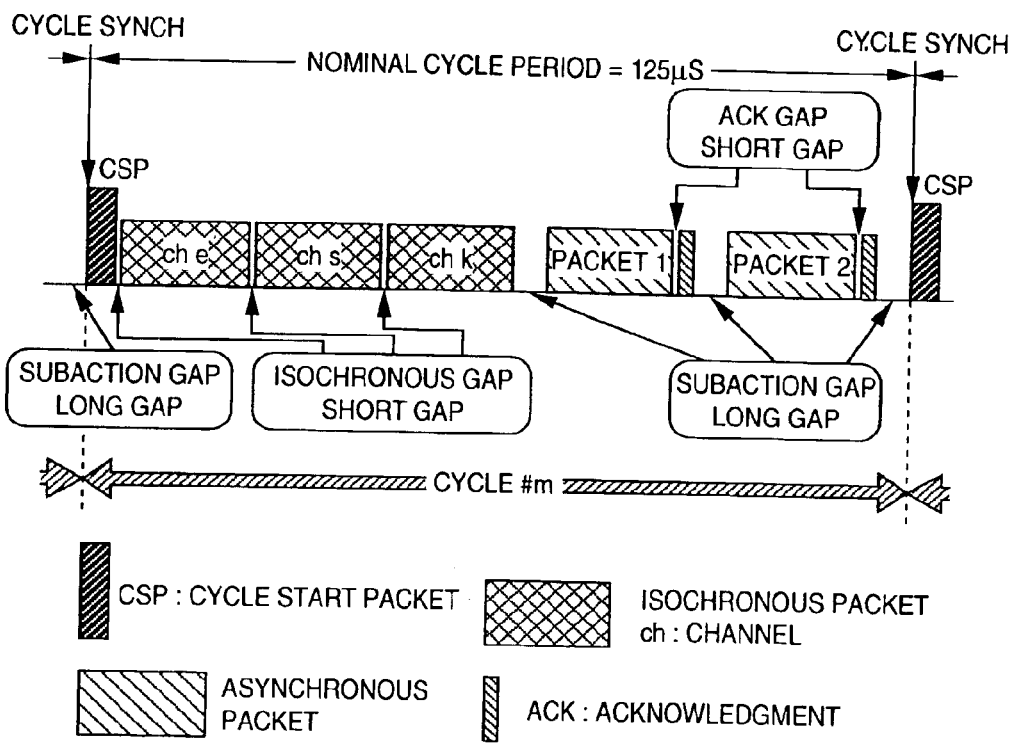
FIG. 16 is a timing chart showing transitional statuses in data transfer on the bus when the isochronous transfer and asynchronous transfer are mixedly performed.

In practice, both isochronous transfer and asynchronous transfer can be mixedly performed on the 1394 serial bus. FIG. 16 shows transition in the isochronous transfer and asynchronous transfer mixedly performed on the 1394 serial bus.

The isochronous transfer is performed prior to the asynchronous transfer because after the CSP, the isochronous transfer can be started with a gap (isochronous gap) shorter than the idle period necessary for starting the asynchronous transfer. Accordingly, the isochronous transfer has priority over the asynchronous transfer.

In the typical bus cycle as shown in FIG. 16, upon starting the cycle #m, a CSP is transferred from the cycle master to the respective nodes. The operations of the respective nodes are asynchronized by this CSP, and node(s) that waits for a predetermined idle period (isochronous gap) to perform isochronous transfer participates in bus arbitration, then starts packet transfer. In FIG. 16, a channel e, a channel s and a channel k are transferred by the isochronous transfer.

The operation from the bus arbitration to the packet transfer is repeated for the given channels, and when the isochronous transfer in the cycle #m has been completed, the asynchronous transfer can be performed. That is, when the idle period has reached the sub-action gap for the asynchronous transfer, node(s) that is to perform the asynchronous transfer participates in bus arbitration. Note that only if the sub-action gap for starting the asynchronous transfer is detected, after the completion of isochronous transfer and before the next timing to transfer the CSP (cycle synch), the asynchronous transfer can be performed.

In the cycle #m in FIG. 16, the isochronous transfer for three channels is performed, and then two packets (packet 1 and packet 2) including ACK are transferred by the asynchronous transfer. When the asynchronous packet 2 has been transferred, as the next cycle synch point to start the subsequent cycle m+1 comes, the transfer in the cycle #m ends. Note that during the asynchronous or isochronous transfer, if the next cycle synch point to transfer the next CSP has come, the transfer is not forcibly stopped but continued. After the transfer has been completed, a CSP for the next cycle is transferred after a predetermined idle period. That is, when one isochronous cycle is continued for more than 125 µs, the next isochronous cycle is shorter than the reference period 125 µs. In this manner, the isochronous cycle can be lengthened or shortened based on the reference period 125 µs.

However, it may be arranged such that the isochronous transfer is performed in every cycle, while the asynchronous transfer is sometimes postponed until the next cycle or the cycle further subsequent to the next cycle, so as to maintain realtime transfer. The cycle master also manages information on such delay.

[FCP]

In an AV/C protocol, a Function Control Protocol (FCP) is provided to control devices on the 1394 serial bus. For transmission of control commands and responses in the FCP protocol, an asynchronous packet defined by the IEEE 1394 standards is employed. In the FCP protocol, a node on the controller side is called a controller, and a node on the controlled side, a target. An FCP packet frame sent from the controller to the target is called an AV/C command frame; an FCP packet frame returned from the target to the controller, an AV/C response frame.

FIG. 29 shows a case where a node A is a controller and a node B is a target. In the register address provided for the respective nodes, 512 bytes from "0x0000B00" are assigned to a command register; and 512 bytes from "0x0000D00" are assigned to a response register. Data is written into the register of a designated address by a packet frame using the asynchronous transfer. The relation between the transmission of the AV/C command frame by the controller and the response with the AV/C response frame by the target is called an AV/C transaction. In a general AV/C transaction, a target which has received a command frame must send a response frame to a controller within 100 ms.

Figure 30:
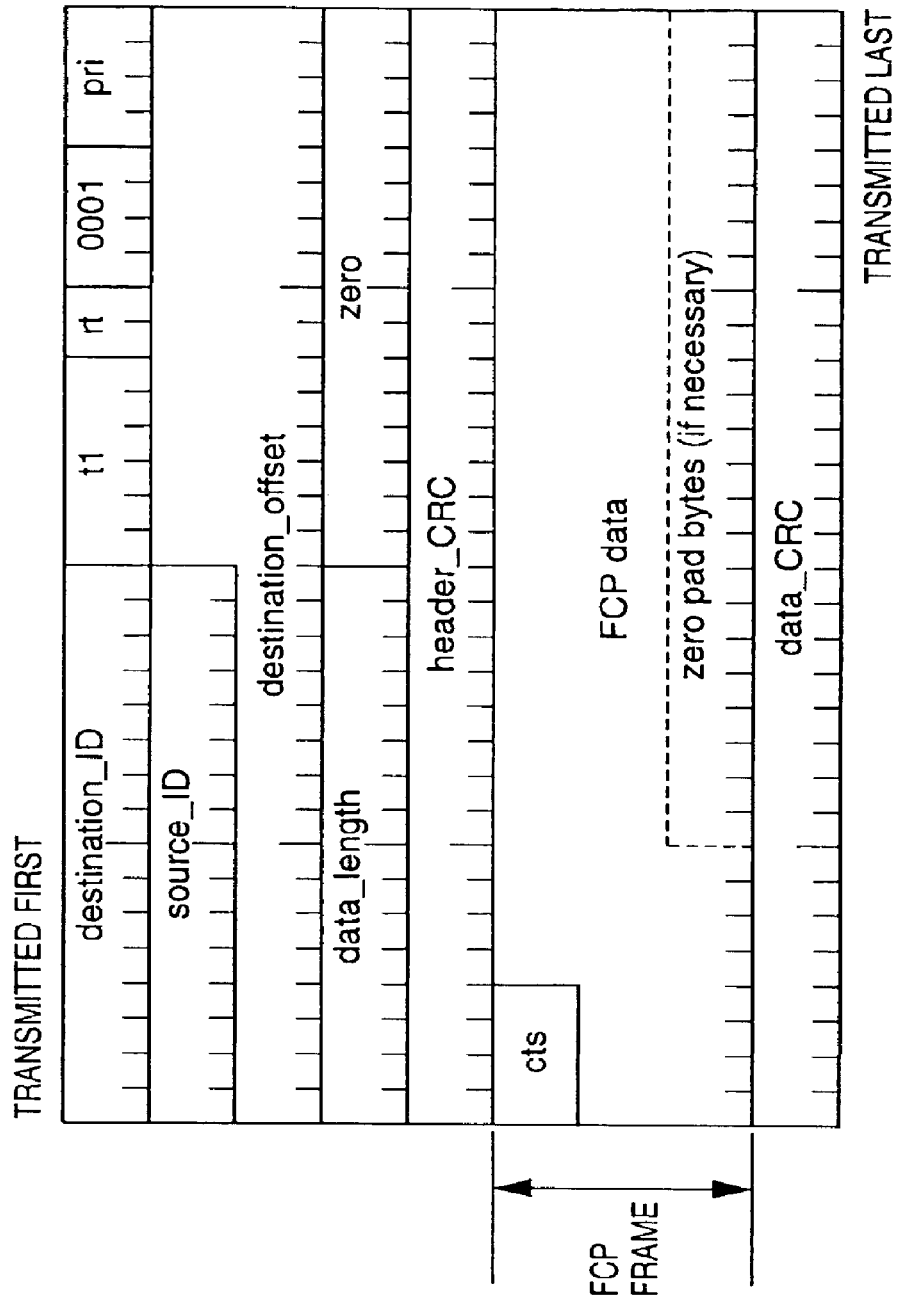
FIG. 30 is an example of the packet format for the asynchronous transfer including an FCP packet frame.

FIG. 30 shows the packet format for the asynchronous transfer including an FCP packet frame. A command frame or a response frame is inserted into a data area of the asynchronous data packet as shown in FIG. 15A, and the AV/C transaction is performed.

Figure 31:
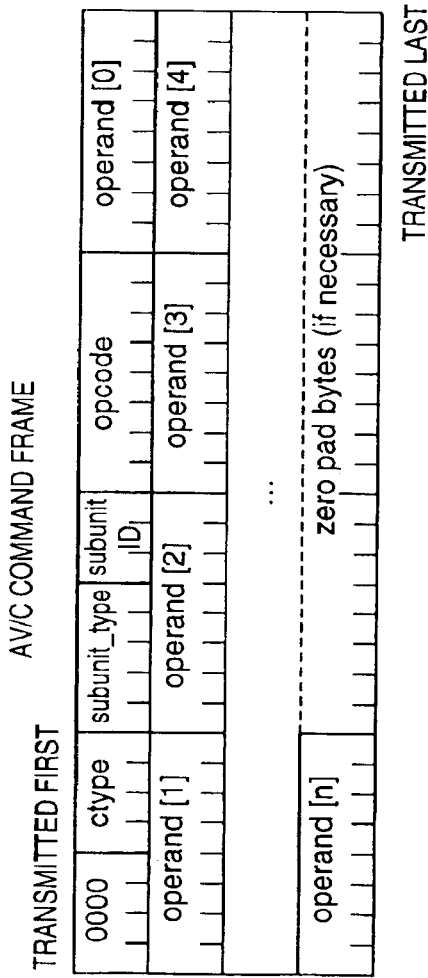
FIG. 31 is an example of the structure of an AV/C command frame.
Figure 32:
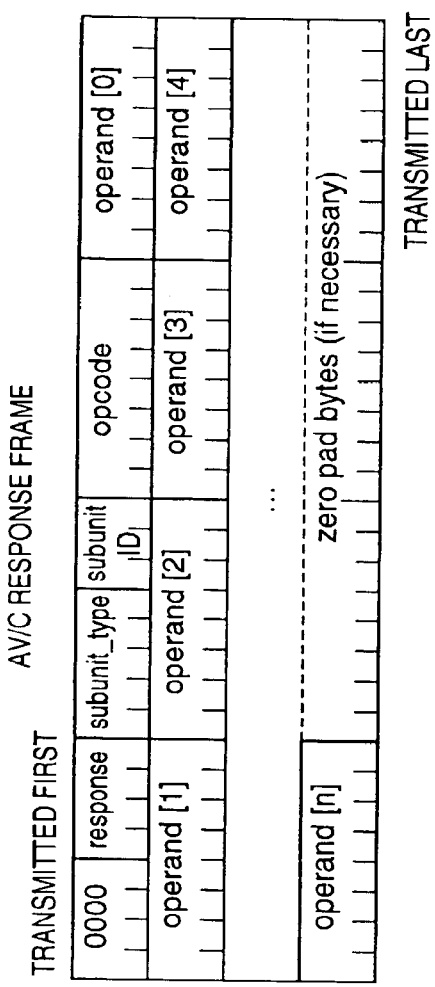
FIG. 32 is an example of the structure of an AV/C response frame.

FIG. 31 shows the structure of the AV/C command frame. FIG. 32 shows the structure of the AV/C response frame. As the FCP packet frame, an FCP data part is arranged after "ctype", "response", "subunit_type" and "subunit_ID" in the header.

"ctype" indicates a command type in the command frame, with status "CONTROL", "STATUS", "INQUIRY" or "NOTIFY".

"response" indicates a response code in the response frame, with status "ACCEPTED", "REJECTED", "IN_TRANSITION", "IMPLEMENTED", "CHANGED" or "INTERIM".

Further, "subunit_type" indicates the classification of a device, and "subunit_ID" indicates an instance number.

The FCP data part has an operation code (opcode)+ operand (oprand) structure. The target is controlled and the AV/C response is performed by using various AV/C commands.

The operation code (opcode) in the command frame as shown in FIG. 31 is one of commands as shown in FIG. 41.

The respective commands are performed with contents according to the command types set at the "ctype".

A command where the "ctype" designates the status "CONTROL" is a control command used for controlling the target device or setting the target to the content set after the operand (oprand). A command where the "ctype" designates the status "STATUS" is used for obtaining a status corresponding to the command. A command where the "ctype" designates the status "INQUIRY" is used for inquiring about contents which can be set by the command. A command where the "ctype" designates the status "NOTIFY" is used for performing confirmation of the command.

In each command, necessary content is set at the operand, and the command is written into the command frame.

In the operation code of the response frame, one of response codes as shown in FIG. 41 is set. Each response has an operand corresponding to the response. As information indicating whether the execution of the command has been normally completed or ended with error, is set at the operand, error processing can be performed in accordance with the operand.

[Communication Using LOGIN Protocol]

Figure 17:
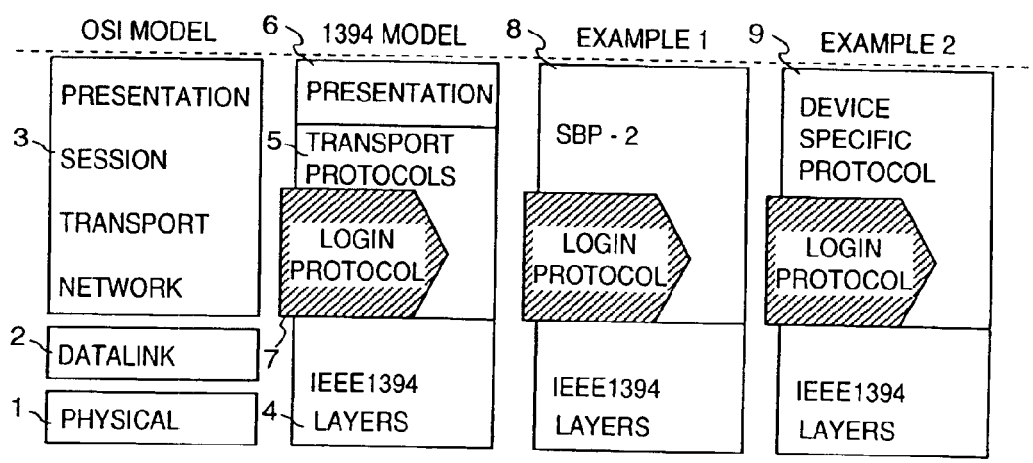
FIG. 17 is a schematic view showing the IEEE 1394 serial interface in comparison with an OSI model.

FIG. 17 shows the interface of the 1394 serial bus in comparison with respective layers of an OSI model often used in a LAN. In the OSI model, a physical layer 1 and a data link layer 2 respectively correspond to a physical layer 811 and a link layer 812 (both shown in FIG. 2) in a lower layer 4 of the 1394 serial bus interface. In the 1394 serial bus interface, a transport protocol layer 5 and a presentation layer 6 as upper layers correspond to an upper layer 3 of OSI model including a network layer, a transport layer, a session layer and a presentation layer. Further, a LOGIN protocol 7, operates between the lower layer 4 and the transport protocol layer 5 of the 1394 serial bus interface.

In Example 1 in FIG. 17, by providing the LOGIN protocol 7 to a device based on a serial bus protocol (SBP-2) 8 for a peripheral device such as a printer, the peripheral device uses a protocol based on the protocol SBP-2 to notify a target device of data transfer with the target device. In Example 2, with respect to a device protocol 9 specialized on the 1394 serial bus interface, by providing the LOGIN protocol 7 to respective devices, the devices can determine whether or not the target device supports their protocol, with each other.

Figure 18:
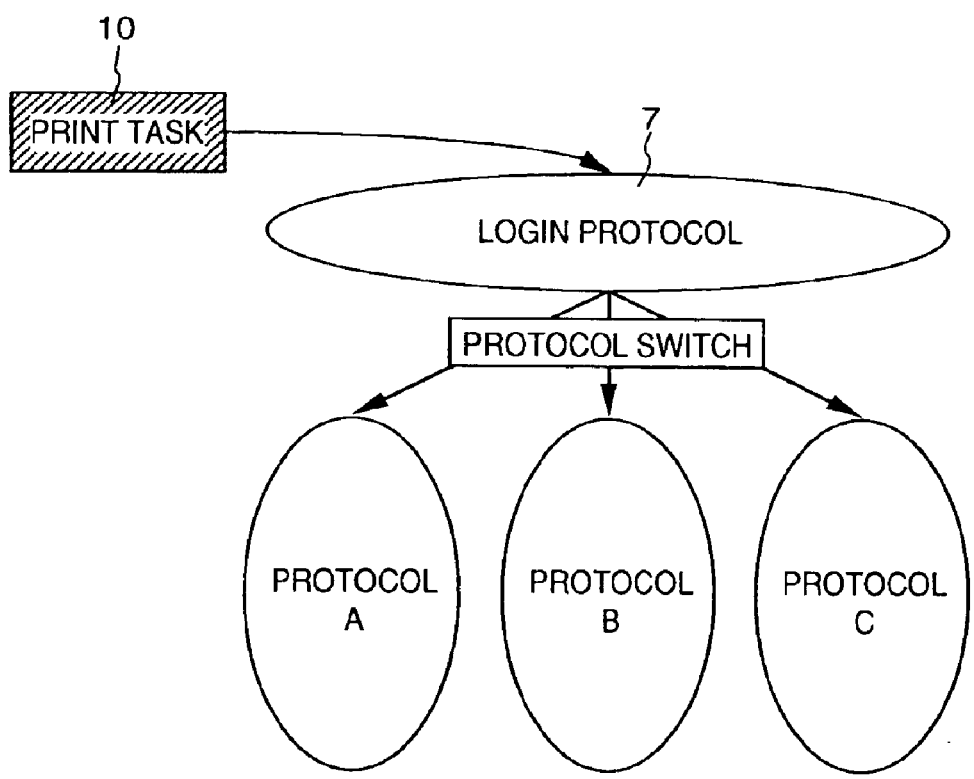
FIG. 18 is an explanatory view showing the basic operation of a LOGIN protocol.

FIG. 18 shows the basic operation of the LOGIN protocol. When a printer device executes a print task 10 from a host device, the printer device first selects one of printer protocols A to C for data communication, based on communication by the LOGIN protocol 7. Thereafter, the printer device performs print data transfer in accordance with the selected printer protocol. That is, upon connection between the printer device which supports a plurality of printer protocols and a host device, the printer device first judges the transport protocol 5 of the host device based on the LOGIN protocol 7, selects a printer protocol corresponding to the transport protocol 5 of the host device, and performs transfer/reception of print data or commands in accordance with the selected printer protocol, thus performs the print task 10.

Figure 19:
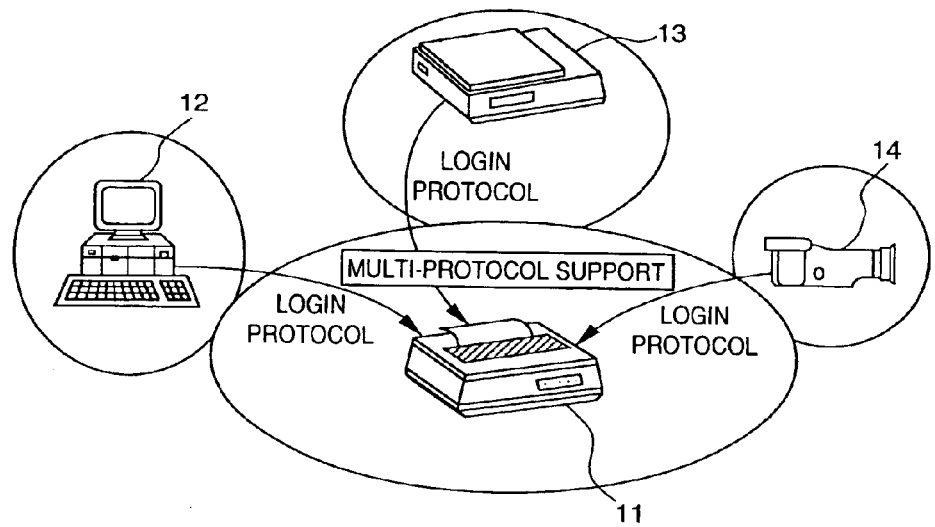
FIG. 19 is an explanatory view showing connection status in the IEEE 1394 serial interface.

FIG. 19 shows connection status in the 1394 serial bus, where devices (PC12, scanner 13 and VCR 14 etc.) with the LOGIN protocol 7 are connected to a printer 11 corresponding to plurality of printer protocols. The printer 11 can process print tasks from the respective devices by changing the printer protocol in accordance with the transport protocol 5 of a device that requests connection with the printer device.

Figure 20:
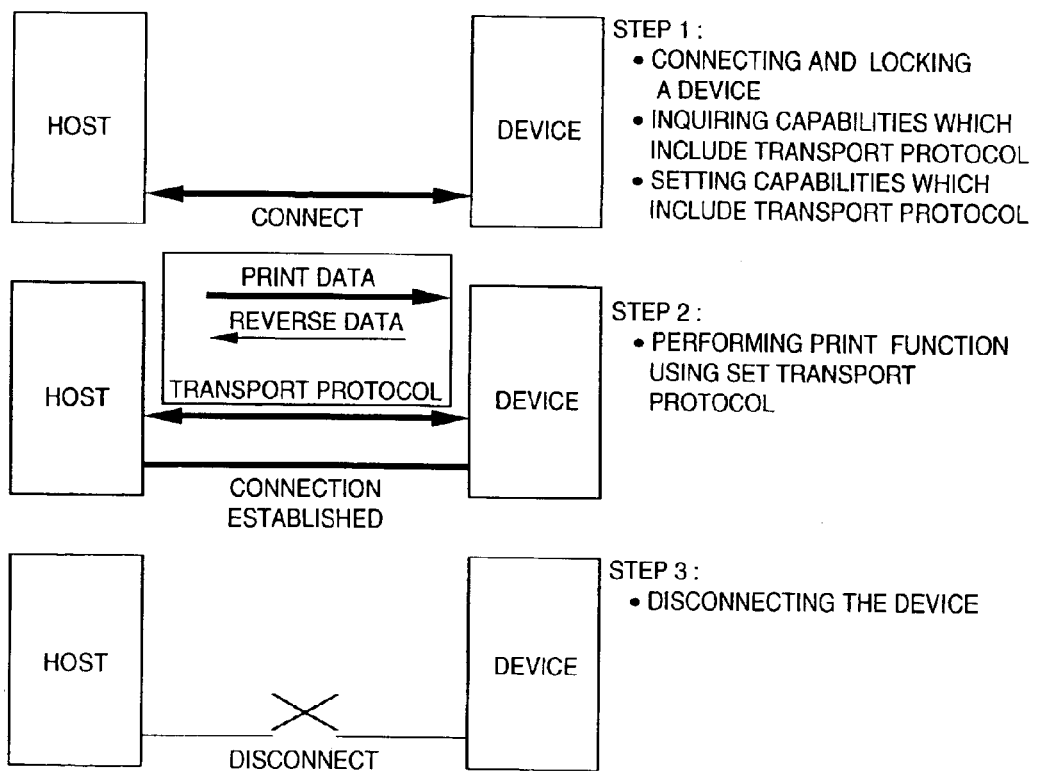
FIG. 20 is a timing chart showing the flow of log-in operation.

FIG. 20 shows the flow of log-in operation.

At STEP 1:

The host device locks a target device (a multi-protocol printer in this case).

The target device examines the capability of the host device (including the transport protocol). Note that the capability has been stored into a capability register 503 (to be described later) of the host device.

The target device sets the capability (including the transport protocol) of the host device.

At STEP 2:

Print data is transferred by the protocol determined at the STEP 1.

At STEP 3:

The host device disconnects the connection with the target device.

Figure 21:
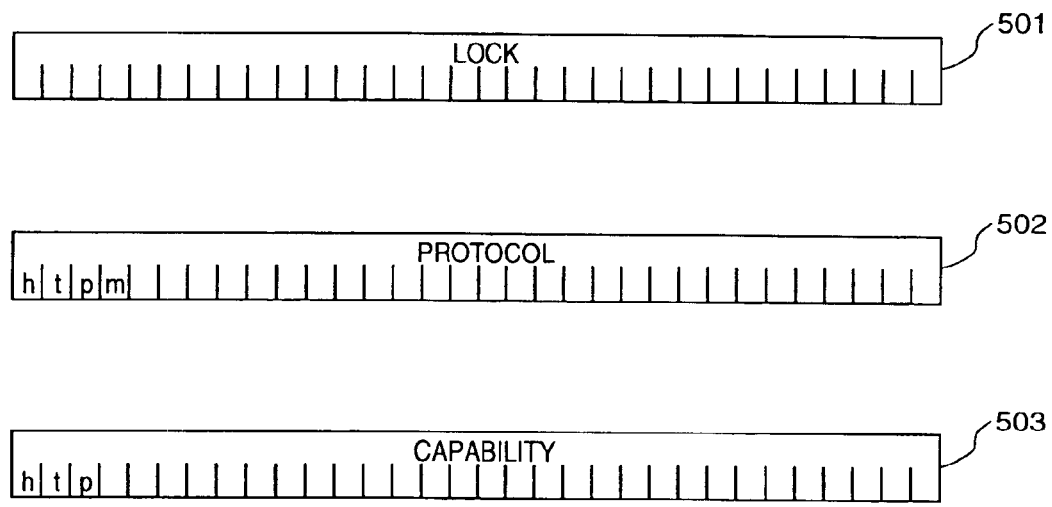
FIG. 21 is a schematic view showing a CSR preparing respective devices.

FIG. 21 shows control/status register (CSR) which is prepared by a printer as the target device so that the LOGIN protocol is installed, including a lock register 501, a protocol register 502 and the capability register 503. These registers are provided in predetermined addresses in initial unit space in the address space of the 1394 serial bus. That is, as shown in FIG. 3, within the 48-bit address area provided to the devices, "0xFFFFF" in the first 20 bits is called "register space", wherein a register (CSR core) as the core of the CSR architecture is arranged in the first 512 bytes. Note that information common to devices connected via the bus is provided in this register space. Further, "0-0xFFFFD" is called "memory space", and "0xFFFFE", "private space". The private space is an address which can be freely used in the device for communication among the devices.

The lock register 501 indicates a locked status of a resource, with a value "0" indicative of log-in enable status, and any value but "0", an already-logged-in and locked status. The capability register 503 indicates a protocol where each bit represents a protocol, with a value "1" bit indicating that a corresponding protocol can be set, while a value "0" bit, that a corresponding protocol cannot be set. The protocol register 502 indicates a currently set protocol. That is, each bit of the protocol register 502 corresponds to each bit of the capability register 503, and the value of a bit of the protocol register 502 corresponding to the set protocol is "1".

Figure 22:
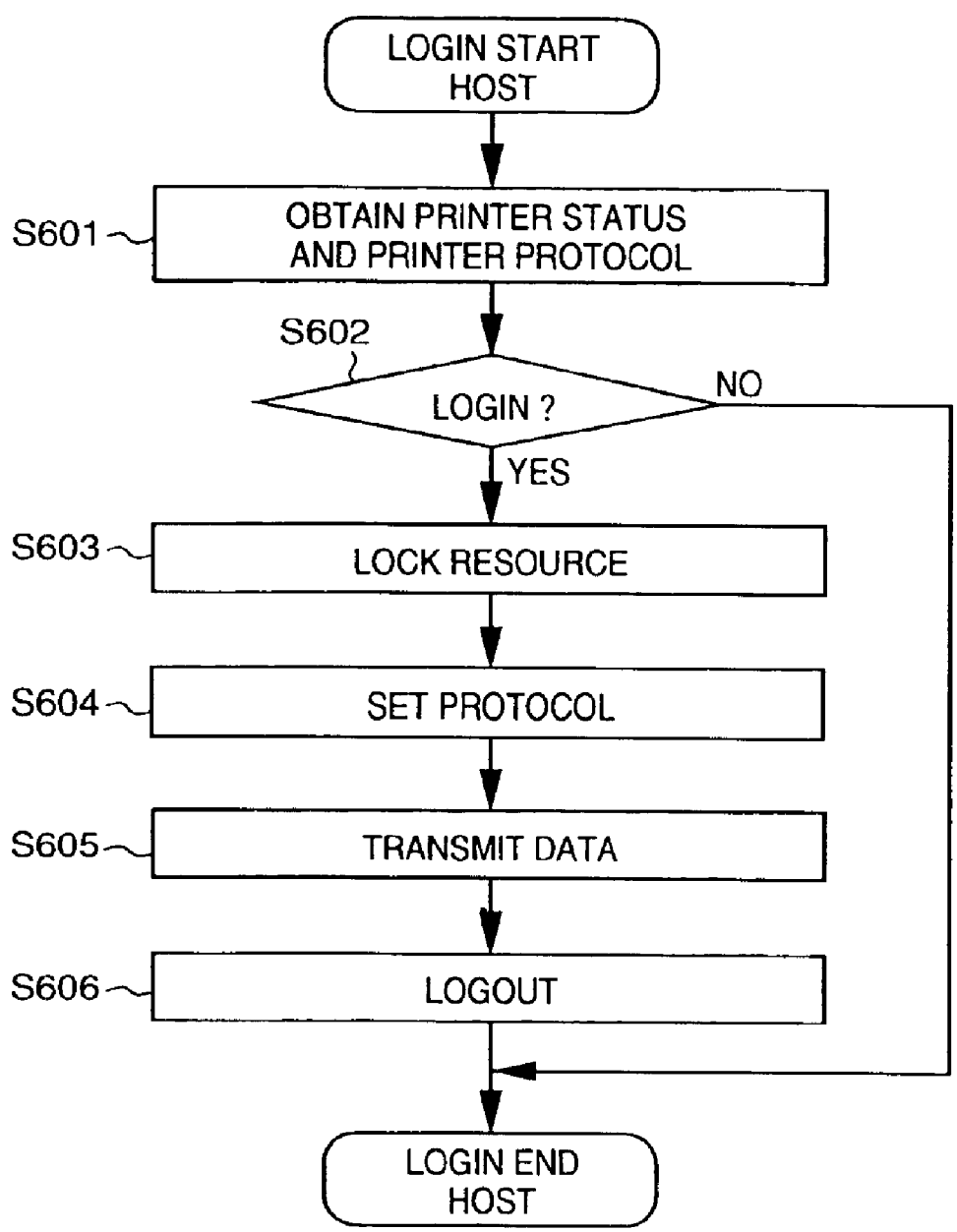
FIG. 22 is a flowchart showing LOGIN processing in a host device.

FIG. 22 is a flowchart showing LOGIN processing in the host device.

To start the LOGIN processing, first, the data of the lock register 501, the protocol register 502 and the capability register 503 of a target device e.g., a printer, to be logged-in, is checked by a read transaction. At this time, from the data of the capability register 503, it is examined whether or not the target device supports a protocol used by the host device for communication (step S601). If the target device does not support the protocol of the host device, the LOGIN processing is terminated at step S602.

Further, if the data value of the lock register 501 is not "0", it is determined that another device is in logged-in status, and the LOGIN processing is terminated. If the data value of the lock register 501 is "0", it is determined that log-in is currently possible (step S602).

In case of log-in enable status, the process moves to resource lock processing where the log-in is set by writing "1" into the lock register 501 of the printer by using a lock transaction (step S603). The target device is locked in this status, and it is S uncontrollable from other devices and the register values cannot be changed.

As described above, in the status where the resource of the target device is locked, protocol setting is performed next. As the printer as the target device of the present embodiment supports a plurality of printer protocols, the printer must be informed of the protocol which can be used by the host device before it receives print data. In the present embodiment, the protocol to be used is notified to the printer by setting the corresponding bit of the protocol register 502 of the printer by a write transaction (step S604).

At this point, as the protocol used by the host device for communication has been notified to the target device and the target device is in locked status, the host device that is currently logged in the target device performs data (print data in this case) transfer (step S605).

As the data transfer has been completed, the host device logs out from the printer by clearing the lock register 501 and the capability register 503 of the target device (step S606).

Figure 23:
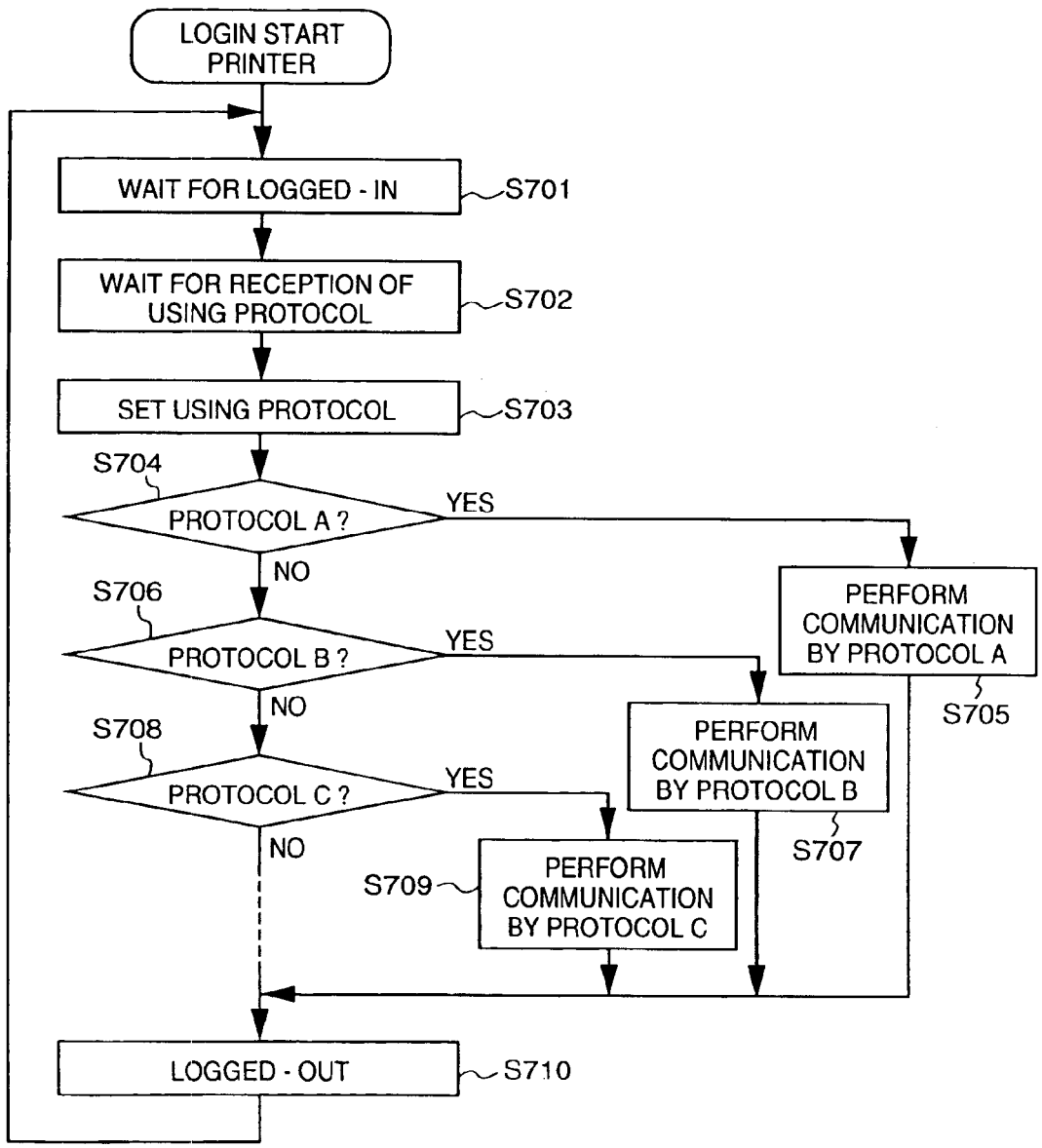
FIG. 23 is a flowchart showing LOGIN processing in a target device.

FIG. 23 is a flowchart showing the LOGIN processing in the printer as the target device.

The printer generally waits for log-in from a host device. As a print request from a host device is started by reading data values from the lock register 501, the protocol register 502 and the capability register 503 of the printer, the registers must be in read-enable status. This processing will be described on the assumption that a host device which is to perform printout has locked the printer (step S701).

The printer waits for notification of an available protocol from the host device (step S702). The printer receives the notification of available protocol in locked status so as to maintain the protocol register 502 unchanged by another device's request in mid-course of the log-in processing.

When the available protocol has been assigned (step S703), the printer switches its own protocol to the notified protocol (steps S704, S706 and S708), and performs communication in accordance with the protocol of the host device (steps S705, S707 and S709).

When the communication has been completed, the printer confirms that the lock register 501 and the capability register 503 have been cleared (step S710), and returns to the log-in waiting status (step S701).

[Example in Consideration of Device without LOGIN Protocol]

Figure 24:
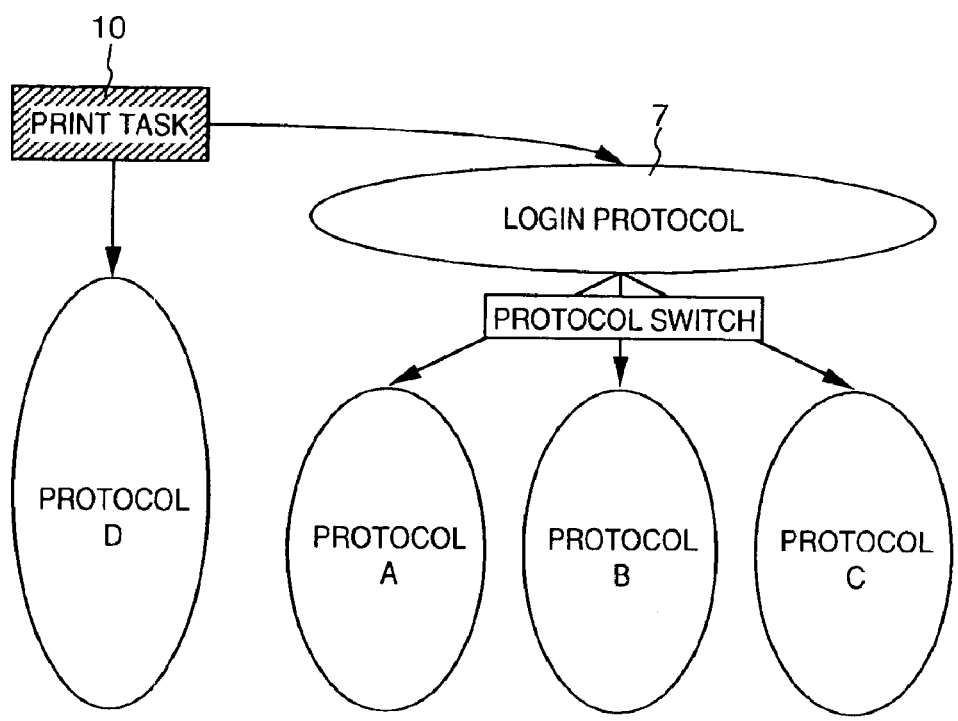
FIG. 24 is an explanatory view showing a case in consideration of a device without the LOGIN protocol.

FIG. 24 is an explanatory view showing a case in consideration of a device without the LOGIN protocol 7. Compared with the first example as shown in FIG. 18, this example is applicable to a device having a protocol D in which the LOGIN protocol 7 is not installed. That is, to assure the device only corresponding to the conventional protocol D (e.g., AV/C protocol) of print operation, as well as devices having the LOGIN protocol 7, the printer side has the protocol D.

In this case, if the printer recognizes, by a print request performed at the beginning of connection, that the host device does not correspond to the LOGIN protocol 7, the printer tries communication with the host device by using the protocol D, and if the communication can be established, the printer executes the print task 10 in accordance with the protocol D.

Figure 25:
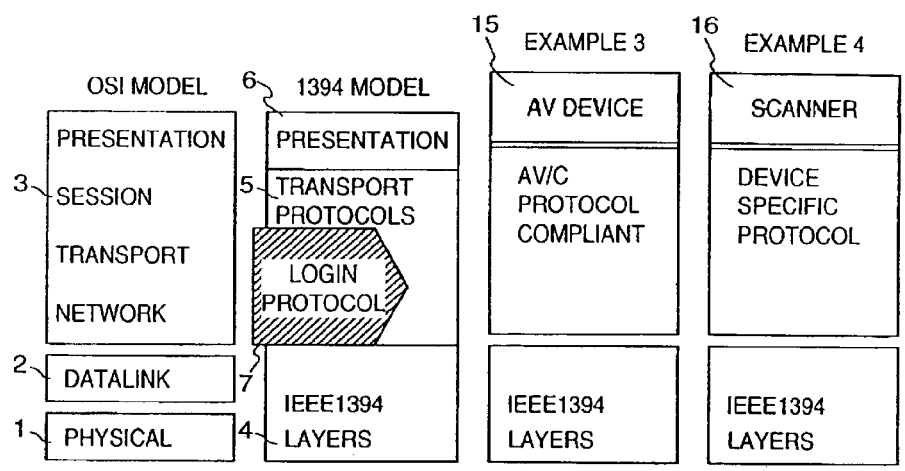
FIG. 25 is a schematic view showing the IEEE 1394 serial interface in comparison with an OSI model, in the second embodiment.

FIG. 25 shows the IEEE 1394 serial interface according to this example in comparison with the OSI model. Example 3 uses, as a model, an AV device 15 based on the AV/C protocol. In the AV device 15, the LOGIN protocol 7 is not installed. Example 4 uses, as a model, a scanner 16, in which the LOGIN protocol 7 is not installed, but a non-standard protocol for scanner is installed.

That is, regarding a device in which the LOGIN protocol 7 is not installed, if the printer can perform communication using the protocol of the device, the printer can perform print task from the device. This increases the types of devices that can use the printer.

[Direct Print Control]

Hereinbelow, print procedures in the printer and the image providing device will be described. In this case, a Direct Print Protocol (DPP), is employed as a protocol to directly connect the printer and the image providing device, and enable the printer to form an image based on image data provided from the image providing device.

The DPP protocol basically comprises a command register (command) for writing a command in the initial unit space (the unit space in FIG. 3), a response register (response) for writing a response to the command, a data register (data) for writing transfer data, and a format register (format) for handling format information corresponding to data format for each transfer data.

FIG. 33 shows a register map in which the command register and the response register are the same as those described in FIG. 29. In the following description, the image providing device as a controller provides image data to the printer as a target and an image is printed based on the image data.

A command register 42-1, arranged from a fixed address "0xFFFFF0000B00" on the printer side, has a 512 byte memory space into which the image providing device writes various commands for the printer. If the image providing device side also has a command register, the printer can write commands into the register. The command written into the command register is called a command frame.

A response register 42-2, arranged from fixed address "0xFFFFF0000D00", has a 512 byte memory space into which a response is written with respect to the various commands written from the image providing device to the printer. If the printer side also has a response register, the image providing device can write a response into the register. The response written into the response register 42-2 is called a response frame. Note that in FIG. 29, the upper address part "0xFFFF" is omitted.

A data register 42-3, having a default address "FFFFF0003000h", is set at an arbitrary effective address by commands "BlockAddress" and "BufferConfig" (commands to define the address of the data register). The memory space of the data register 42-3 is set with a range predetermined by commands "BlockSize" and "BufferConfig" (commands to define the memory space of the data register). The data register 42-3 is used for data transfer between the image providing device and the printer. Upon printing, the image providing device writes print data for the printer into this register. The print data is based on a pre-set image format. The data written into the data register 42-3 is called a data frame.

A format register 42-2 is a set of registers corresponding to various data formats to be described later. The respective registers are used for setting format information necessary for the respective data formats. That is, the format register 42-2 is used for writing the format information for the printer from the image providing device. The format information written into the format register 42-2 is called a format frame.

Figure 34:
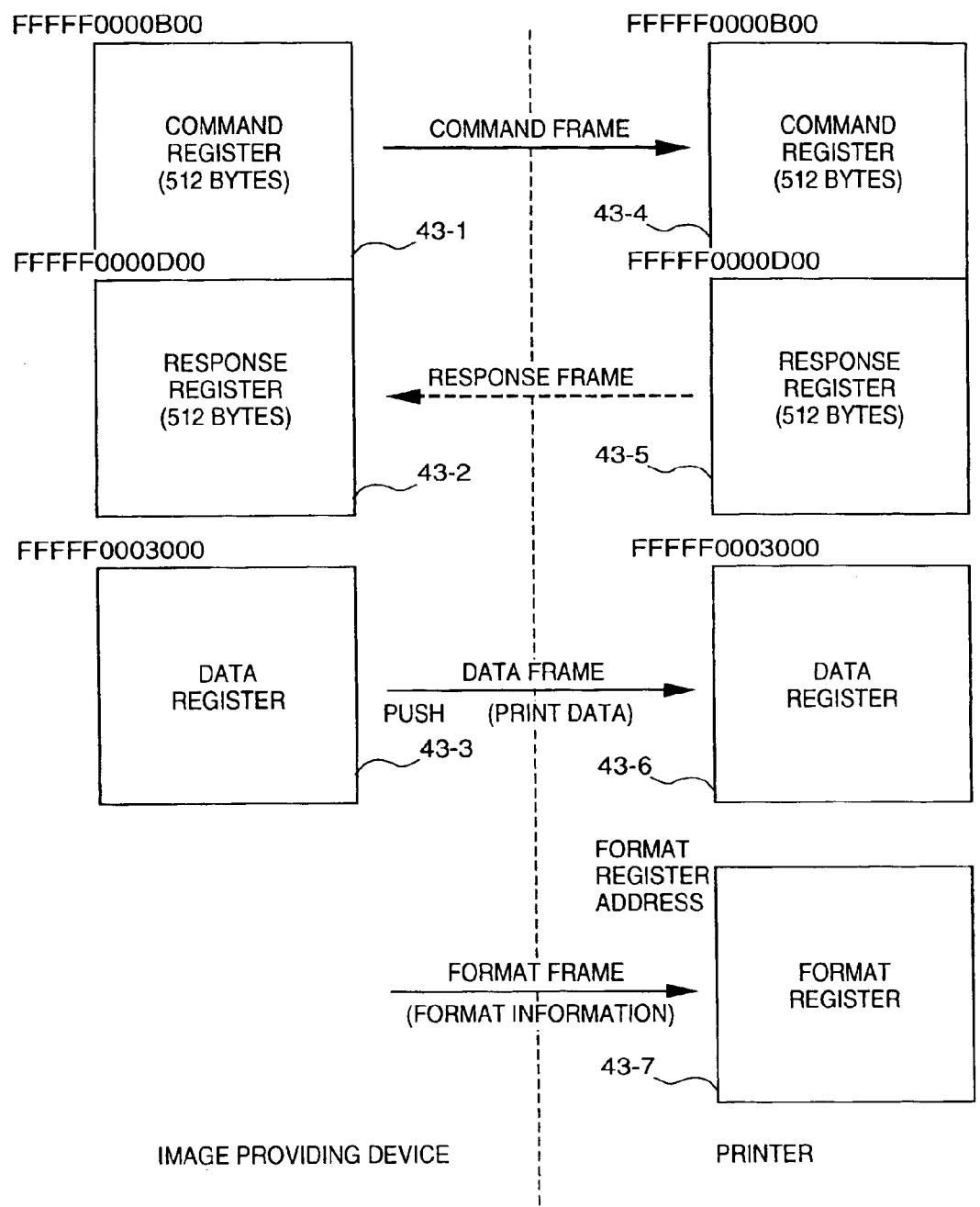
FIG. 34 is an explanatory view showing the flow of frames from an image providing device to the printer.

FIG. 34 shows the flow of frames from the image providing device to the printer, i.e., shows the flow of the command frame, the response frame, data frame and the format frame. The printer performs printing in accordance with the frames outputted from the image providing device.

A command sent from the image providing device to the printer is written as a command frame into a command register 43-4 of the printer. The command is used for printing, as shown in FIG. 41. A response to this command is written by the printer into a response register 43-2 of the image providing device. The response includes information indicating whether or not the command has been properly executed, a return value to the command and the like. Print data sent from the image providing device to the printer is written into a data register 43-6 of the printer. Format information sent from the image providing device to the printer is written as a format frame into a format register 43-7 of the printer.

Figure 35:
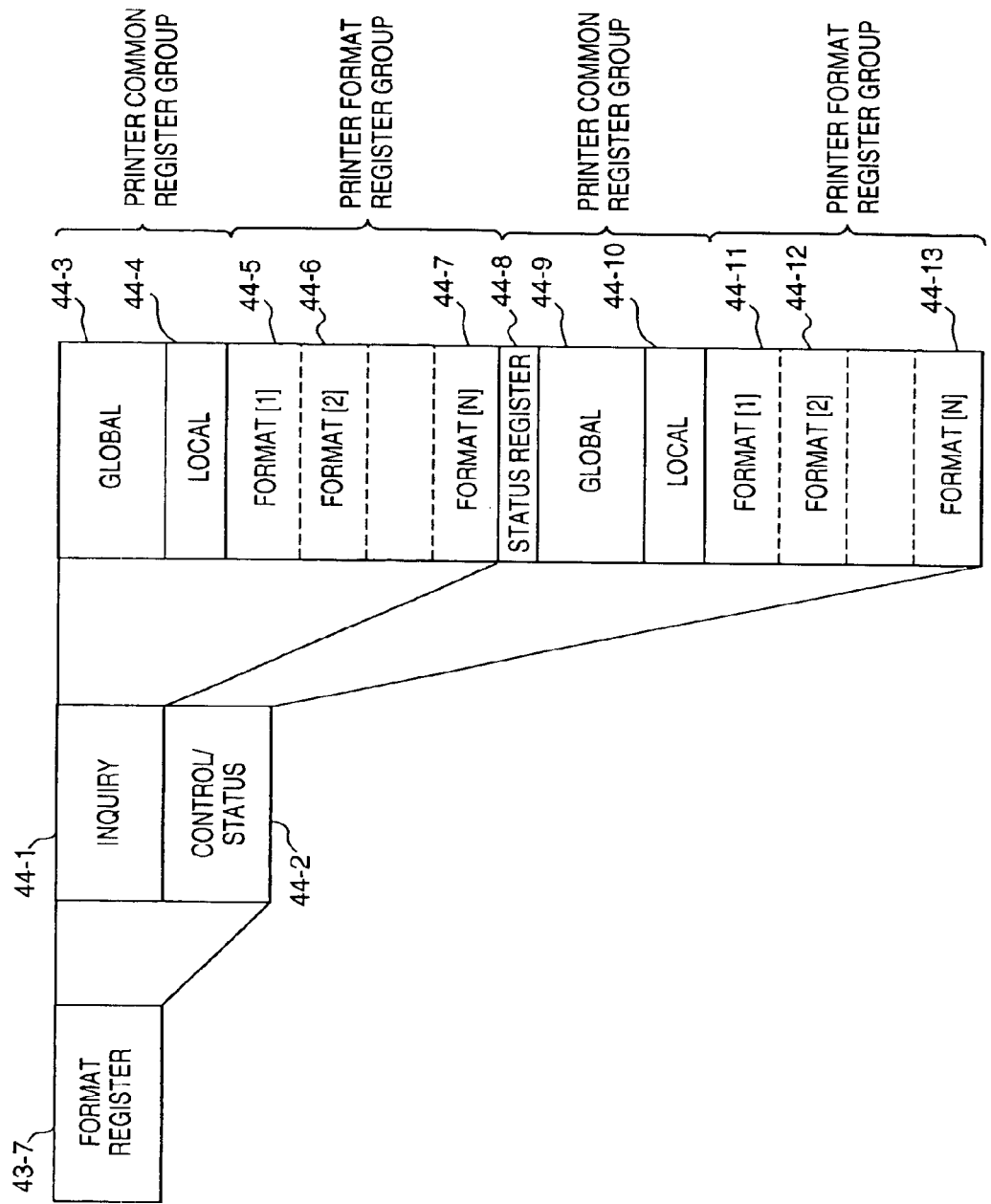
FIG. 35 is an explanatory view showing the construction of a format register.

FIG. 35 shows the construction of the format register 43-7. The format register 43-7 includes a read only register INQUIRY 44-1 for inquiry and a read/write register CONTROL/STATUS 44-2 for setting and information acquisition. The registers INQUIRY 44-1 and the CONTROL/STATUS 44-2 comprise register groups of the same structure. That is, the INQUIRY 44-1 has registers 44-3 to 44-7, while the CONTROL/STATUS 44-2 has registers 44-9 to 44-13.

More specifically, the format register group includes the registers 44-3 and the 44-4 (44-9 and 44-10) constituting a print common register group, and the registers 44-5 to 44-7 (44-11 to 44-13) constituting a printer format register group.

The common register group, which is a group of registers common to all the data formats, has the register GLOBAL 44-3 (44-9) common to all the printers and the register LOCAL 44-4 (44-10) unique to each printer.

The printer format register group is a group of n registers unique to the respective data formats, i.e., the register format[1] 44-5 (44-11) to the register format[n] 44-7 (44-13). The registers format[1] to format[n] correspond to data formats to be described later. One of the printer format register group is assigned to each installed data format.

Note that the address of each format register is provided to the image providing device as a response to a command for setting a data format.

Figure 36:
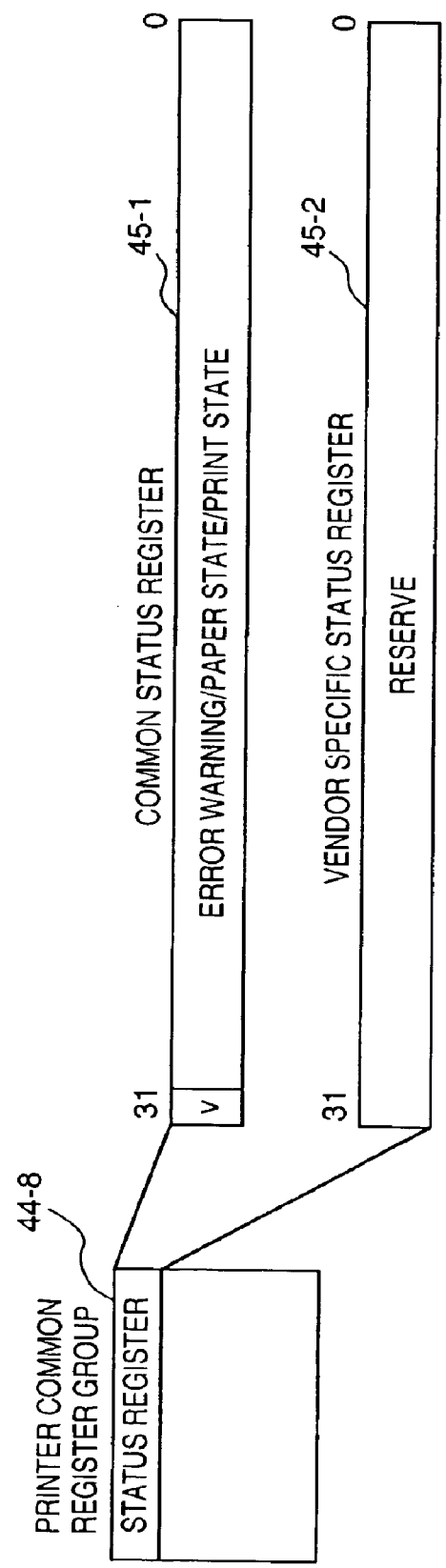
FIG. 36 is an explanatory view showing the detailed construction of a status register of a common register group.

FIG. 36 shows the detailed construction of the status register 44-8 of the common register group. The status register 44-8 comprises a 32-bit common status register 45-1 holding a status common to the respective vendor printers and a 32-bit vendor specific status register 45-2 holding a status defined by each vendor. Further, the extension of the vendor specific status register 45-2 is defined as follows, by a v flag (vendor status available flag) at the 31th bit of the common status register 45-1:

v flag: "0"=not available

"1"=available

Figure 37:
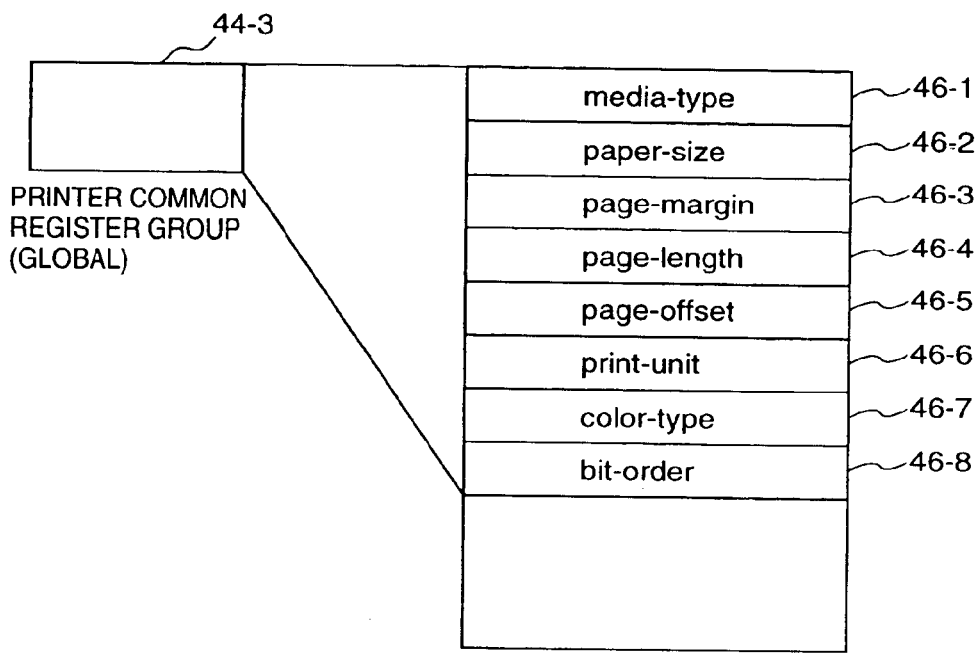
FIG. 37 is an explanatory view showing the details of information held in a register GLOBAL of a common register group.

Further, information held in the common status register 45-1 is as follows:

error.warning: status of error, warning and the like paper state: status on print sheet print state: status on printing situation FIG. 37 shows the details of information held in the register GLOBAL 44-3 (44-9) of the common register group. The register GLOBAL 44-3 (44-9) holds information common to all the printers having the DPP (Direct Print Protocol), i.e., information which does not differ in printer type. FIG. 37 shows an example of the information, including media-type 46-1 indicative of the type of print medium, paper-size 46-2 indicative of a print sheet size, page-margin 46-3 indicative of a page margin value, page-length 46-4 indicative of a page length, page-offset 46-5 indicative of page offset, print-unit 46-6 indicative of printer unit information, color-type 46-7 indicative of the color type of printer, bit-order 46-8 indicative of the bit order of data, and the like.

Figure 38:
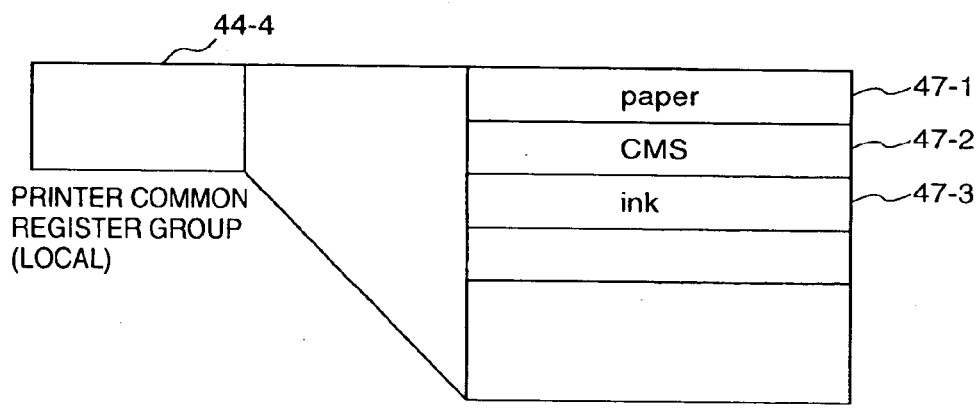
FIG. 38 is an explanatory view showing the details of information held in a register LOCAL of the common register group.

FIG. 38 shows the details of information held in the register LOCAL 44-4 (44-10) of the common register group. The register LOCAL 44-4 (44-10) holds information unique to each of the printers having the DPP protocol, i.e., information which differs in printer type. FIG. 38 shows an example of the information, including paper 47-1 indicative of the type of print sheet of a printer, CMS 47-2 indicative of a color matching method, ink 47-3 indicative of ink type of the printer, e.g., an ink-jet printer.

Figure 39:
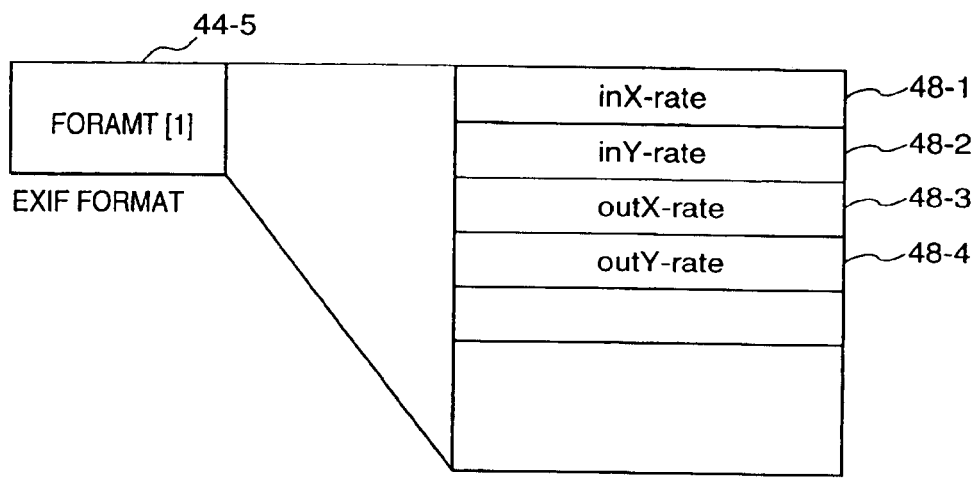
FIG. 39 is an explanatory view showing the details of information held in a register format[1]

FIG. 39 shows the details of information held in the register format[1] 44-5. In FIG. 39, information on EXIF (Exchangeable Image File Format) as one image data format is held. The information includes inX-rate 48-1 indicative of the rate of X-directional input, inY-rate 48-2 indicative of the rate of Y-directional input, outX-rate 48-3 indicative of the rate of X-directional output, and outY-rate 48-4 indicative of the rate of Y-directional output. In this case, printing is performed by enlarging/reducing given EXIF image data in the XY directions in accordance with the respective contents of the register.

Figure 40:
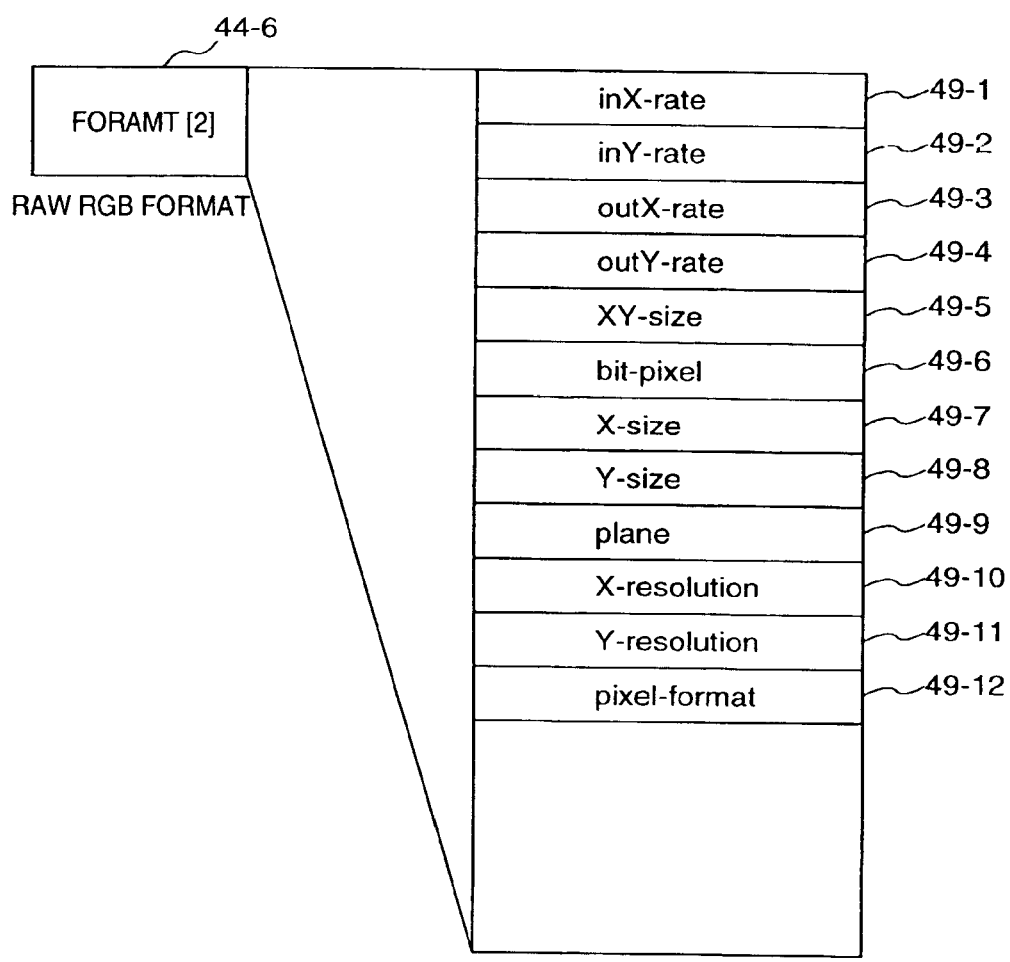
FIG. 40 is an explanatory view showing the details of information held in a register format[2]

FIG. 40 shows the details of information held in the register format[2] 44-6. In FIG. 40, information on Raw RGB as one image format is held. The Raw RGB format has a structure to represent each pixel by R (red), G (green) and B (blue) data. The information includes inX-rate 49-1 indicative of the rate of X-directional input, inY-rate 49-2 indicative of the rate of Y-directional input, outX-rate 49-3 indicative of the rate of X-directional output, outY-rate 49-4 indicative of the rate of Y-directional output, XY-size 49-5 indicative of an XY-directional fixed pixel size, bit-pixel 49-6 indicative of the number of bits per pixel, X-size 49-7 indicative of the number of pixels in the X direction, Y-size 49-8 indicative of the number of pixels in the Y direction, plane 49-9 indicative of the number of color planes, X-resolution 49-10 indicative of X-directional resolution, Y-resolution 49-11 indicative of Y-directional resolution, pixel-format 49-12 indicative of pixel type, and the like. In this case, printing is performed by enlarging/reducing given Raw RGB format image data and/or changing the resolutions in the XY directions in accordance with the respective contents of the register, further, processing the image data based on image size information and the like.

FIG. 41 shows commands and responses to the commands. The commands are classified based on several types, i.e., "status" type commands relating to status, "control" type commands for printer control, "block/buffer" type commands for data transfer setting, "channel" type commands for channel setting, "transfer" type commands relating to a transfer method, "format" type commands relating to format setting, "login" type commands relating to log-in, "data" type commands relating to data transfer, and the like. Note that the log-in, "login" type commands as aforesaid, and a command Login, a response LoginResponse, a command Logout and a response LogoutResponse described later are unrelated to the LOGIN protocol as aforementioned.

More specifically, the "status" type commands include a command GetStatus to obtain the status of a printer and its response GetStatusResponse 50-1 and the like.

The "control" type commands include a command PrintReset to reset the printer and its response PrintResetResponse 50-2, a command PrintStart to instruct to start printing and its response PrintStartResponse 50-3, a command PrintStop to instruct to stop printing and its response PrintStopResponse 50-4, a command InsertPaper to instruct to supply a print sheet and its response InsertPaperResponse 50-5, a command EjectPaper to instruct to discharge a print sheet and its response EjectPaperResponse 50-6, a command CopyStart to instruct to start copying image data and its response CopyStartResponse 50-7, a command CopyEnd to instruct to terminate copying image data and its response CopyEndResponse 50-8, and the like.

The "block/buffer" type commands include a command BlockSize to designate a block size and its response BlockSizeResponse 50-9, a command BlockAddress to designate a block address and its response BlockAdressResponse 50-10, a command FreeBlock to obtain the number of available blocks and its response FreeBlockResponse 50-11, a command WriteBlocks to instruct to write data into blocks and its response WriteBlocksResponse 50-12, a command BufferConfig to designate buffer information and its response BufferConfigResponse 50-13, a command SetBuffer to designate to start obtaining data from buffer and its response SetBufferResponse 50-14, and the like.

The "channel" type commands include a command OpenChannel to open a channel and its response OpenChannelResponse 50-15, a command CloseChannel to close the channel and its response CloseChannelResponse 50-16, and the like.

The "transfer" type commands include a command TransferMethod to designate a data transfer method and its response TransferMethodResponse 50-17 and the like.

The "format" type commands include a command SetFormat to set a format and its response SetFormatResponse 50-18 and the like.

The "login" type commands include a command Login to perform log-in and its response LoginResponse 50-19, a command Logout to perform log-out and its response LogoutResponse 50-20, a command Reconnect to perform reconnection and its response ReconnectResponse 50-21, and the like.

These commands are written into a command frame.

Further, the "data" type commands include commands WriteBlock 50-22 and WriteBuffer 50-23 to write data, a command PullBuffer 50-24 to read data, and the like. These commands are written/read with respect to a data frame, and there have no responses corresponding to these commands.

The image providing device sets a value corresponding to each of the various commands as shown in FIG. 41 at the operation code (opcode), and writes the command into the command register 43-4 of the printer. Thus, the command is executed by the printer. The response to the command has the same value as that of the command. The printer sets the response at the operation code of the response frame as shown in FIG. 32, and writes the frame into the response register 43-2 of the image providing device. By the response, the image providing device receives the result of execution of the command.

FIG. 42 shows the image data formats supported by the DPP protocol. The printer must support Raw image data of at least one of these formats. Further, the printer can support other plural formats as optional formats.

Figure 43:
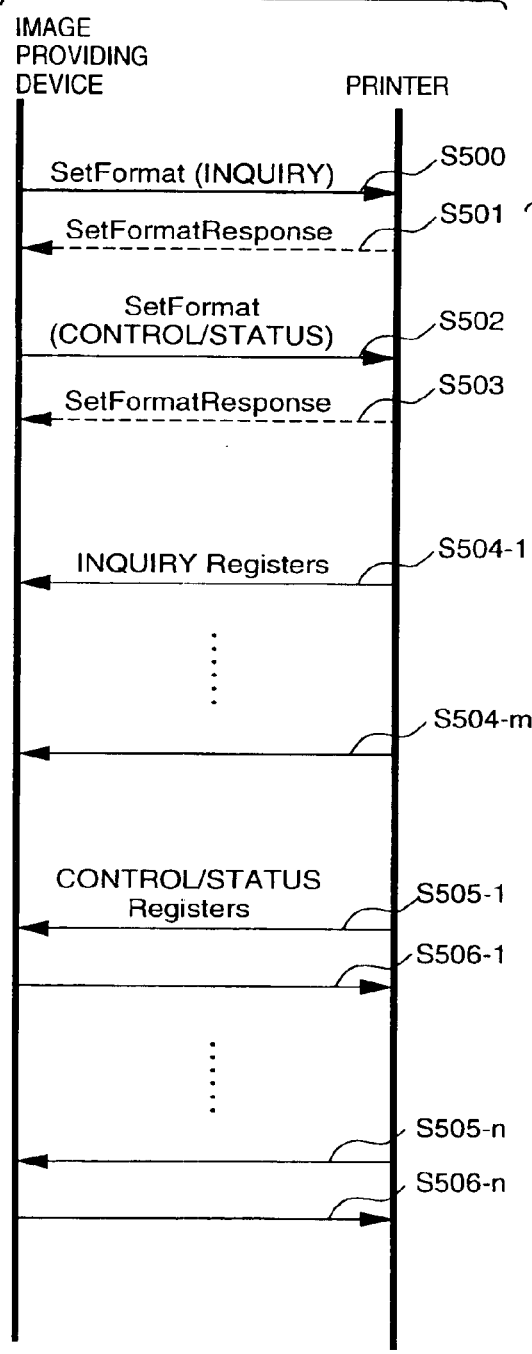
FIG. 43 is a timing chart showing the flow of format setting processing.

FIG. 43 shows the flow of format setting processing. First, the image providing device sends the command SetFormat (INQUIRY) to the printer at step S500, and the printer returns the SetFormatResponse at step S501. The image providing device obtains the address of the INQUIRY register of the printer by the returned response.

Next, the image providing device sends the command SetFormat (CONTROL/STATUS) to the printer at step S502, and the printer returns the SetFormatResponse at step S503. The image providing device obtains the address of the CONTROL/STATUS register of the printer by the returned response.

The image providing device reads the INQUIRY register of the printer at steps S504-1 to S504-m, and obtains the format supported by the printer and set items of the format.

Next, the image providing device reads the STATUS/ CONTROL register of the printer at steps S505-1 to S505-n, obtains the set values of the format, then writes data into the STATUS/CONTROL register of the printer, thus sets the format.

The data transfer in the DPP protocol uses the following two packets.

Control command packet for flow control

Packet for data transmission

In the present embodiment, the following five types of data transfer methods are used in accordance with the difference among data transmission methods and flow controls. In any method, control commands for the flow control are based on the FCP protocol. However, The control commands are not limitted to the FCP protocol.

Transfer method 1: Response model

Transfer method 2: Simplified response model

Transfer method 3: PUSH large buffer model

Transfer method 4: PULL buffer model

Transfer method 5: Isochronous model

In actual transfer, one of the above methods is selected and set in a procedure similar to the format setting procedure as shown in FIG. 43. Note that as shown in FIG. 44, the command TransferMethod and the response TransferMethodResponse are employed.

Figure 44:
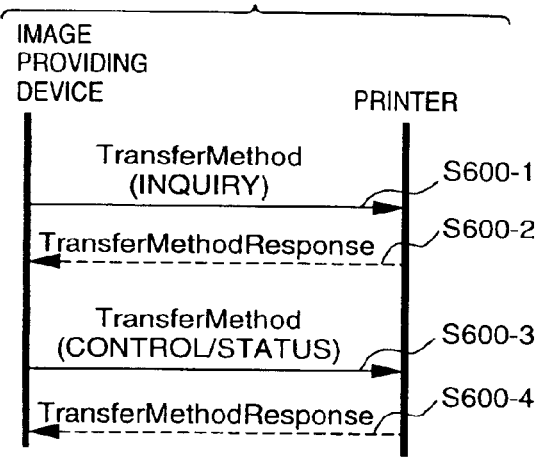
FIG. 44 is a timing chart showing the flow of data-transfer method setting processing.

FIG. 44 shows the flow of data-transfer method setting processing. The image providing device obtains a currently available data transfer method of the printer by the command TransferMethod and the response TransferMethodResponse in the command type INQUIRY (steps S600-1 and S600-2), and obtains and sets a data transfer method currently set at the printer, by the command TransferMethod and the response TransferMethodResponse of the command type CONTROL/STATUS (steps S600-3 and S600-4).

In any of the above five type of transfer methods, the control commands for flow control are based on the FCP protocol as a protocol for controlling a device on the 1394 serial bus. The transfer of control command by the FCP protocol is always performed by an asynchronous write transaction, in both transmission and response.

Figure 45:
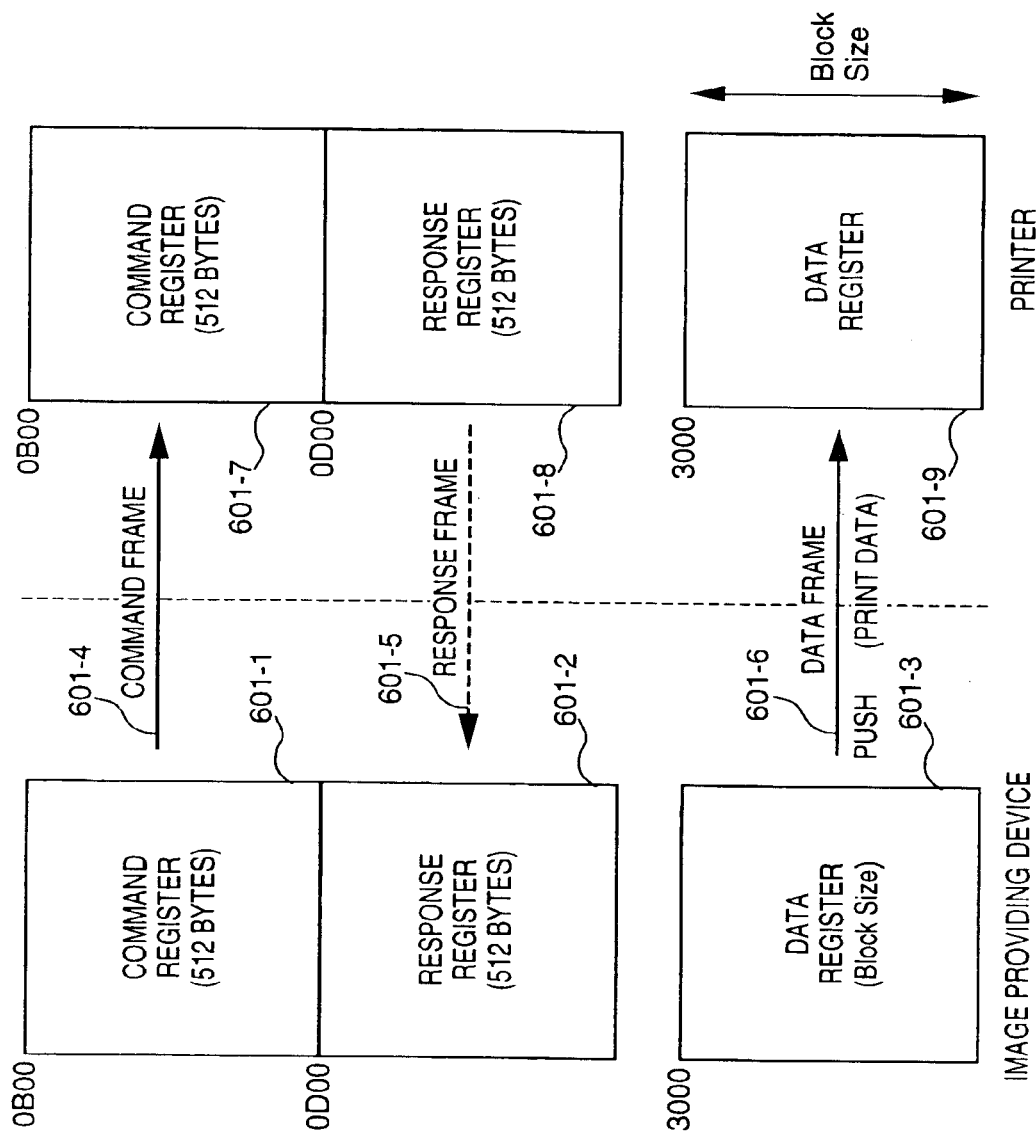
FIG. 45 is an explanatory view showing a register map of registers necessary for transfer method 1 and transfer method 2, in address space of the 1394 serial bus.

FIG. 45 shows a register map of registers necessary for the transfer method 1 and the transfer method 2, in address space of the 1394 serial bus. In the present embodiment, a node on the controller side is the image providing device (controller in the FCP protocol), and a node on the controlled side is the printer (target in the FCP protocol).

Both image providing device and printer have a command register (601-1 and 601-7) with offset of 512 bytes from "0x0B00" and a response register (601-2 and 601-8) with offset of 512 bytes from "0x0D00" in the register space. These registers are based on the FCP protocol and the AV/C commands.

The flow control is made by writing the command frame 601-4 and the response frame 601-5 into the command register (601-1 and 601-7) and the response register (601-2 and 601-8), respectively. Further, for print data transfer, a dedicated data frame is defined. That is, a data register (601-3 and 601-9) for a block size is provided from offset "0x3000" in the register space, and print data is transferred by writing a data frame 601-6 into the data register (601-3 and 601-9). Note that the block size is 512 bytes, for example.

Figure 46:
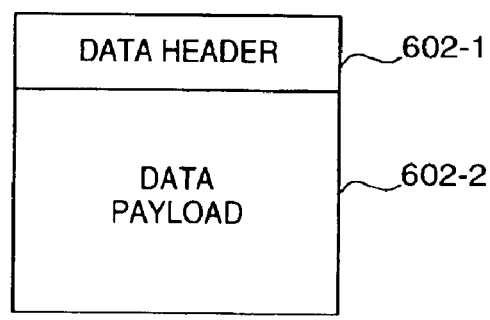
FIG. 46 is an example of a data packet frame.

FIG. 46 shows a data packet frame comprising a data header 602-1, a data payload 602-2 and the like.

Figure 47:
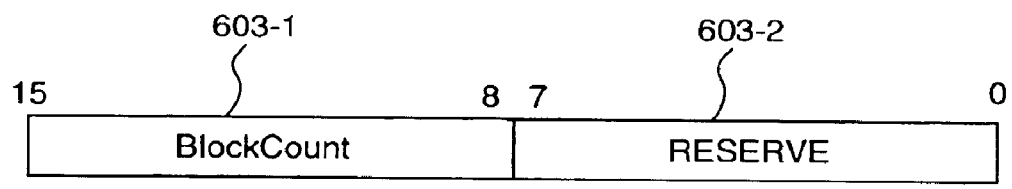
FIG. 47 is an example of the structure of a data header.

FIG. 47 shows the structure of the data header 602-1. In the data header 602-1, upper 8 bits are assigned to a block count area 603-1, and lower 8 bits, to a future reserve area 603-2. The block count area 603-1 is internally used by the target (printer) to count the number of blocks transferred at one block transfer. Note that as the block count area 603-1 has 8 bits, it takes a value "0" to "255".

Figure 48:
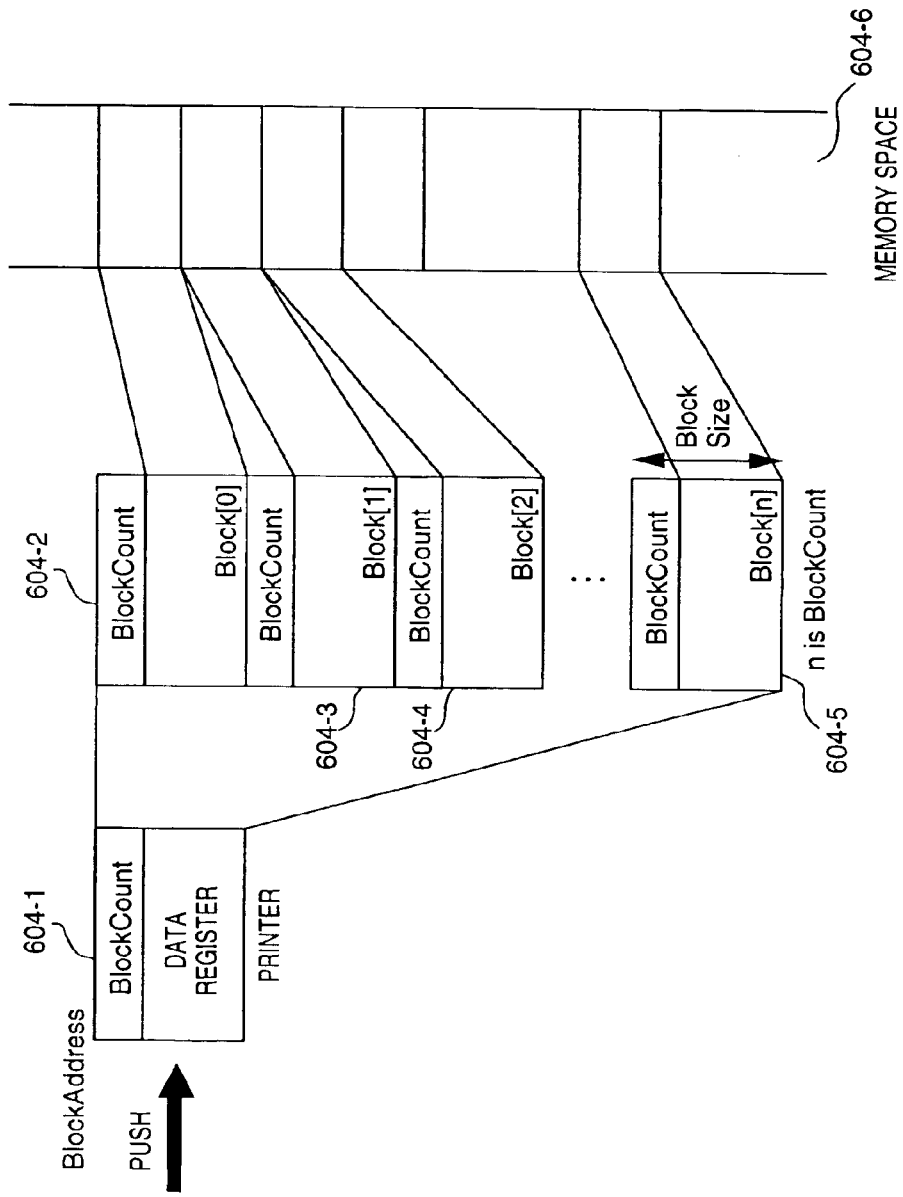
FIG. 48 is an explanatory view showing data packet frame processing in the printer in block transfer.

FIG. 48 shows data packet frame processing in the printer in block transfer. A data packet received by the printer is first written into a data register 604-1 of the printer. The printer has buffers (604-2 to 604-5) of the same size of that of the data packet. The data packet written in the data register 604-1 is sequentially moved to these buffers (604-2 to 604-5). Note that the number of the data buffers is preferably 255, the maximum block count value, but it may be a value less than 255. The respective buffers correspond to block count values. A data packet when the block count value is "0" is stored into a buffer of Block[0]; and a data packet when the block count value is "1" is stored into a buffer of Block[1]. The data header 602-1 is removed from the data packets stored in the buffers (604-2 to 604-5), and the data packets are developed in a memory space 604-6 of the printer.

[Transfer Method 1]

The transfer method 1 as the response model defines a data packet frame for data transmission, provides a data register, performs flow control by control commands, while transfers print data by a write transaction.

Figure 49:
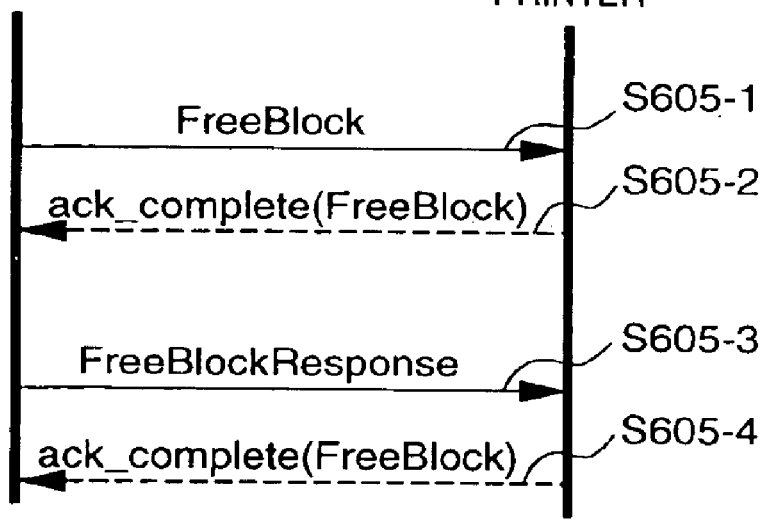
FIG. 49 is a timing chart showing commands and responses FreeBlock in the transfer method 1.

FIG. 49 shows commands and responses FreeBlock in the transfer method 1. In the transfer method 1, prior to data transfer, the image providing device uses the commands and responses FreeBlock to obtain information indicating the number of data packets to be transferred.

The image providing device transfers the FreeBlock command by a write transaction (step S605-1), and the printer returns an ACK packet indicative of the acknowledgment of the transaction (step S605-2). The printer returns the FreeBlockResponse to notify a FreeBlockCount (step S605-3) which is the number of currently available blocks, and the image providing device returns an ACK packet indicative of the acknowledgment of the transaction (step S605-4).

Figure 50:
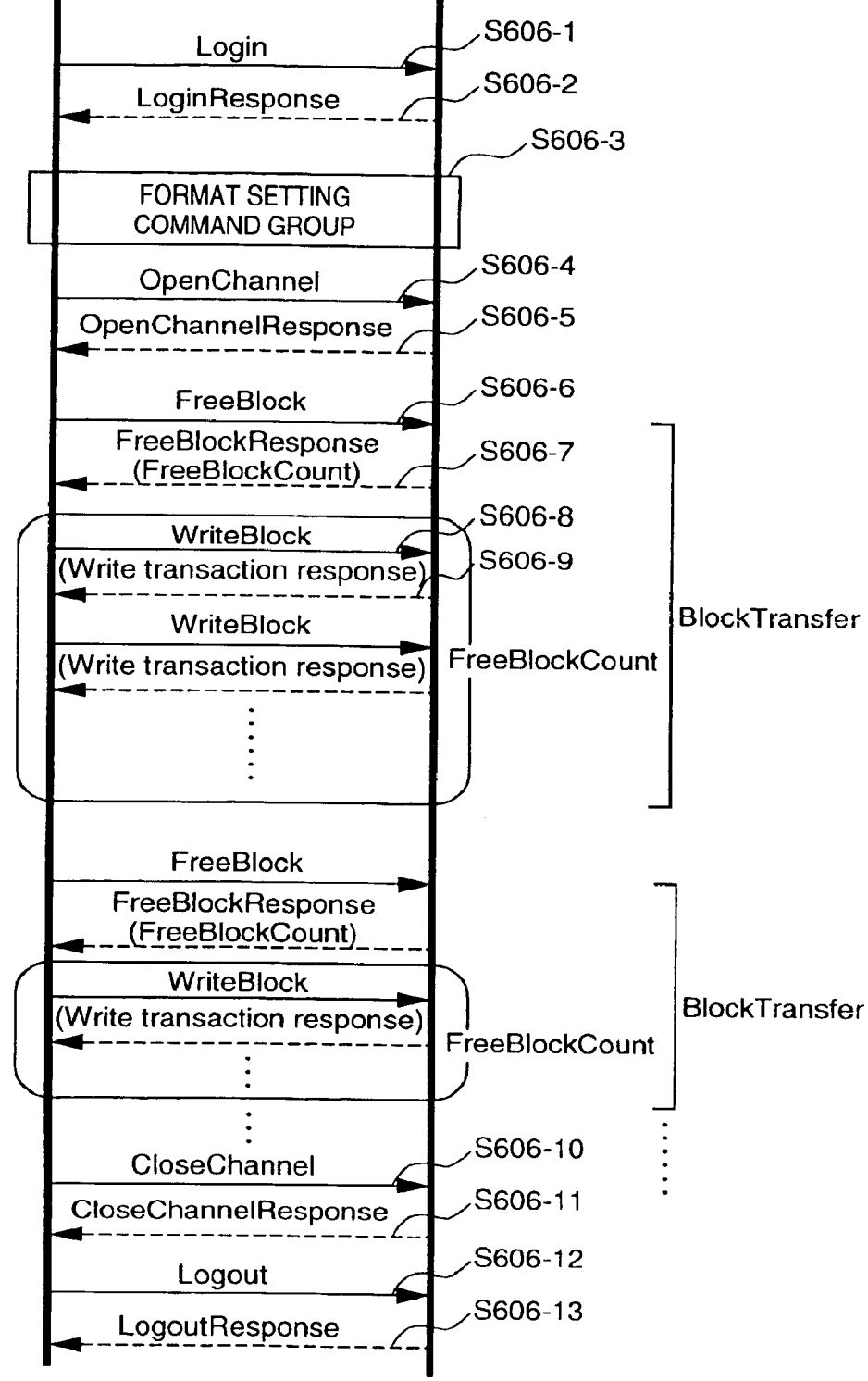
FIG. 50 is a timing chart showing the flow of data transfer in the transfer method 1.

FIG. 50 shows the flow of data transfer in the transfer method 1. The image providing device logs in the printer by the command and response Login of the DPP protocol (steps S606-1 and S606-2), and sets a format to be used for data transfer by using the above-described format register group (step S606-3). Thereafter, the image providing device opens a logic channel by the command and response OpenChannel (steps S606-4 and S606-5). Next, data transfer is started, and print data is transferred in the data packet format as shown in FIG. 46. Further, the packet transfer is performed in correspondence with the number of blocks the same as the number of data buffers on the printer side, as shown by references 604-2 to 604-5 in FIG. 48, as one cycle.

In the transfer method 1, the print data is transferred as follows. The image providing device obtains the FreeBlockCount of the printer by the command and response FreeBlock (steps S606-6 and S606-7), and sequentially transfers data packets of the same number as that of the FreeBlockCount, by the command WriteBlock (step S606-8). Note that the command WriteBlock is used for transferring print data packets from the data register 601-3 of the image providing device to the data register 601-9 of the printer. Note that there is no response corresponding to the command WriteBlock, and the printer returns an ACK packet to confirm that the data packets have been stored into the data register 601-9.

Then, block transfer is performed by repeating packet transfer, with the commands WriteBlock of the same number of the FreeBlockCount and ACK packets corresponding to the commands until all the series of print data has been outputted from the image providing device, and between the respective block transfers, the FreeBlockCount of the printer is obtained by the command and response FreeBlock.

When the print data transfer has been completed, the image providing device closes the logic channel by the command and response CloseChannel (steps S606-10 and S606-11), and logs out from the printer by the command and response Logout of the DPP protocol (steps S606-12 and S606-13).

[Transfer Method 2]

The transfer method 2 as the simplified response model performs data transfer in the same procedure as that of the transfer method 1 except the method to obtain the FreeBlockCount.

Figure 51:
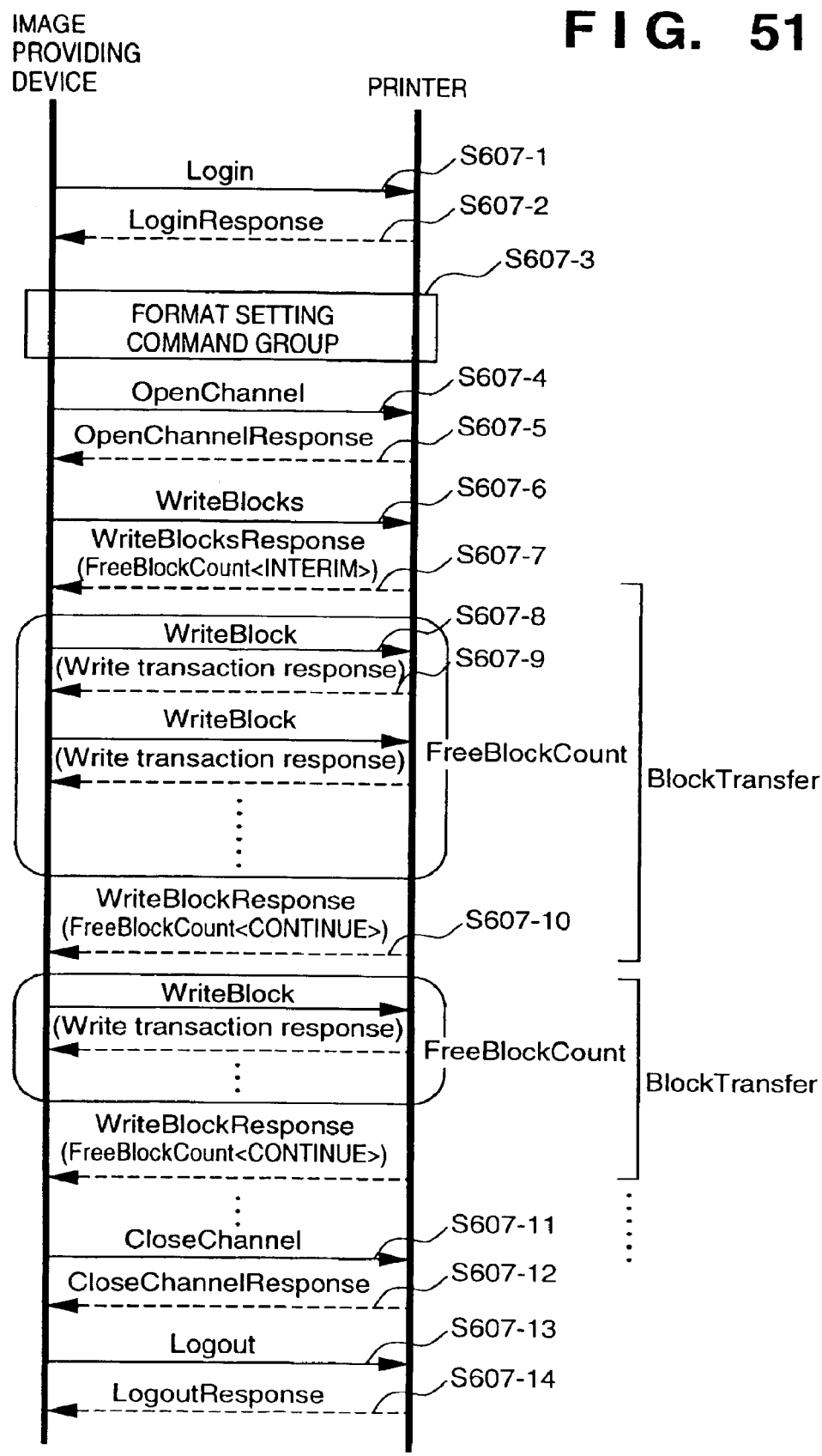
FIG. 51 is a timing chart showing the flow of data transfer in the transfer method 2.

FIG. 51 shows the flow of data transfer in the transfer method 2. The image providing device logs in the printer by the command and response Login of the DPP protocol (steps S607-1 and S607-2), and sets a format to be used for data transfer by using the above-described format register group (step S607-3). Thereafter, the image providing device opens a logic channel by the command and response OpenChannel (steps S607-4 and S607-5). Next, data transfer is started, and print data is transferred in the data packet format as shown in FIG. 46. Further, the packet transfer is performed in correspondence with the number of blocks the same as the number of data buffers on the printer side, as shown by references 604-2 to 604-5 in FIG. 48, as one cycle.

In the transfer method 2, the print data is transferred as follows. The image providing device obtains the FreeBlockCount of the printer of the printer by the command WriteBlocks and response WriteBlockResponse (steps S607-6 and S607-7). Note that the response at step S607-7 is of the INTERIM type for performing the acquisition of the FreeBlockCount only by the response from the printer side. The image providing device sequentially transfers data packets of the same number as the obtained FreeBlockCount, by the command WriteBlock (step S607-8), and the printer returns the above-described ACK packet (607-9). Then, block transfer is performed by repeating packet transfer by the commands WriteBlock of the same number as the FreeBlockCount and ACK packets corresponding to the commands until all the series of print data has been outputted from the image providing device. Note that at the second cycle and the subsequent cycles in the block transfer, the FreeBlockCount is notified to the image providing device by the WriteBlocksResponse from the printer, at the end of each block transfer cycle (step S607-10). The WriteBlocksResponse is of the CONTINUE type used for continuing the acquisition of the FreeBlockCount only by the response from the printer.

When the print data transfer has been completed, the image providing device closes the logic channel by the command and response CloseChannel (steps S607-11 and S607-12), and logs out from the printer by the command and response Logout of the DPP protocol (steps S607-13 and S607-14).

[Method to Obtain FreeBlockCount]

Hereinbelow, the method to obtain the FreeBlockCount, which is the difference between the transfer method 1 and the transfer method 2, will be described in detail.

Figure 52:
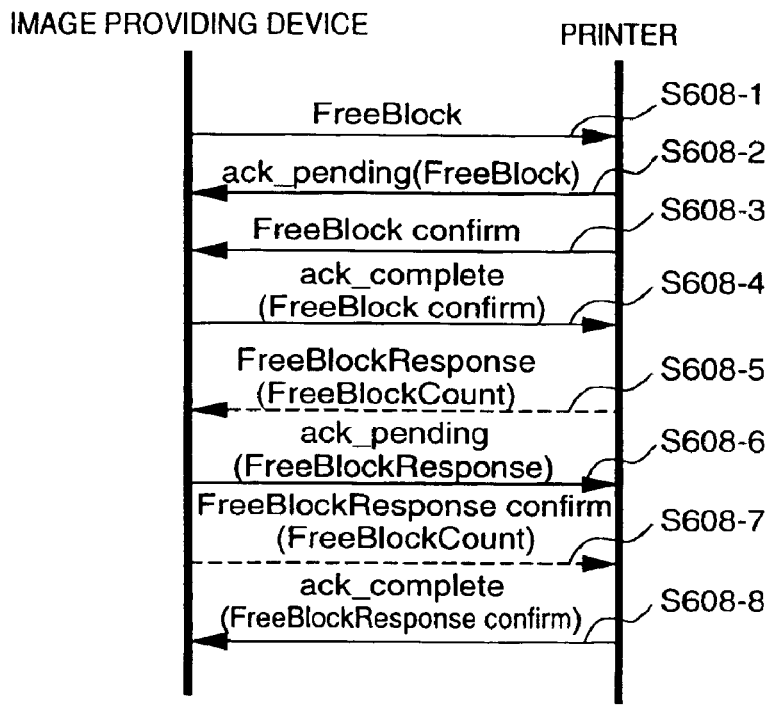
FIG. 52 is a timing chart showing the commands and responses FreeBlock in the transfer method 1, in detail.

FIG. 52 shows the commands and responses FreeBlock in the transfer method 1 at steps S606-6 and S606-7, in detail, including the ACK packets of the write transaction omitted in FIG. 50. In this case, both initiator device (image providing device) and the target device (printer) perform processing of the link layer and transaction layer at a relatively low speed.

When the image providing device writes the command FreeBlock into the command register by a write transaction (step S608-1), the above-described ACK packet indicative of "pending" is returned from the link layer of the printer (step S608-2). Next, the image providing device sends a command FreeBlock with no data (step S608-3), and receives an ACK packet indicative of "complete" from the printer (step S608-4). Thus, one write transaction ends.

Next, the printer returns the FreeBlockResponse. Similar to the command FreeBlock at step S608-1, the FreeBlockResponse is written as a response including the FreeBlockCount into the response register (step S608-5). An ACK packet indicative of "pending" is returned from the link layer of the image providing device (step S608-6). Then, the printer sends the FreeBlockResponse with no data (step S608-7), and receives an ACK packet indicative of "complete" (step S608-8). Thus, one write transaction ends.

On the other hand, in the transfer method 2, only the FreeBlockResponse from the printer is used to obtain the FreeBlockCount at the second and the subsequent cycles in the print data block transfer. Accordingly, the FreeBlockCount is obtained only by the operation at steps S608-5 to S608-8.

The acquisition of the FreeBlockCount is necessary at each cycle of block transfer. Accordingly, in the transfer method 2, the number of packets transferred on the bus can be less than that in the transfer method 1.

Figure 53:
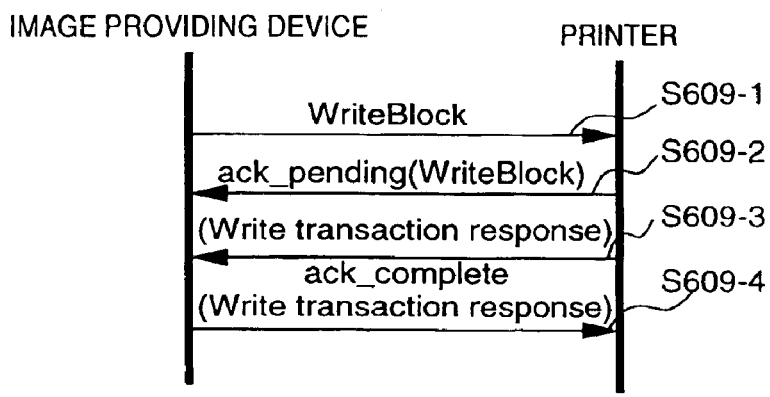
FIG. 53 is a timing chart showing a commands and responses WriteBlock in the transfer method 1 and the transfer method 2.

FIG. 53 shows the commands WriteBlock in the transfer method 1 and the transfer method 2 in detail. As the command WriteBlock requires no response, commands in this procedure are sent in the order, the WriteBlock (step S609-1), an ACK packet indicative of "pending" (step S609-2), the WriteBlock with no data (step S609-3) and an ACK packet indicative of "complete" (step S609-4). The length of the procedure is the half of that in the case where commands and responses are transferred. This performs data transfer at a relatively high speed even if the processings in the link layer and the transaction layer are performed at a relatively slow speed.

Figure 54:
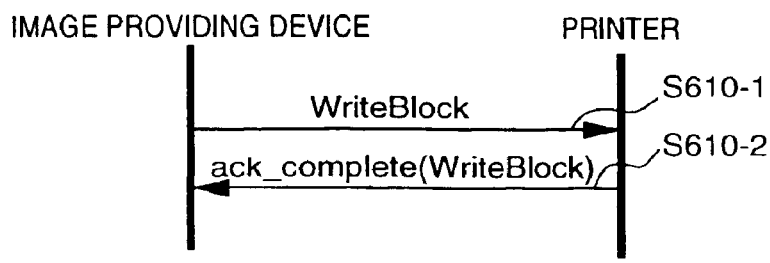
FIG. 54 is a timing chart showing the commands and responses WriteBlock in the transfer method 1 and the transfer method 2, in detail.

FIG. 54 shows the command WriteBlock in the transfer method 1 and the transfer method 2 in detail, in a case where the processings in the link layer and the transaction layer are performed at a sufficiently high speed. In this case, commands in this procedure are sent in the order, the WriteBlock (step S610-1), and an ACK packet indicative of "complete" (step S610-2). This performs more efficient data transfer.

Figure 55:
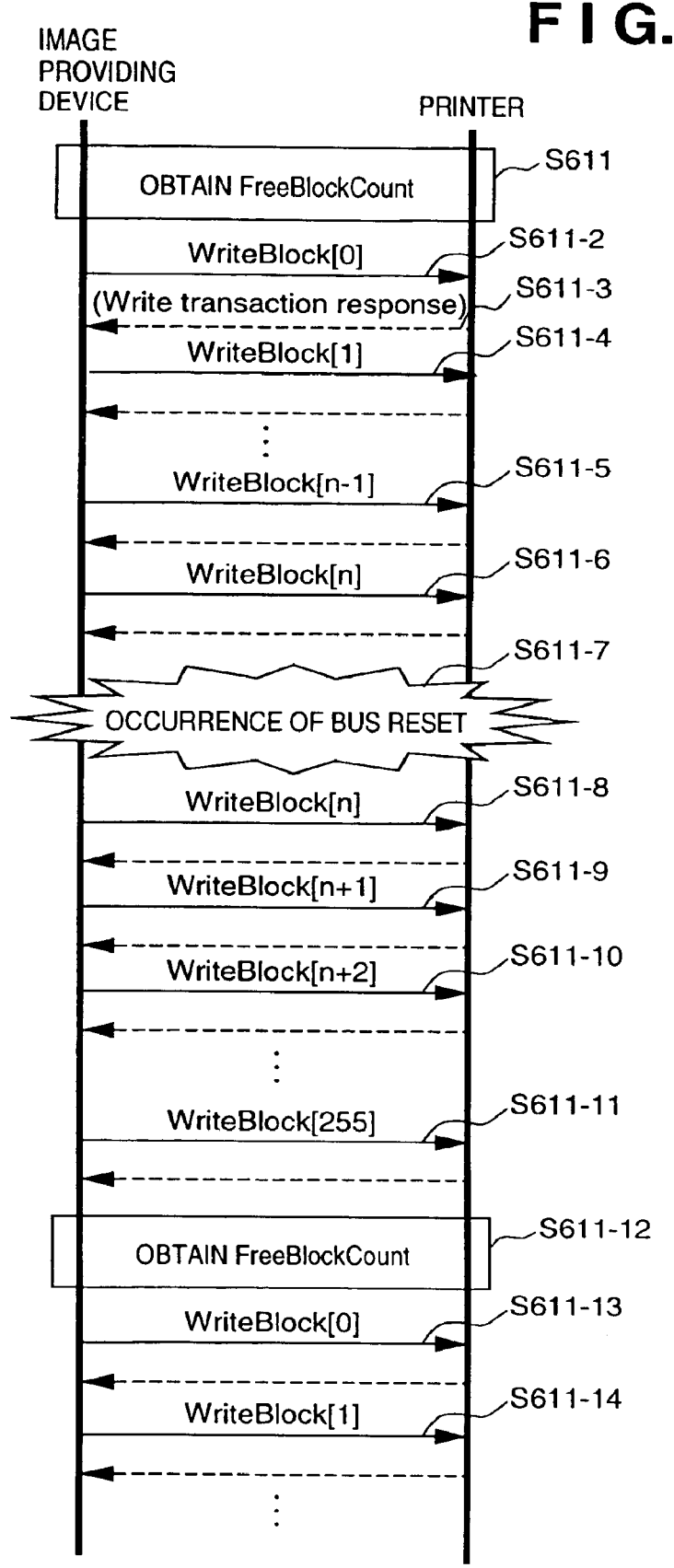
FIG. 55 is a timing chart showing the flow of WriteBlock error processing upon occurrence of bus reset.

FIG. 55 shows the flow of WriteBlock error processing upon occurrence of bus reset. In this case, the bus reset occurs at transfer of n-th (=0–255) packet at one block transfer cycle. In a write transaction, a failure of data packet transfer is indicated by an ACK packet, however, error upon bus reset cannot be detected. Then, in the present embodiment, error processing is performed in the following procedure. That is, in a case where the FreeBlockCount is obtained (step S611-1), then the WriteBlock is sent n times (step S611-2 to S611-6), if bus reset occurs at this time (step S611-7), the image providing device again sends the WriteBlock[n] immediately before the bus reset (step S611-8), and thereafter, continues the processing (steps S611-9 to S611-14).

[Transfer Method 3]

Figure 56:
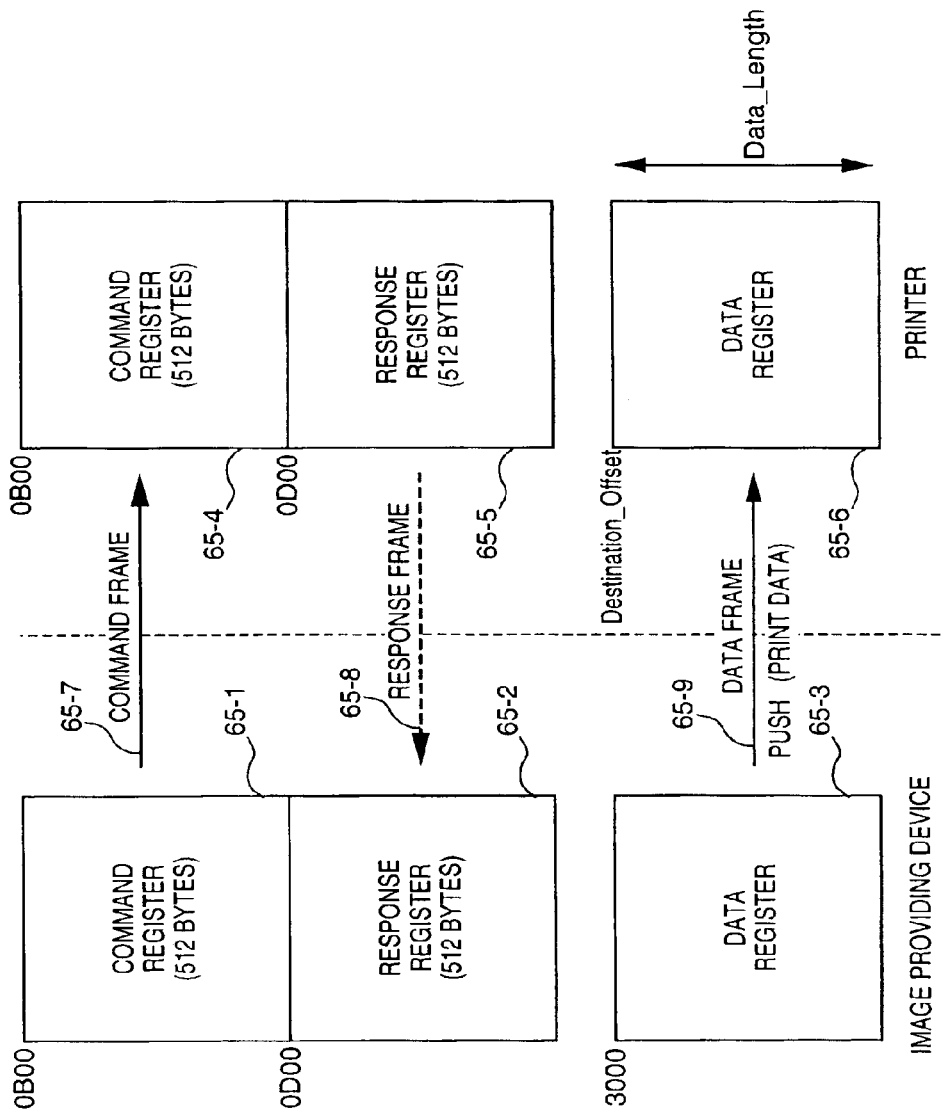
FIG. 56 is an explanatory view showing the construction of command registers, response registers and data registers of the image providing device and the printer, in a PUSH Large Buffer Model.

FIG. 56 shows the construction of command registers, response registers and data registers of the image providing device and the printer, in the PUSH large buffer model.

The commands and responses between the image providing device and the printer based on the FCP protocol are executed by operation of writing a command frame 65-7, as command request data, from a command register 65-1 of the image providing device into a command register 65-4 of the printer, and operation of writing a response frame 65-8, as response data, from a response register 65-5 of the printer into a response register 65-2 of the image providing device.

Further, different from the FCP protocol, a data frame 65-9 is used in one-directional operation of writing image data from a data register 65-3 of the image providing device into a data register 65-6 of the printer by using a write transaction.

Figure 57:
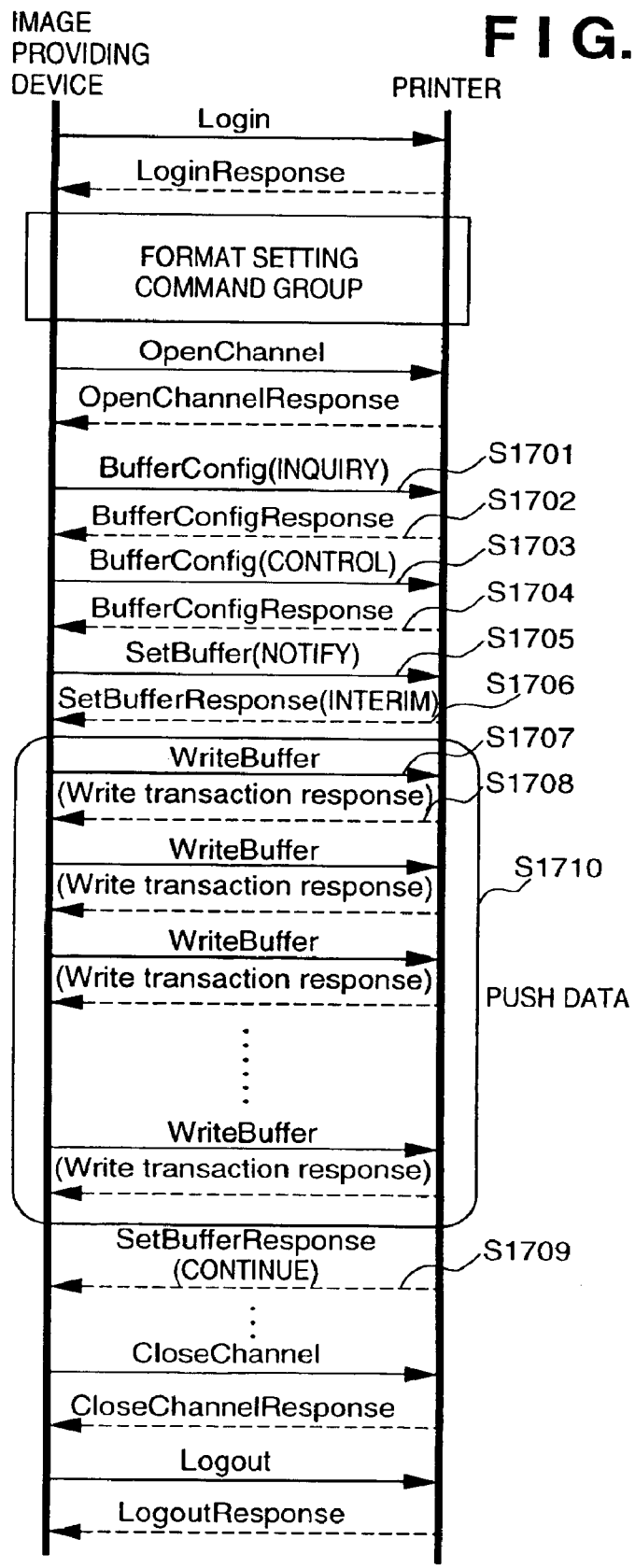
FIG. 57 is a timing chart showing the flow of operation in a PUSH buffer model between the image providing device and the printer.

FIG. 57 shows the flow of operation of the PUSH buffer model between the image providing device and the printer.

Note that the commands Login, Logout, OpenChannel and CloseChannel and format setting are similar to those in the above-described transfer method 1, therefore, detailed explanations of the commands and the format setting will be omitted.

In FIG. 57, the image providing device inquires about the buffer area of the printer by the command BufferConfig indicating "INQUIRY" (step S1701). The printer returns the buffer size and buffer address by the BufferConfigResponse (step S1702).

Next, the image providing device sets the buffer size and the buffer address of the printer into which data is written, by the command BufferConfig indicating "CONTROL" (step S1703). The printer returns the BufferConfigResponse indicating that the setting has been completed (step S1704).

Next, the image providing device notifies the printer that data transfer is to be started, by using the command SetBuffer indicating "NOTIFY" (step S1705). The printer returns the "INTERIM" SetBufferResponse indicating that the printer is prepared for the present to receive the data (step S1706), to let the image providing device start data transfer. Then, the printer notifies the image providing device that the data transfer to the initially set buffer area has been completed, by using the SetBufferResponse indicating "CONTINUE" (step S1709).

The command WriteBuffer at step S1707 indicates data frame writing by the image providing device. In this operation, data is sequentially written into the buffer address set in the printer.

A response WriteTransactionResponse at step S1708 indicates a response packet upon isochronous transfer of data frame. As described above, if the data input speed of the printer is sufficiently high, the processing can be completed by using an acknowledgment of one write transaction, however, if data input takes time, independent responses occur as a split transaction.

Step S1710 indicates processing of transferring a plurality of data frames. That is, the data is transferred by a series of transactions to an area having the buffer size set by using the command BufferConfig. The data transfer method using a series of transactions is called a "PUSH data transfer method" or abbreviated to a "PUSH method".

Figure 58:
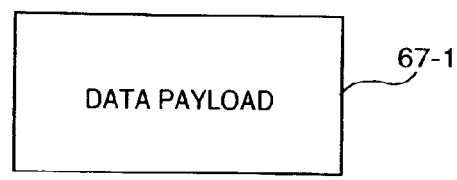
FIG. 58 is an example of a data packet in a data frame.

FIG. 58 shows the structure of a data packet in the data frame. As the data can be written by directly addressing the buffer of the printer, a data packet 67-1 does not include a header and the like.

Figure 59:
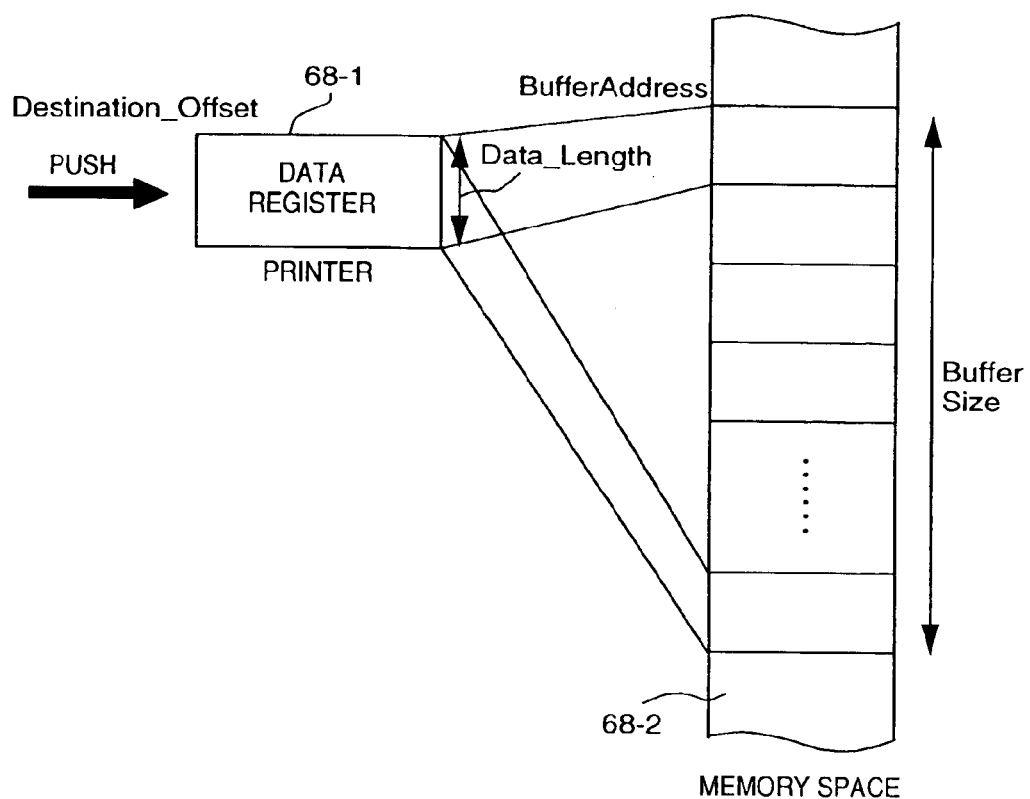
FIG. 59 is an explanatory view of the relation between the data register and the buffer of the printer.

FIG. 59 shows the relation between the data register and the buffer of the printer. Data written in a data register 68-1 is directly written into the address of a memory space 68-2 of the printer, designated by "BufferAddress" determined by an offset "Destination_Offset". As the offset value is incremented by a data length indicated by "Data_Length", the data is continuously written within the area indicated by "BufferSize" by repeatedly writing the data into the series of buffer addresses.

[Transfer Method 4]

Figure 60:
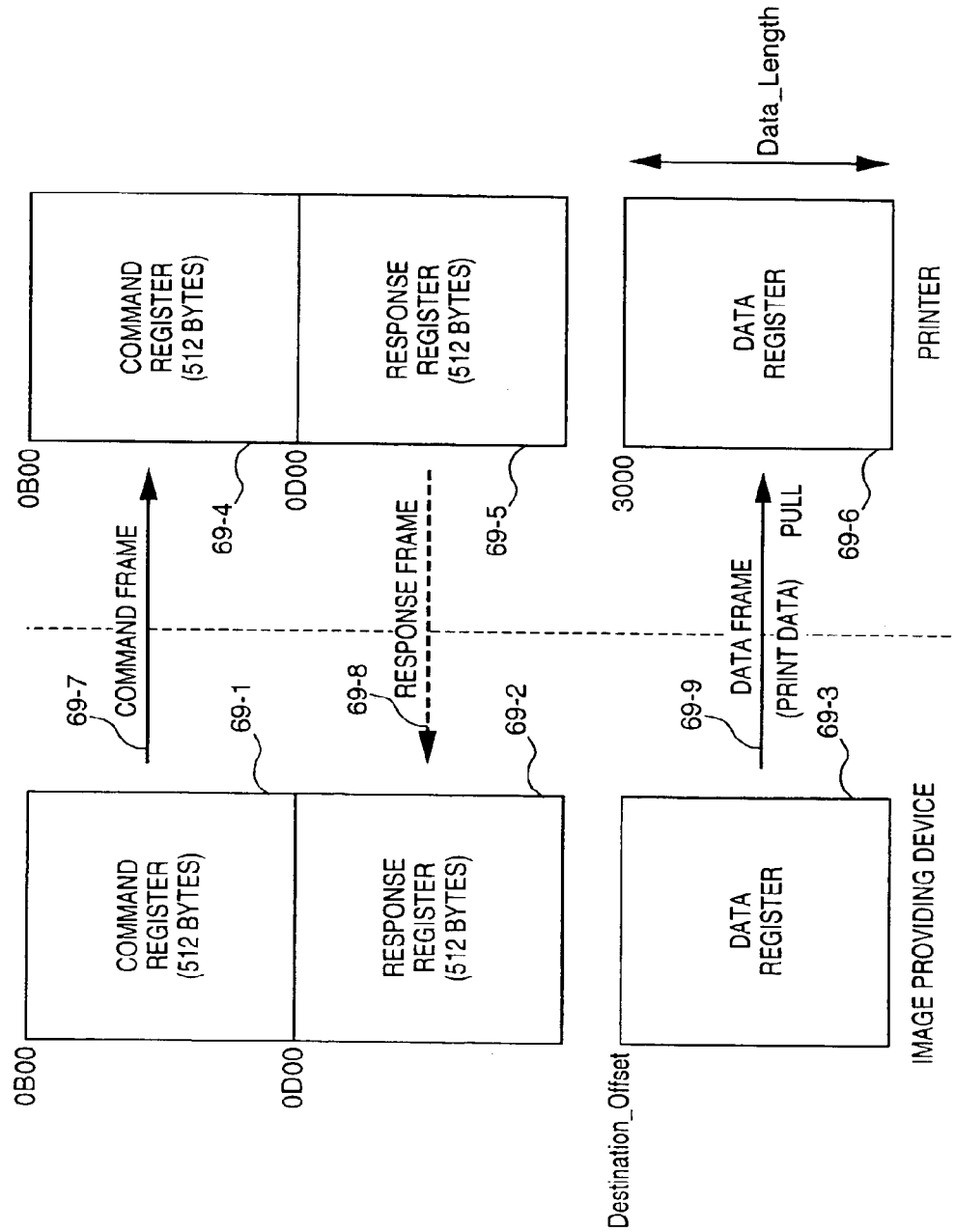
FIG. 60 is an explanatory view showing the construction of the command registers, the response registers and the data registers of the image providing device and the printer, in a PULL buffer model.

FIG. 60 shows the construction of the command registers, the response registers and the data registers of the image providing device and the printer, in the PULL buffer model.

The commands and responses between the image providing device and the printer, based on the FCP protocol, are executed by operation of writing a command frame 69-7, as command request data, from a command register 69-1 of the image providing device into a command register 69-4 of the printer, and operation of writing a response frame 69-8, as response data, from a response register 69-5 of the printer into a response register 69-2 of the image providing device.

Further, different from the FCP protocol, a data frame 69-9 is used in one-directional operation of reading image data from a data register 69-3 of the image providing device into a data register 69-6 of the printer by using a read transaction.

Figure 61:
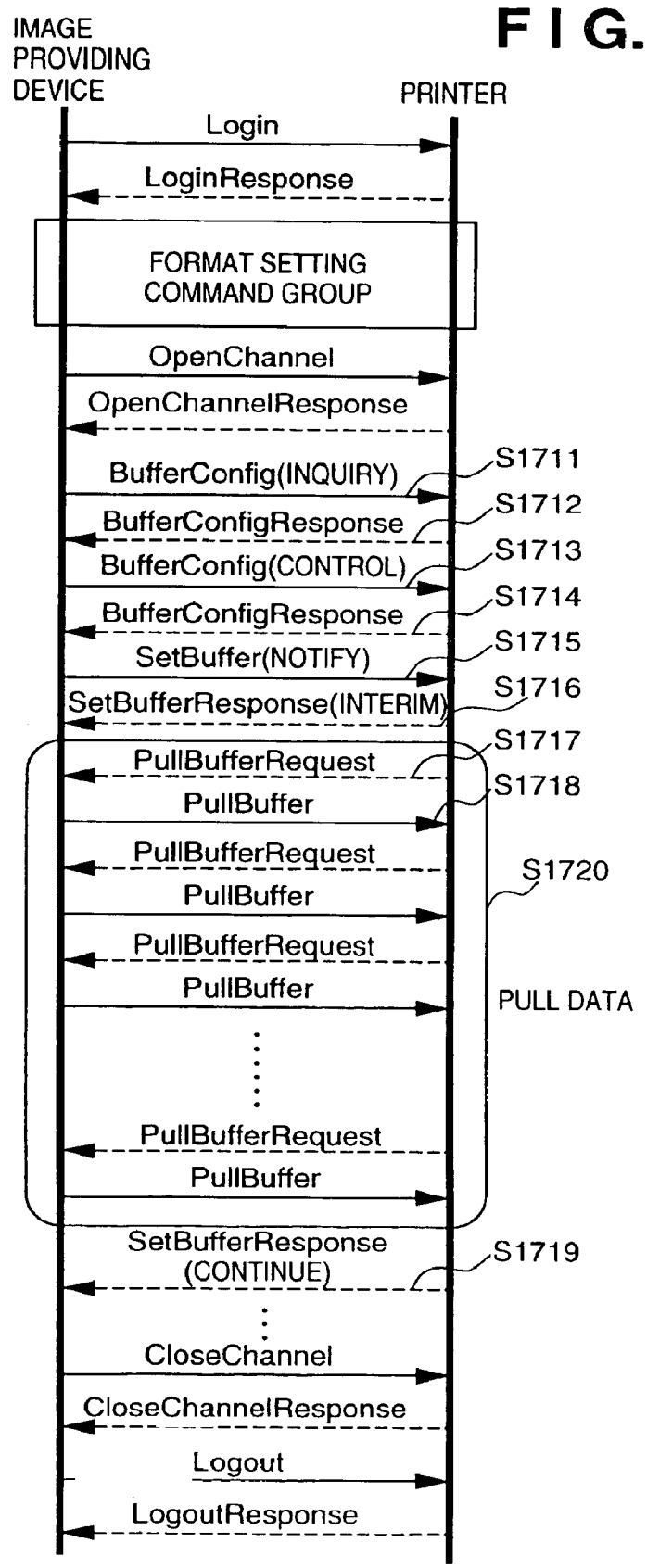
FIG. 61 is a timing chart showing the flow of operation in the PULL buffer model between the image providing device and the printer.

FIG. 61 shows the flow of operation of the PULL buffer model between the image providing device and the printer. Note that the commands Login, Logout, OpenChannel and CloseChannel and format setting are similar to those in the above-described transfer method 1, therefore, detailed explanations of the commands and responses BufferConfig and SetBuffer (steps S1711 to S1714), which are the same as those in the above-described transfer method 3, will be omitted.

In FIG. 61, the image providing device notifies the printer that data transfer can be started by using the command SetBuffer indicating "NOTIFY" (step S1715). The printer returns the "INTERIM" SetBufferResponse indicating that the printer is prepared to receive data (step S1716) for the present, and let the image providing device start data transfer. Then, the printer notifies the image providing device that data transfer into the initially set buffer area has been completed, by using the SetBufferResponse indicating "CONTINUE" (step S1719).

The printer requires a read transaction by a command PullBufferRequest (step S1717). Then the image providing device transfers data by a PullBufferResponse packet (step S1718), thus data is sequentially written into the buffer address set in the printer.

Step S1720 Indicates processing of transferring a plurality of data frames. That is, the data is transferred by a series of read transactions to the area having the buffer size set by using the command BufferConfig. The data transfer method using a series of transactions is called a "PUSH data transfer method" or abbreviated to a "PUSH method".

Figure 62:
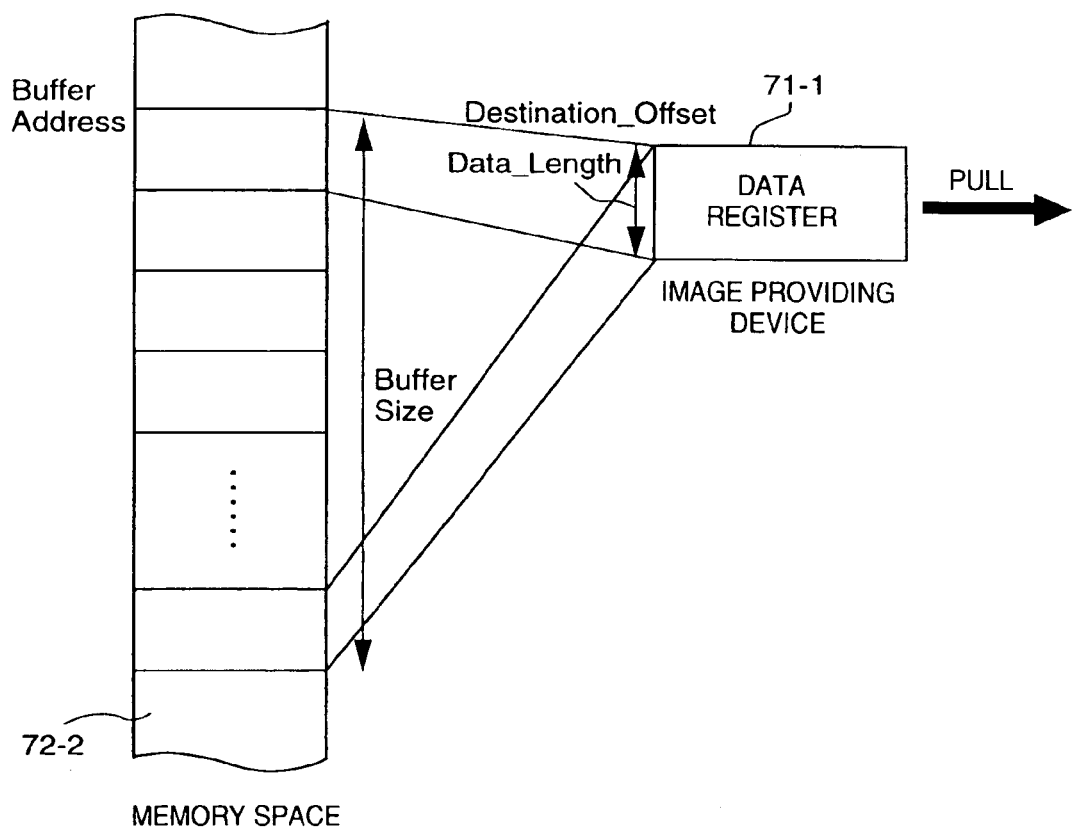
FIG. 62 is an explanatory view showing the relation between the data register and the buffer of the image providing device.

FIG. 62 shows the relation between the data register and the buffer of the image providing device. Data is read from a memory space 72-2 of the image providing device designated by "BufferAddress" determined by an offset "Destination_Offset" set in the data register 71-1. As the offset value is incremented by a data length indicated by "Data_Length", the data is continuously read from the area indicated by "BufferSize" by repeatedly writing the data into the series of buffer addresses.

[Transfer Method 5]

In the transfer method 5 as the Isochronous model, the print data transfer by using the asynchronous transaction in the above-described transfer method 1 is replaced with print data transfer by using an isochronous transaction. Note that the structure of a data packet is the same as that shown in FIGS. 46 and 47. Further, the data packet frame processing in the printer upon block transfer is the same as that in FIG. 48.

Note that according to the present transfer method, data transfer can be made at predetermined time by using an isochronous write transaction.

Further, in the block transfer, if an error occurs upon transferring print data for one page for one data transfer, it takes a long time to re-transfer the print data for one page. However, if print data is transferred in more fine block units, e.g., print-band units of an ink-jet printer, print data re-transfer due to the occurrence of error can be efficiently performed.

Figure 63:
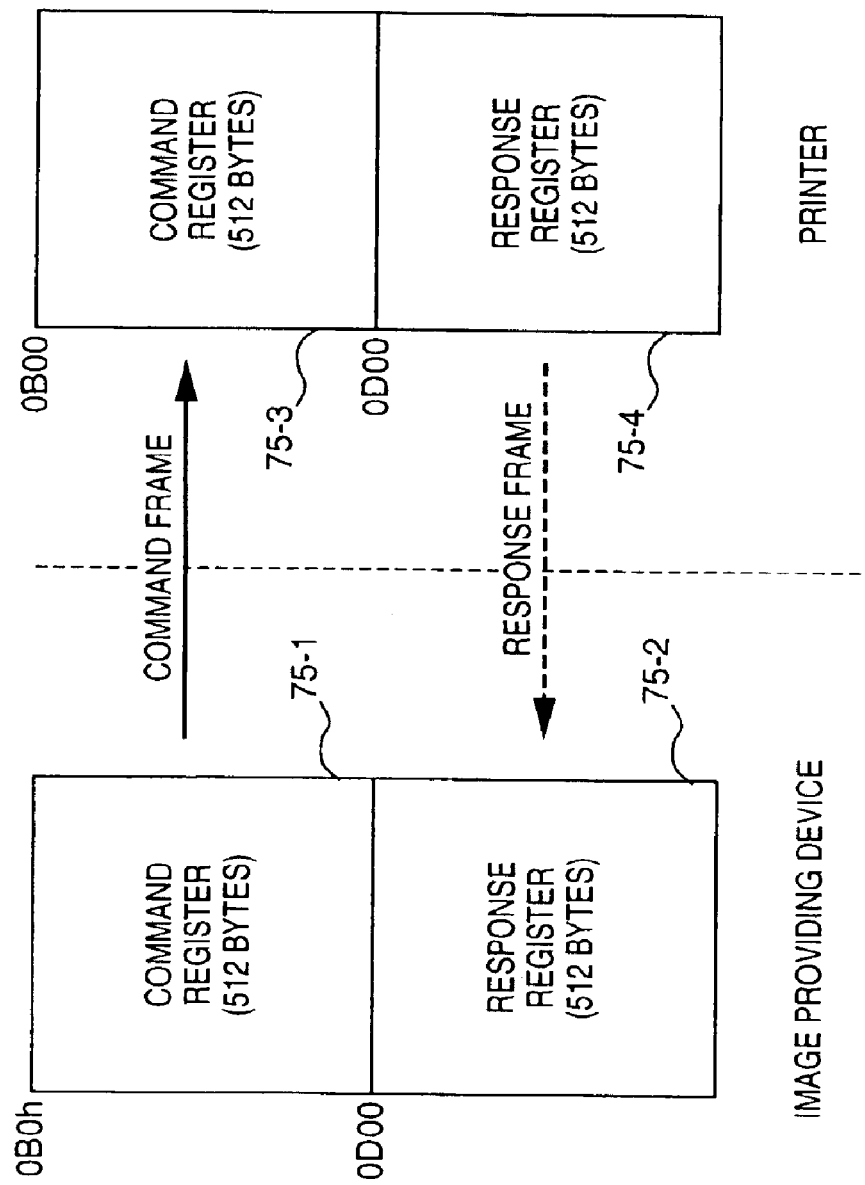
FIG. 63 is an explanatory view showing memory allocation for command registers and response registers for flow control.

FIG. 63 shows command registers and response registers for flow control. The image providing device writes a command frame into a command register 75-3 of the printer by an asynchronous write transaction. The printer writes a response frame to the command into a response register 75-2 of the image providing device by an asynchronous write transaction.

Figure 64:
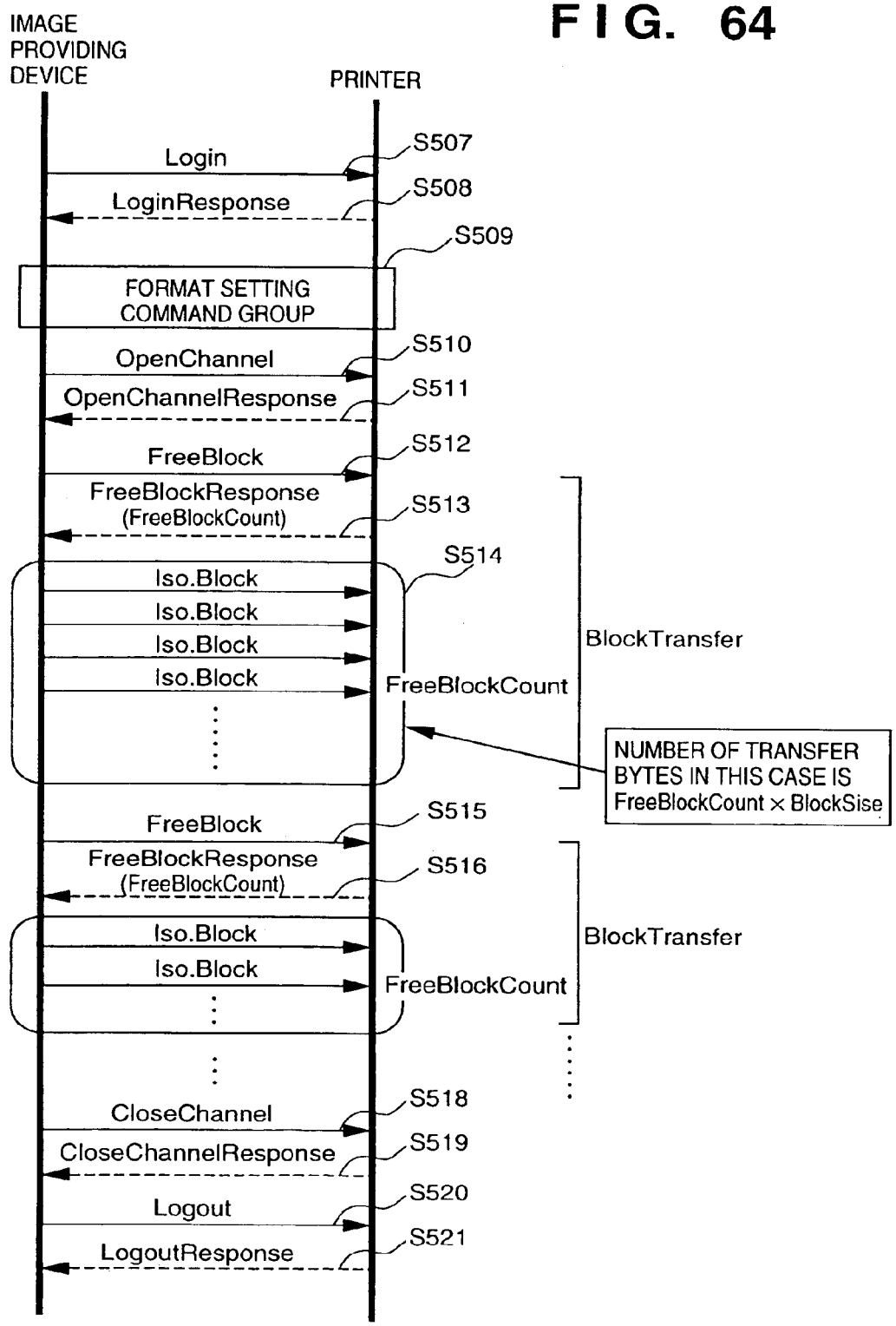
FIG. 64 is a timing chart showing the flow of print processing.

FIG. 64 shows the flow of print processing. First, similar to the above-described transfer method 1, the image providing device sends the command Login to the printer (step S507). The printer returns the LoginResponse (step S508), thus connection is established.

Next, similar to the above-described transfer method 1, the image providing device performs format setting (step S509), and sends the command OpenChannel to the printer (step S510). The printer returns the OpenChannelResponse (step S511), thus a logic channel is opened.

Then, the image providing device sends the command FreeBlock to the printer (step S512). The printer returns the FreeBlockResponse (step S513). The FreeBlockResponse includes the number of FreeBlock and ErrorStatus. The number of FreeBlock is the number of block buffers ensured in block units in the memory space of the printer. The ErrorStatus is used to notify the image providing device of error information in previous block transfer. Note that the printer always returns "normal" as the ErrorStatus to the first command FreeBlock after the logic channel has been opened.

Then, the image providing device block-transfers print data by an isochronous transaction (step S514). At this time, the image providing device sends data packets of the number corresponding to the FreeBlockCount.

Next, the image providing device sends the command FreeBlock to the printer (step S515). The printer returns the FreeBlockResponse (step S516). If the ErrorStatus of the response indicates "abnormal", i.e., if an error has occurred at the previous block transfer, the image providing device sends the data transferred at step S514 again (step S517). Thereafter, the processing at steps S515 to S517 is repeated until the data transfer has been normally completed. Further, if the ErrorStatus indicates "normal", the image providing device sends data packets of the number indicated by the FreeBlockCount included in the FreeBlockResponse (step S517).

Note that the printer determines whether or not an error has occurred by referring to the block count of the header in transferred data (FIG. 64). Further, if the FreeBlockCount is greater than the number of blocks of data to be transferred, the image providing device sends dummy packets of a number corresponding to the excessive blocks.

Then, data transfer by an isochronous transaction is repeated until all the series of print data have been outputted from the image providing device.

When the data transfer has been completed, similar to the above-described transfer method 1, the image providing device closes the logic channel by the command and response CloseChannel (steps S518a and S519), and logs out from the printer by the command and response Logout of the DPP protocol (steps S520 and S521).

As described above, according to the present embodiment, the image providing device and the printer are directly connected by using the 1394 serial bus or the like, and image data is directly sent from the image providing device to the printer, so that the printer prints an image based on the image data.

Further, as control commands and print data are separated, the embodiment provides an efficient data transfer methods in the 1394 serial bus or the like.

Further, the embodiment provides a data transfer method which recovers a transfer error in the 1394 serial bus.

Further, the embodiment provides a data transfer method in which determination whether or not data can be written into the register area is unnecessitated by notification of the number of available blocks of a register area for data transfer, and the overhead necessary for the determination is removed. Further, the embodiment provide an efficient data transfer method since as data for the notified number of available blocks is transmitted and received.

Further, according to the embodiment, a data transfer method appropriate to a transfer destination device can be selected from a plurality of data transfer methods.

Further, the embodiment provides a data transfer method which avoids degradation of transfer efficiency due to command transmission upon data transfer from a host device to a target device, by only using a command instructing to start data transmission and a response to the command, i.e., transmitting no command after the start of the data transfer.

Further, the embodiment provides a data transfer method based on the PUSH method or PULL method upon data transfer between a host device and a target device.

Further, the embodiment provides a data transfer method which performs isochronous transfer and asynchronous transfer in the same transfer procedure upon data transfer between a host device and a target device.

Further, the embodiment provides a data transfer method in which, when a transfer error occurs at a certain part of data in isochronous transfer, performs re-transfer the part of data where transfer the error has occurred, upon data transfer between a host device and a target device.

Further, the embodiment provides a data transfer method which performs proper data transfer even if bus reset occurs in data transfer between a host device and a target device.

Further, a peripheral device such as a printer which utilizes the above data transfer methods can be provided.

[Modification of the First Embodiment]

Note that the above embodiment has been described in a case where a network is constructed by using the IEEE 1394 serial bus, however, the present invention is not limited to the 1394 serial bus. For example, the present invention is applicable to a network constructed by using an arbitrary serial interface such as a Universal Serial Bus (USB).

In the above-described embodiment, commands and responses to the commands based on the FCP protocol are employed, and information is set at the response and notified to the host device. However, a method of mapping a register on a memory as the characteristic feature of the IEEE 1394 memory bus model can be considered.

In this case, a command is executed by writing command data into a command register assigned to a specific address of the memory. Similarly, a response is indicated by reading data at a response register assigned to a specific address of the memory.

Accordingly, when the target device recognizes that a command has written into a command register, the target device executes the command, and writes the result of the execution of the command and information into a response register. The host device which has written the command into the command register reads the response register of the target device and obtains the result of the execution of the command and information.

Thus, the present invention can be realized by using registers in the memory bus model.

In the above-described embodiment, discussing examples which have a target device as a printer. However, the target device of the present invention is not limited to the printer. That is, some device recording image data such as a display apparatus and a storage apparatus applies to the target device of the present invention.

[Second Embodiment]
<Outline>

Figure 65:
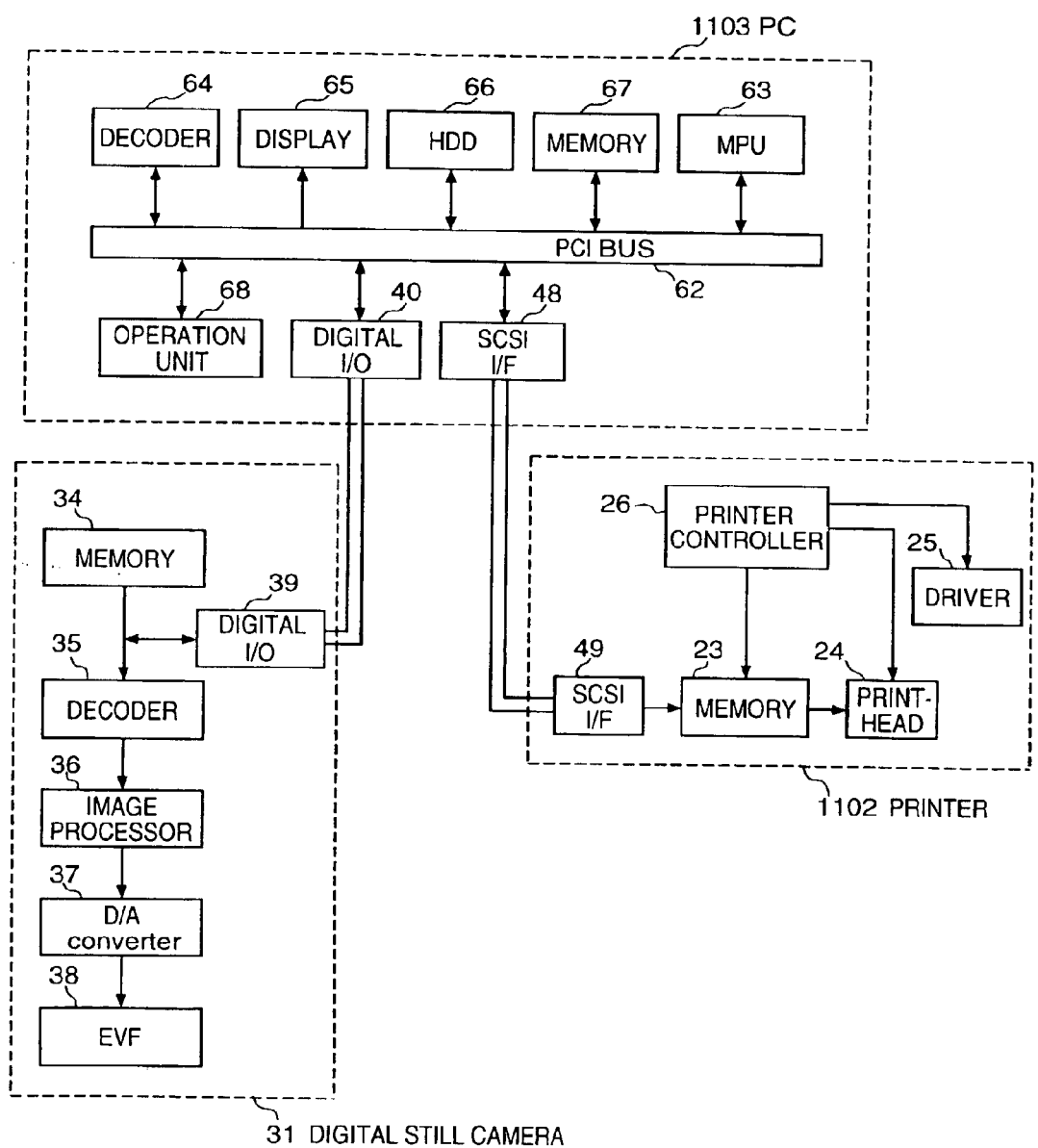
FIG. 65 is a block diagram showing an example of a network system constructed with a digital interface.

Next, a second embodiment of the present invention will be described as an example where so-called direct printing is realized in a network constructing by connecting a PC, a printer, other peripheral devices, a recording/reproducing device such as a digital still camera or a digital video camera, with a general-purpose interface such as the 1394 serial bus, so as to solve problems of a digital interface as shown in FIG. 65. In this network, the direct printing is realized by data communication among the devices so as to read video data from the recording/reproducing device into the PC and to directly transfer the video data to the printer.

That is, the printer can be directly connected to the PC, and it can be directly connected to the digital still camera, or the digital video camera.

Figure 66A:
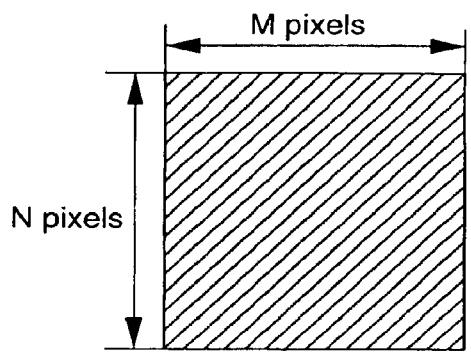
FIGS. 66A to 66D are examples of the types of a memory of a printer 1102 in FIG. 65.
Figure 66B:
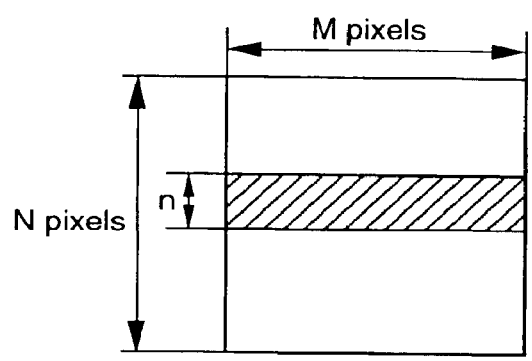
Figure 66C:
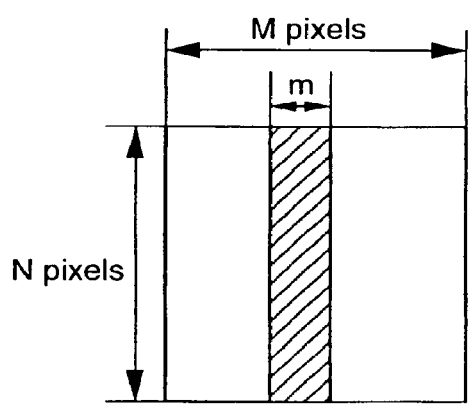
Figure 66D:
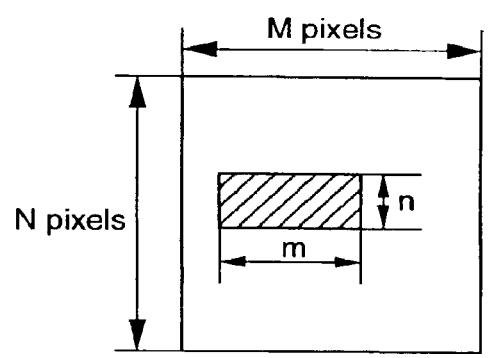

Further, a memory 23, for image mapping, included in a printer 1102 as shown in FIG. 65, has a capacity which changes in accordance with the printing method and type of the printer 1102. For example, the memory 23 has a capacity type for storing N×M (N: the total number of pixels in a vertical direction, M: the total number of pixels in a horizontal direction) dot image information, as shown in FIG. 66A; a capacity type for storing n×M (n: a predetermined number of pixels in the vertical direction) dot image information, as shown in FIG. 66B; a capacity type for storing N×m (m: a predetermined number of pixels in the horizontal direction) dot image information, as shown in FIG. 66C, contrary to FIG. 66B; and a capacity type for storing n×m dot image information, as shown in FIG. 66D. Accordingly, it is necessary to determine a data block size used in data transfer in accordance with the capacity of the memory 23 of the printer 1102.

Further, it is necessary to transfer image data in the determined block size, by determining the format of the image data in accordance with the processing capability of a printer engine of the printer.

The present embodiment employs the 1394 serial bus as an interface connecting the printer, and performs data transfer in the asynchronous transfer mode. In this data transfer, in accordance with the memory capacity of the printer for storing image data for one data transfer, a transfer start address and a transfer end address of image data corresponding to a start point and an end point of spatial address information for the image are sent as a command signal from the printer to the PC, the digital still camera or the like. Then, the PC, the digital still camera or the like which has received the command determines the amount of data transferred to the printer for one data transfer, and performs image data transfer.

Further, in a case where a command signal indicative of the processing capability of the printer engine is used, the format of image data (YUV=4:1:1, 4:2:2, 4:4:4 and the like) is selected in accordance with the command signal. By this selection, the PC, the digital still camera or the like can transfer data by a constant amount, for one data transfer.

The above data transfer method improves the data transfer efficiency in the 1394 serial bus. Accordingly, even in a network connecting a plurality of devices, data-waiting time of a printer can be reduced without degrading the throughput of data transfer among peripheral devices, and printing throughput can be improved.

<Construction>

Figure 67:
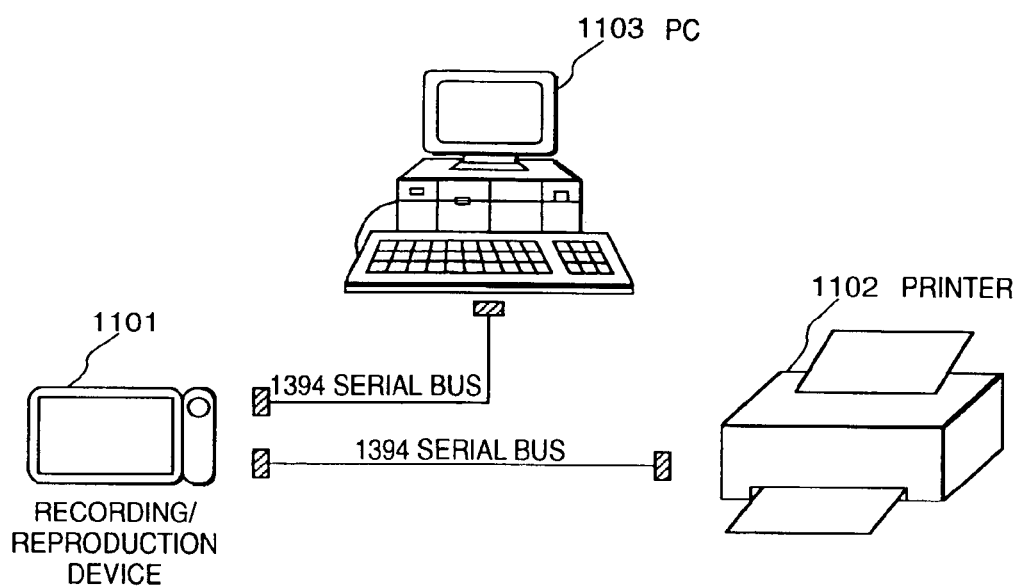
FIGS. 67 and 68 are explanatory views showing network constructions of the system.
Figure 68:
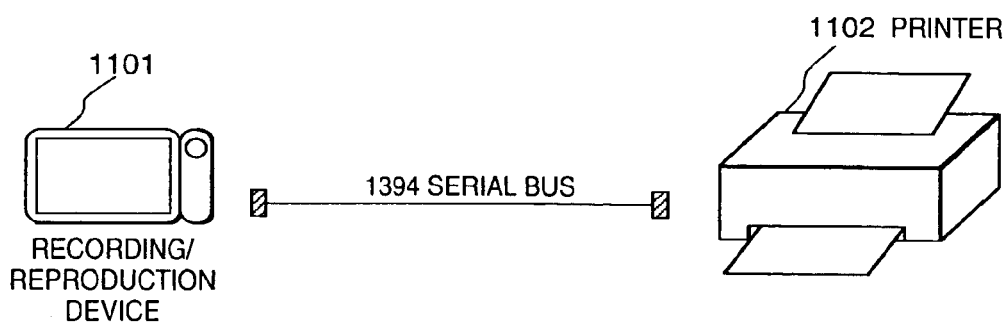

FIGS. 67 and 68 show the network constructions of the image processing system according to the second embodiment.

The network in FIG. 67 comprises a recording/reproduction device 1101, the printer 1102 and a personal computer (PC) 1103. The respective devices can perform data transfer based on the specification of the 1394 serial bus. The recording/reproduction device 1101 is a digital still camera, a camera-integrated type digital VTR or the like. In this case, direct printing is possible by directly transferring video data outputted from the recording/reproduction device 1101 to the printer 1102.

Figure 69:
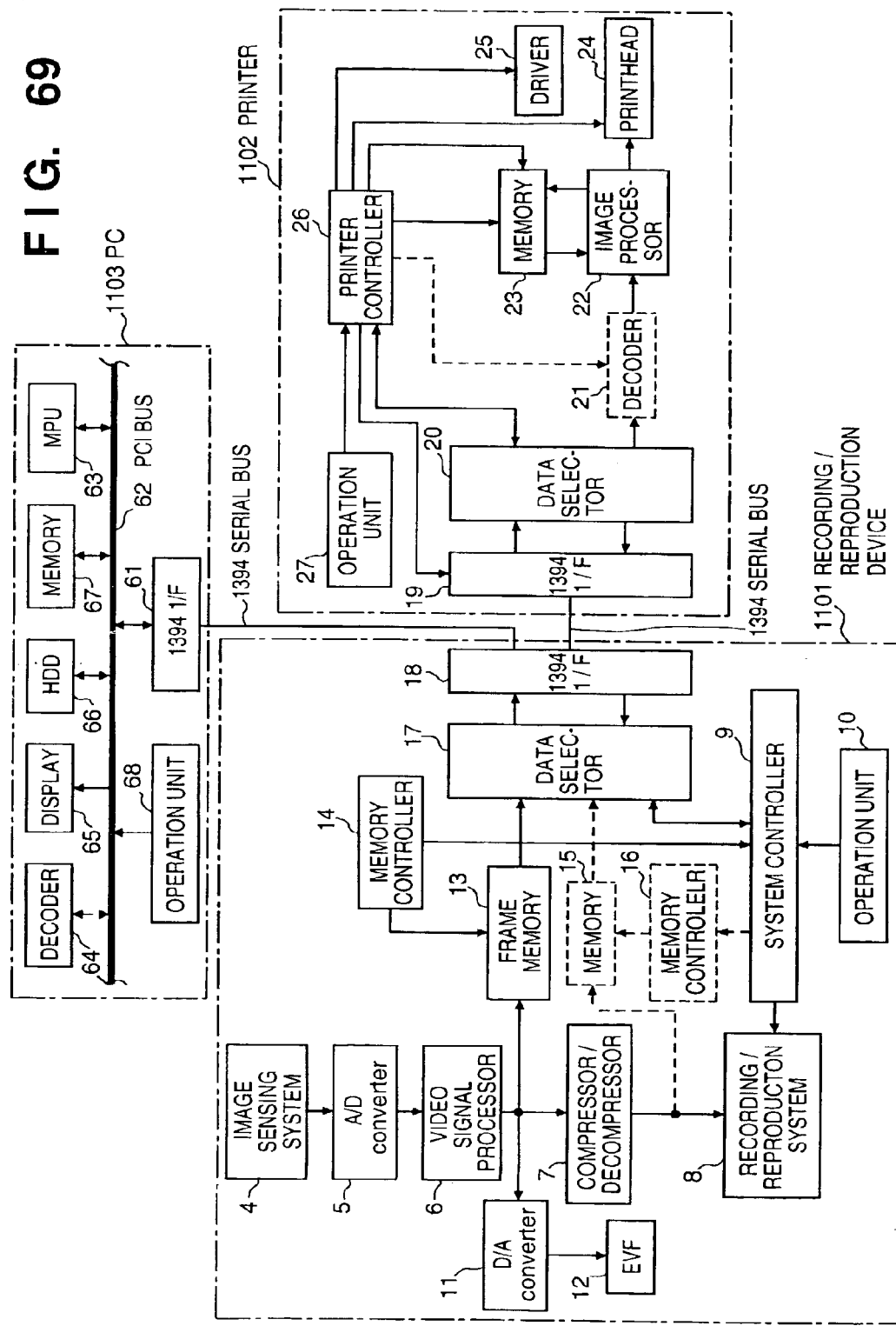
FIG. 69 is a block diagram showing the detailed constructions of a recording/reproduction device 1101, the printer 1102 and a PC 1103.

FIG. 69 is a block diagram showing the constructions of the recording/reproduction device 1101, the printer 1102 and the PC 1103 in detail.

In the recording/reproduction device 1101, numeral 4 denotes an image sensing system; 5, an A/V converter; 6, a video signal processor; 7, a compressor/decompressor for performing data compression upon recording and data decompression upon reproduction by a predetermined algorithm; 8, a recording/reproduction system including a magnetic tape, a solid memory, a recording/reproduction head and the like; 9, a system controller; 10, an operation unit for user's instruction input; 11, a D/A converter; 12, an electronic view finder (EVF) as a display device; 13, a frame memory for storing video data transferred in a non-compressed format; 14, a memory controller which controls reading data from the frame memory 13; 17, a data selector; and 18, a 1394 serial bus interface (I/F) unit.

In the printer 1102, numeral 19 denotes a 1394 serial bus interface (I/F) unit; 20, a data selector; 22, an image processor for print image data; 23, a memory for mapping a print image; 24, a printhead; 25, a driver for driving the printhead 24 and performing paper feed; 26, a printer controller as a controller of the printer 1102; and 27, an operation unit for user's instruction input.

In the PC 1103, numeral 61 denotes a 1394 serial bus interface (I/F) unit; 62, a Peripheral Component Interconnect (PCI) bus; 63, an MPU; 65, a display device including a D/A converter; 66, a hard disk drive (HDD); 67, a memory; and 68, an operation unit having a keyboard, a mouse and the like.

Further, as represented with a broken line in FIG. 69, it may be arranged such that the recording/reproduction device 1101 has a memory 15 and a memory controller 16 for outputting compressed image data without any processing on the data, the printer 1102 has a decoder 21 for decoding video data compressed by the predetermined algorithm, and the PC 1103 has a decoder 64 for decoding video data compressed by the predetermined algorithm.

<Operation>

Next, the operation of the second embodiment will be described in order. In the following description, for the sake of simplification, explanation of a case where compressed image data is outputted without any processing on the data will be omitted. Further, the recording/reproduction device 1101, the printer 1102 and the PC 1103 may be controlled by executing control programs loaded in a RAM from storage mediums of external storage devices of the respective devices; in this case, at least a part of the control programs for the recording/reproduction device 1101 and the printer 1102 may be downloaded from the PC 1103.

First, upon recording by the recording/reproduction device 1101, a video signal, representing a video image outputted from the image sensing system 4, is digitized by the A/D converter 5, and processed by the video signal processor 6. The output from the video signal processor 6 is converted, by the D/A converter 11, into an analog signal, as a video image in image sensing, and displayed on the EVF 12. Further, the output from the video signal processor 6 is compressed by the compressor 7 by the predetermined algorithm, and recorded by the recording/reproduction system 8 into a recording medium. The representative data compression methods used as the predetermined algorithm are a method by the Joint Photographic Image Coding Experts Group (JPEG method), a compression method based on discrete cosine transformation (DCT) for a private-use digital VTR and a variable length coding (VLC), a method by the Moving Picture Image Coding Experts Group (MPEG method) as a moving-image compression method, and the like.

Upon reproduction by the recording/reproduction device 1101, a desired video image is reproduced from the recording medium by the recording/reproduction system 8. The selection of the desired video image is made by the system controller 9 in accordance with an instruction inputted from the operation unit 10. Among video data reproduced from the recording medium, data to be transferred in a compressed form is outputted to the memory 15. When reproduction data is decompressed so as to be transferred as a non-compressed data, the decompressor 7 decompresses the reproduction data and outputs the frame memory 13. Further, when a reproduced video image is displayed on the EVF 12, the reproduction data is decompressed by the decompressor 7, converted into an analog signal by the D/A converter 11, supplied to the EVF 12, and the reproduced video image is displayed there.

The memory controller 14 controlled by the system controller 9 controls writing/reading data from/into the frame memory 13. Video data read from the frame memory 13 is sent to the data selector 17.

The system controller 9 controls the operations of the respective components of the recording/reproduction device 1101. The system controller 9 generates control commands for externally-connected devices such as the printer 1102 and the PC 1103, and transmits the commands via the data selector 17 and the 1394 serial bus to the external devices. Various commands sent from the printer 1102 and the PC 1103 are inputted via the data selector 17 into the system controller 9, and used for controlling the respective components of the recording/reproduction device 1101. Among these commands, a command indicative of the existence/absence of a decoder or indicative of the decoder type is inputted as a request command into the system controller 9, and transferred to the data selector 17 when transferring video data from the recording/reproduction device 1101, and in accordance with this command, video data read from the frame memory 13 or the memory 5 is transferred.

Video data and command outputted from the data selector 17 are transferred by the interface unit 18 in accordance with the protocol of the 1394 serial bus. If the video data is to be used for printing, it is received by the printer 1102, while if the video data is to be inputted into the PC 1103, it is received by the PC 1103. Similarly, the command is transferred to an appropriate node. Moving image data, still image data or sound data is transferred by the isochronous transfer, and a command is transferred by the asynchronous transfer. Note that data usually transferred by the isochronous transfer may be transferred by the asynchronous transfer when it is determined, based on transfer status of the 1394 serial bus, that the asynchronous transfer is convenient.

Next, data inputted into the interface unit 19 of the printer 1102 is classified based on data type by the data selector 20, and data to be printed such as video data is inputted into the image processor 22.

In the image processor 22, image processing appropriate to printing is performed on the input data. Then, the processed data is mapped as a print image in the memory 23 read/write controlled by the printer controller 26, sent to the printhead 24, and printing is performed.

The driver 25 drives the printhead 24 and performs paper feed. The printer controller 26 controls the operations of the driver 25 and the printhead 24 and other components. The operation unit 27 of the printer 1102 is used by the user for inputting instructions of paper feed, reset, ink check, standby/start/end of printer operation and the like. The respective components are controlled by the printer controller 26 in accordance with the instruction inputs.

Further, when the data inputted into the interface unit 19 is a command to the printer 1102, the data is transferred as a control command from the data selector 20 to the printer controller 26. The printer controller 26 performs control in accordance with the command. Further, the printer controller 26 generates command for the recording/reproduction device 1101 and the PC 1103 and transmits commands to these devices.

In this manner, direct printing, where video data is transferred from the recording/reproduction device 1101 to the printer 1102, is performed, and print processing is performed without processing by the PC 1103.

Next, the processing performed by the PC 1103 will be described.

Video data transferred from the recording/reproduction device 1101 to the interface unit 61 of the PC 1103 is transferred to the respective components of the PC 1103 via the PCI bus 62. Further, transfer of various commands and data in the PC 1103 is performed by using the PCI bus.

The PC 1103 performs processing by the MPU 63 by using the memory 67 as a work memory, in accordance with the operating system (OS) and an application software program. When recording video data to be transferred is stored, it is stored into the HDD 66.

In the present embodiment, the video data to be transferred is non-compressed data, however, if the PC 1103 has a decoder function (decoder 64) for decompressing compressed data, compressed data may be transferred. When displaying a video image represented by video data on the display 65, if the video data is compressed, it is decoded by the decoder 64 and inputted into the display 65, while if the video data is non-compressed data, it is directly inputted into the display 65. The data is D/A converted, and a video image is displayed.

Note that the decoder 64 provided in the PC 1103 may be an MPEG decoder card inserted into a card slot or installed on the mother board of the PC 1103, a software decoder program corresponding to a MPEG or JPEG method held in a ROM or the like. The MPU 63 generates information indicative of existence/absence of decoder or decoder type as a command and transfers the command to the recording/reproduction device 1101.

In this manner, transferred video data is inputted into the PC 1103, stored, edited or transferred to another device.

[Processing Procedure]

Figure 70:
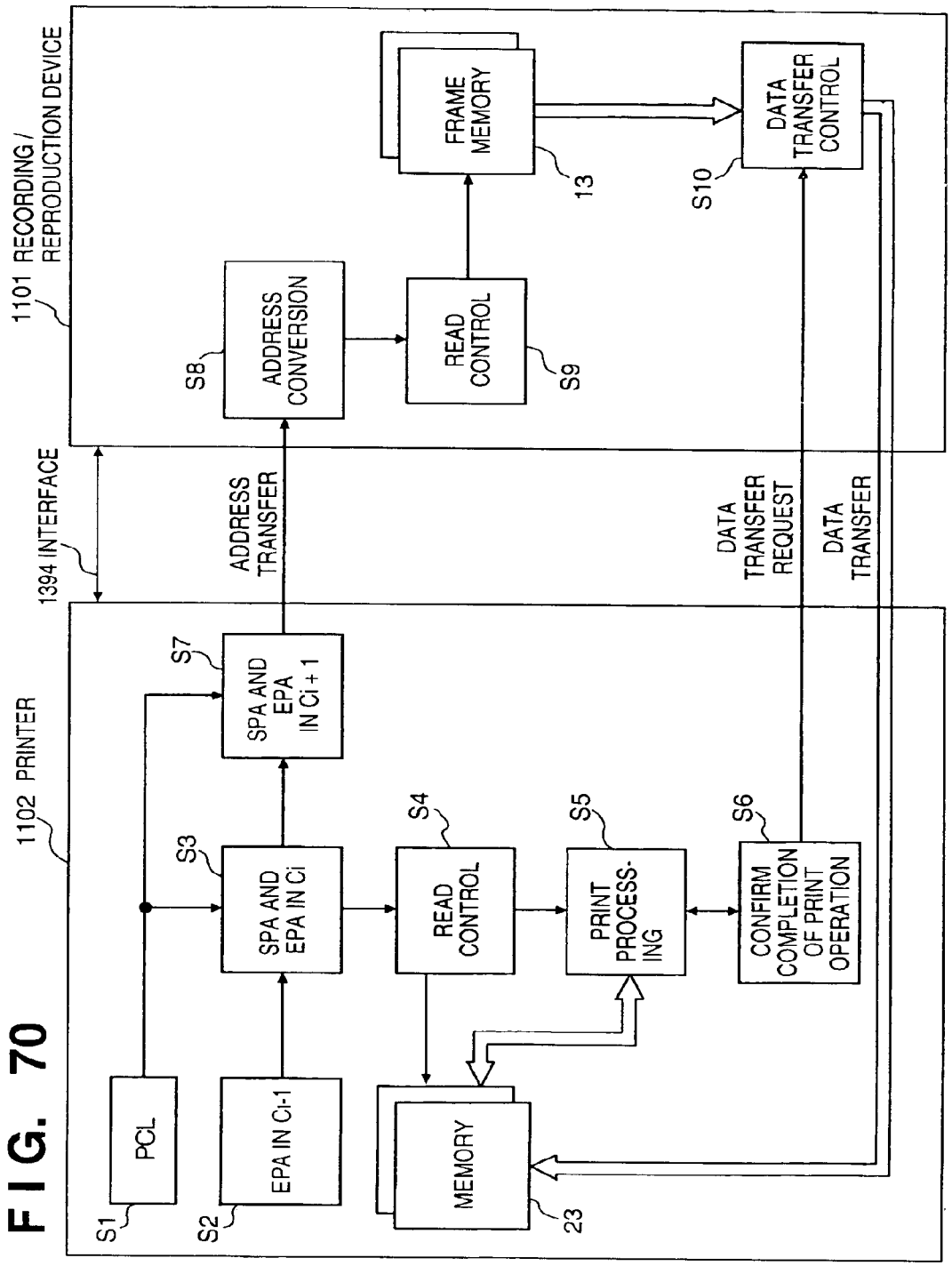
FIG. 70 is a block diagram showing data flow in case of transferring data from the recording/reproduction device 1101 to the printer 1102.

Next, a processing procedure in case of transferring data from the recording/reproduction device 1101 to the printer 1102 will be described with reference to the data flow in FIG. 70. Note that FIG. 70 shows address control relating to read/write operation of the frame memory 13 of the recording/reproduction device 1101 and that of the memory 23 of the printer 1102 in FIG. 69, and the flow of transferred data.

First, in the printer 1102, a minimum print unit (hereinafter referred to as "printer cycle length (PCL)"), corresponding to the capacity of the memory 23 of the printer 1102, is set (step S1). The PCL is a value indicative of the minimum image data amount corresponding to the print cycle set by the memory space of the memory 23 for storing image data, as shown in FIGS. 66A to 66D.

Assuming that a print cycle at some timing is called a cycle ci, the previous print cycle is ci−1. Regarding image data printed by the previous print cycle ci−1, an end point address (EPA) is determined (step S2), and based on the EPA in the cycle ci−1, a start point address (SPA) and an end point address (EPA) of image data to be printed in the cycle ci are set (step S3). The set address information from the SPA to the EPA in the cycle ci is forwarded to read control (step S4) as the read address of the memory 23, and further, forwarded to print processing (step S5) using data read from the memory 23. When the series of print processings in the cycle ci has been completed, the process enters a phase to confirm the completion of print processing (step S6).

On the other hand, in parallel to the processing at step S3, step S7 for calculating SPA and EPA in the next print cycle ci+1 is activated, and the addresses of image data necessary for the next print cycle are transferred to the recording/reproduction device 1101 by the asynchronous transfer. The SPA and EPA data are set at predetermined positions of a data field (4×N bytes) and transferred by packet transfer, as shown in FIGS. 13 and 14. At step S8, the processing by the recording/reproduction device 1101 converts the transferred address data into an address for the frame memory 13. The converted address is forwarded to processing to set the read address of the memory 13 (step S9).

Data indicative of the completion of a print cycle, issued at the processing to confirm the completion of print processing (step S6), is transferred as a data transfer request to the recording/reproduction device 1101 by asynchronous transfer, and image data transfer from the frame memory 13 to the printer 1102 is required (step S10).

The image data transfer from the recording/reproduction device 1101 to the printer 1102 may be performed by asynchronous transfer similar to the command transfer, however, it may be arranged such that the image data is stored into the data field for the isochronous transfer as shown in FIGS. 15 and 16 and transferred by isochronous transfer.

As described above, the printer 1102 transfers address data, indicative of the position of image data of a predetermined amount, necessary for the next print cycle, to the recording/reproduction device 1101 as an image data input device. Then, when the completion of print cycle has been confirmed, the printer sends a data transfer request to the recording/reproduction device 1101, and the recording/reproduction device 1101 sends image data corresponding to a previously-transferred address to the printer 1102. In this manner, as the printer 1102 sends the address of the image data and data indicative of the completion of print cycle to the recording/reproduction device 1101, the image data can be most efficiently transferred, by a data amount which is not greater than the capacity of the memory 23 of the printer 1102, from the recording/reproduction device 1101 to the printer 1102.

Note that in FIG. 70, the two addresses SPA and EPA for the next print cycle are sent to the recording/reproduction device 1101, however, it may be arranged such that the SPA and the PCL indicative of the length of image data are sent to the recording/reproduction device 1101.

<Structure of Transfer Data>

Figure 71:
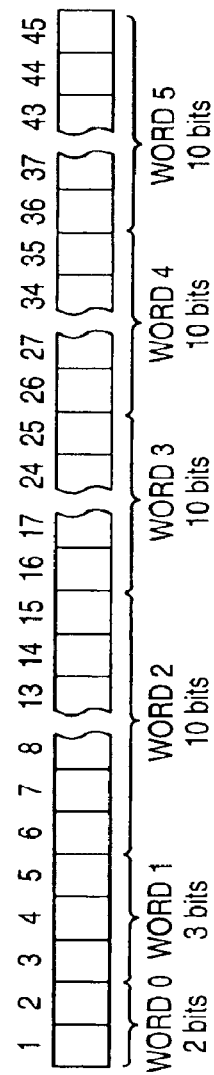
FIG. 71 is a schematic view showing the format of address data sent from the printer 1102 to the recording/reproduction device 1101.

FIG. 71 shows the structure of address data sent from the printer 1102 to the recording/reproduction device 1101.

Figure 72:
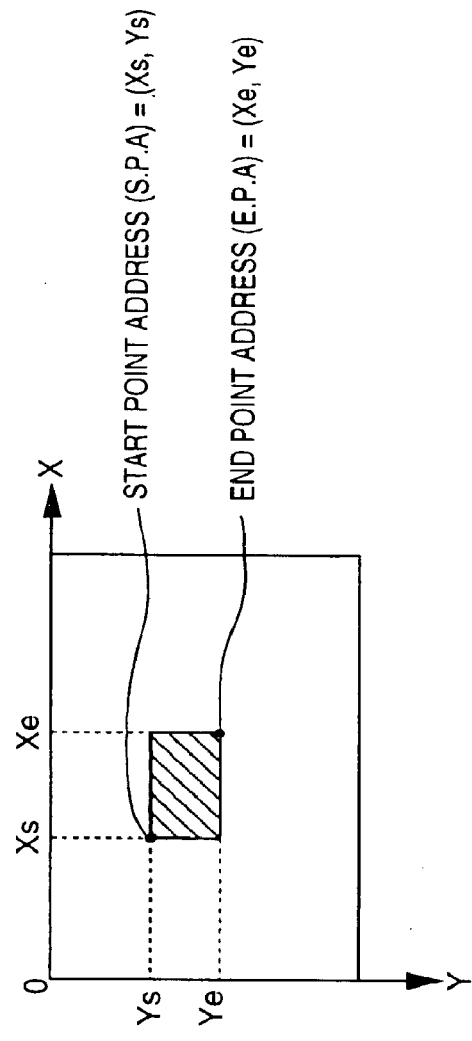
FIG. 72 is a graph showing start point and end point addresses.

In FIG. 71, the address data of 45 bits includes a 2-bit WORD 0 indicative of a data transfer request, a 3-bit WORD 1 indicative of a memory type, and totally 40-bit WORDs 2 to 5 indicative of SPA and EPA representing the spatial addresses by coordinates (x,y). Specifically, the 20 bits of the WORDs 2 and 3 represent coordinates (Xs,Ys) of the SPA, and the 20 bits of the WORDs 4 and 5 represent coordinates (Xe,Ye) of the EPA (See FIG. 72).

FIG. 73 shows the statuses of data transfer request indicated by the WORD 0. If the value of the WORD 0 is "00", the status is "no request"; if the value is "11", the status is "transfer request", meaning that a request exists; and if the value is "10", the status is "stand by", meaning that a request will occur soon. Although a detailed explanation will be omitted, when it is detected that a print cycle will be completed soon, or based on the reading status of the memory 23, the WORD 0 is set to "10".

FIG. 74 shows memory types indicated by the WORD 1. For example, the WORD 1 indicates the format of the memory 23 as one of the memory format as shown in FIGS. 66A to 66D. Note that types A to D correspond to the memory formats in FIGS. 66A to 66D.

FIG. 75 shows addresses of the coordinates of the SPA and EPA. In FIG. 75, the 10 bits of the WORD 2 represent the address of the coordinate Xs; the 10 bits of the WORD 3, the address of the coordinate Ys; the 10 bits of the WORD 4, the address of the coordinate Xe; and the 10 bits of the WORD 5, the address of the coordinate Ye.

Note that FIG. 69 shows the system where the PC 1103 is also connected to the recording/reproduction device 1101 with the 1394 serial bus. In the description with reference to FIG. 70, no description has been made on the PC 1103. In a case where the PC 1103 transfers image data to the printer 1102, the processing is the same as the image data transfer from the recording/reproduction device 1101 to the printer 1102 except that the frame memory 13 of the recording/reproduction device 1101 is replaced with the memory 67 of the PC 1103, and therefore, the detailed description of the processing will be omitted.

[Third Embodiment]

Next, a third embodiment of the present invention will be described as an example where the printer 1102 notifies the recording/reproduction device 1101 and the PC 1103 of the performance of a printer engine. The performance of the printer engine is the processing capability of the printer determined by the printhead 24 and the driver 25.

For example, when using an ink-jet printer, its printing resolution is determined by a nozzle pitch, i.e., an interval between ink-discharge nozzles of the printhead. The higher the printing resolution, the higher the print-output quality, however, the amount of image data increases in proportion to the printing resolution, which dissolves the proportion among data transfer speed, image-data conversion speed, and printing speed of the printer, thus causing wasteful waiting time in image data transfer or print processing.

Figure 76:
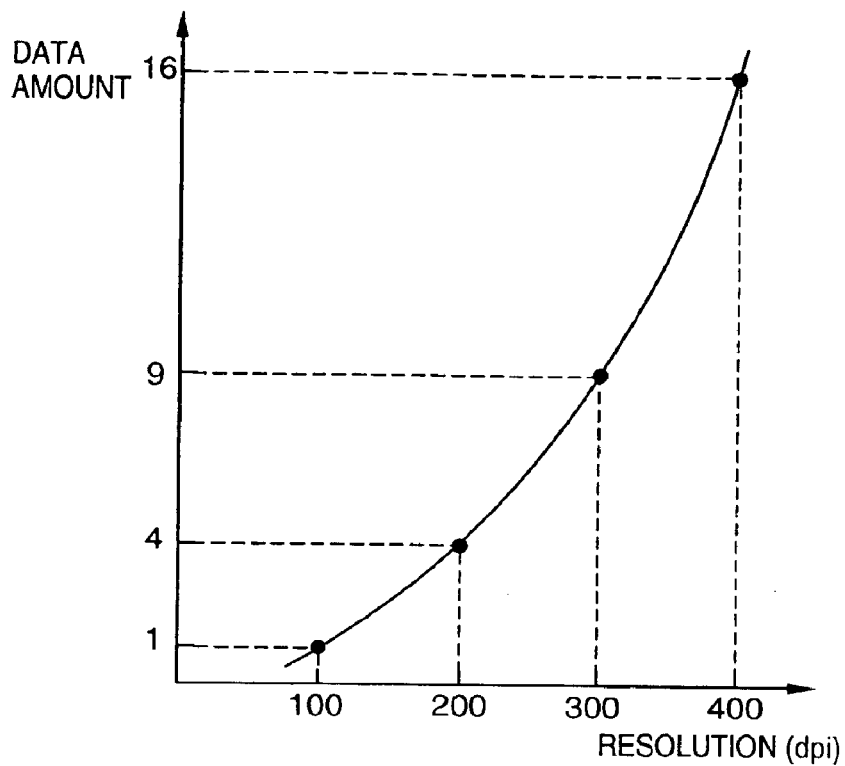
FIG. 76 is a graph showing the relation between a printing resolution and an amount of image data.

FIG. 76 shows the relation between the printing resolution and the amount of image data. If the amount of image data is represented as "1" when the printing resolution is 100 dpi, then the amount of image data is "4" when the printing resolution is 200 dpi; the amount of image data is "16" when the printing resolution is 400 dpi; and the amount of image data is "64" when the printing resolution is 800 dpi. It is understood from this relation that the amount of image data increases in proportion to the second power of the printing resolution.

Figure 77:
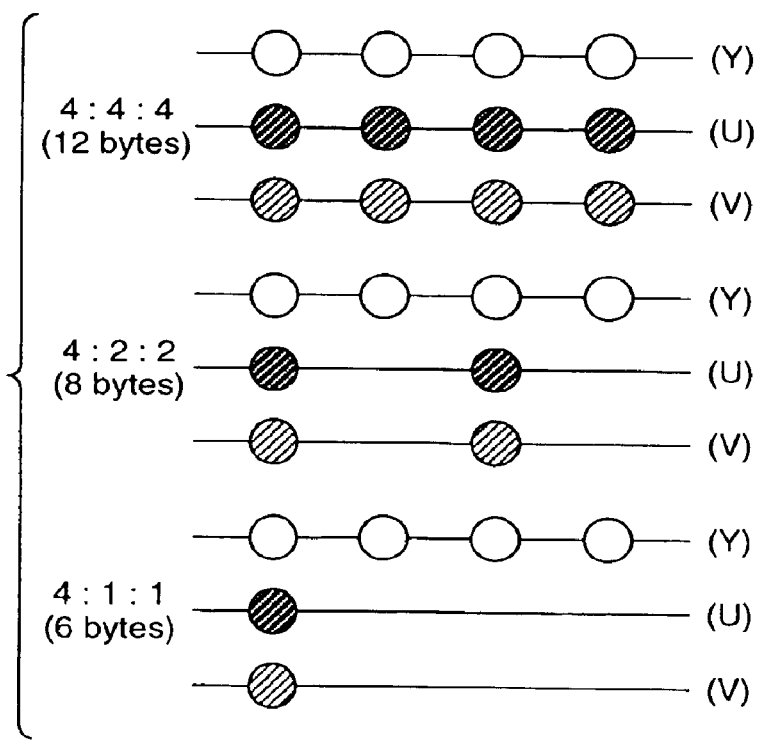
FIG. 77 is explanatory view showing data amounts for four pixels in respective formats of YUV image data.

FIG. 77 is explanatory view showing data amounts for four pixels in respective formats of YUV image data. If the brightness data Y has 8 bits, and both the color difference data U and V have 8 bits, the data amount is 12 bytes for four pixels in a 4:4:4 format; the data amount is 8 bytes for four pixels in a 4:2:2 format; and the data amount is 6 bytes for four pixels in a 4:1:1 format. That is, the data amount can be reduced to ⅔ or ½ by changing the data format.

Accordingly, regarding a printer having a high-resolution printer engine, a data format for a small data amount is employed, while regarding a printer having a low-resolution printer engine, a data format for a large data amount is employed. This controls the amount of image data transferred for one data transfer, and controls the size of a data packet used in the data transfer.

Next, the merits of controlling the block size of image data or limiting the data packet size will be described.

As shown in FIG. 16, in the 1394 serial bus, the asynchronous transfer and the isochronous transfer are used. Different from the isochronous transfer where a data transfer channel can be reserved, in the asynchronous transfer, data transfer is often suspended when the traffic on the 1394 serial bus increases. In this situation, when a large amount of image data is transferred for one data transfer by the asynchronous transfer, the data transfer is performed if the 1394 serial bus becomes continuously busy; on the other hand, if the 1394 serial bus is exclusively used by the printer 1102 when transferring the large amount of image data by the asynchronous transfer, another device cannot perform data transfer by the asynchronous transfer.

This problem does not occur in a system where devices are one-to-one connected but can occur in a system where a number of devices are connected on the same bus and the devices respectively transfer/receive data. In the latter system, information on the printing resolution of a printer engine is transferred/received prior to data transfer, then a transfer originator node changes the data format of image data in accordance with the printing resolution, and prepares a packet to transfer the image data for one data transfer in a predetermined block size. In this manner, as the image data of the packetized block size is transferred for one data transfer on the bus by the asynchronous transfer, the bus is not exclusively used by the printer 1102. Further, the printer 1102 more efficiently receive the image data and perform print operation.

Further, the printing speed may be used as the information on the processing capability of the printer engine. In any case, the information indicates the amount of data processed by the printer 1102 per unit period.

Further, if the data packet size is constant, the printing speed can be reduced when the resolution increases, or the resolution can be reduced when the printing speed increases.

[Transfer Data Structure]

Figures 78, 79:
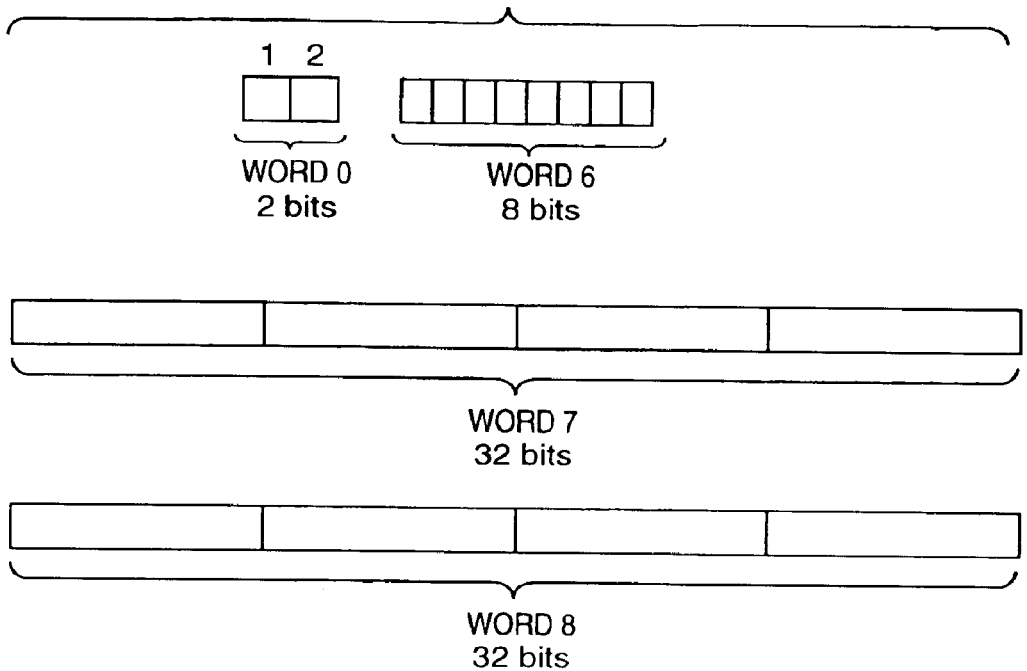
FIG. 78 is a schematic view showing the format of data transferred from the printer 1102 to the recording/reproduction device 1101.
FIG. 79 is a table showing image data formats and representation of these formats in a WORD 6 in FIG. 78.

FIG. 78 shows the structure of data transferred from the printer 1102 to the recording/reproduction device 1101. In FIG. 78, a 2-bit WORD 0 indicates a data transfer request; an 8-bit WORD 6 indicates image data format(s); a 32-bit WORD 7 indicates the resolution of a printer engine; and a 32-bit WORD 8 indicates the speed of the printer engine.

The WORD 0 indicates the status of the data transfer request by 2 bits, similar to that of the second embodiment.

The WORD 6 indicates one of image data formats of YUV data, RGB data, monochrome data and the like, available for the printer 1102, by 1 bit at a position corresponding to the format, as shown in FIG. 79. That is, if a plurality of image data formats are available, corresponding plural bits in the WORD 6 are "1".

The WORD 7 indicates the resolution (dpi) of the printer engine, up to 65,535 dpi as the maximum value, by 4 bits.

The WORD 8 indicates the printing speed (dot/s=Hz) of the printer engine, up to 65 kHz as the maximum value, by 4 bits.

As described above, according to the second and third embodiments, as the information on the processing capability of the printer 1102 is notified from the printer 1102 as the transfer destination node to the recording/reproduction device 1101 or the PC 1103 as the transfer originator node, data transfer can be efficiently performed based on the data processing capability of the printer 1102.

That is, when the recording/reproduction device 1101 transfers image data [to be printed] to the printer 1102, the recording/reproduction device 1101 sends image data of an amount corresponding to the capacity of the memory of the printer 1102, and when print processing based on the transferred image data has been completed, the recording/reproduction device 1101 transfers image data for the next print processing. As means for performing this transfer, the embodiments provides a system to reliably transfer data corresponding to the spatial addresses of the image data necessary for the next print processing by the printer 1102 to the recording/reproduction device 1101. Thus, in the system, data transfer is always efficiently performed in accordance with the assumable capacity of the memory of the printer and the printing method of the printer.

Further, as the resolution and the data format of image data are selected in accordance with the data processing capability of the printer 1102, the size of a data packet for image data transfer can be limited. This improves the data transfer efficiency of the 1394 serial bus connecting a plurality of devices.

The present invention can be applied to a system constituted by a plurality of devices (e.g., host computer, interface, reader, printer) or to an apparatus comprising a single device (e.g., copy machine, facsimile).

Further, the object of the present invention can be also achieved by providing a storage medium storing program codes for performing the aforesaid processes to a system or an apparatus, reading the program codes with a computer (e.g., CPU, MPU) of the system or apparatus from the storage medium, then executing the program.

In this case, the program codes read from the storage medium realize the functions according to the embodiments, and the storage medium storing the program codes constitutes the invention.

Further, the storage medium, such as a floppy disk, a hard disk, an optical disk, a magneto-optical disk, CD-ROM, CD-R, a magnetic tape, a non-volatile type memory card, and ROM can be used for providing the program codes.

Furthermore, besides aforesaid functions according to the above embodiments are realized by executing the program codes which are read by a computer, the present invention includes a case where an OS (operating system) or the like working on the computer performs a part or entire processes in accordance with designations of the program codes and realizes functions according to the above embodiments.

Furthermore, the present invention also includes a case where, after the program codes read from the storage medium are written in a function expansion card which is inserted into the computer or in a memory provided in a function expansion unit which is connected to the computer, CPU or the like contained in the function expansion card or unit performs a part or entire process in accordance with designations of the program codes and realizes functions of the above embodiments.

The present invention is not limited to the above embodiments and various changes and modifications can be made within the spirit and scope of the present invention. Therefore, to appraise the public of the scope of the present invention, the following claims are made.

What is claimed is:

1. A data transmission method for devices connected by a serial bus, said method comprising the steps of:
    locking communication of a receiving device that receives a data transfer from a transmitting device using a locking transaction of an IEEE 1394 transaction layer, prior to the data transfer;
    reading processing capability information indicative of a data processing capability of the receiving device, said reading being performed by the transmitting device using a read transaction of the IEEE 1394 transaction layer, prior to the data transfer;
    determining a data block size used in data communication by the transmitting device, in accordance with the read processing capability information; and
    transmitting the data in the determined data block size from the transmitting device to the receiving device, said transmitting being performed by the transmitting device using a write transaction of the IEEE 1394 transaction layer,
    wherein the processing capability information indicates a capability of the data communication in which data block transfer is performed and is notified via the IEEE 1394 transaction layer.

2. The method according to claim 1, wherein the processing capability information indicates a capacity of a memory for storing received data.

3. The method according to claim 2,
    wherein the processing capability information indicates address information indicative of spatial addresses of data to be stored in the memory, as a data request, and
    wherein the transmitting device determines the data block size based on the read processing capability information and the address information.

4. The method according to claim 1, wherein the processing capability information is printing capability information indicative of a printing capability of a printer engine.

5. The method according to claim 4, wherein the printing capability information includes information on a resolution and/or a printing speed of the printer engine.

6. The method according to claim 1, wherein the processing capability information includes information on a memory size of a buffer for storing received data and/or information on a number of available buffers.

7. The method according to claim 1,
    wherein the serial bus is a bus adapted to or based on IEEE 1394 standards, where an isochronous transfer and an asynchronous transfer can be performed, and
    wherein the data transfer is performed via an isochronous transfer or via an asynchronous transfer.

8. The method according to claim 7, wherein the processing capability information is read via the asynchronous transfer.

9. The method according to claim 7, wherein a response in the asynchronous transfer includes data format information supported by the receiving device.

10. The method according to claim 9, wherein the transmitting device transmits data formatted in accordance with the data format information.

11. An image processing system in which devices are connected by a serial bus, comprising:
    a locking unit adapted to lock communication of a receiving device of an image data transfer by using a lock transaction of an IEEE 1394 transaction layer, prior to the image data transfer;
    a reader adapted to read processing capability information, indicative of an image-data processing capability of the receiving device by using a read transaction of the IEEE 1394 transaction layer, prior to the image data transfer;
    a determination unit adapted to determine a data block size used in the data communication in accordance with the processing capability information read by said reader; and
    a transfer unit adapted to transfer the image data in the data block size determined by said determination unit from a transmitting device to the receiving device by using a write transaction of the IEEE 1394 transaction layer,
    wherein the processing capability information indicates a capability of the data communication in which data block transfer is performed and is communicated via the IEEE 1394 transaction layer.

12. The system according claim 11, wherein the processing capability information indicates a capacity of a memory for storing received image data, the memory being included in the receiving device.

13. The system according to claim 12,
    wherein the processing capability information indicates address information indicative of spatial addresses of image data to be stored in the memory, as a data request, and
    wherein said determination unit determines the data block size based on the read processing capability information and the address information.

14. The system according to claim 11,
    wherein the receiving device is a printer, and
    wherein the processing capability information is printing capability information indicative of a printing capability of a printer engine of the printer.

15. The system according to claim 14, wherein said determination unit determines the data block size based on the printing capability information.

16. The system according to claim 14, wherein the printing capability information includes information on a resolution and/or a printing speed of the printer engine.

17. The system according to claim 11, wherein the processing capability information includes information on a memory size of a buffer for storing received data and/or information on a number of available buffers.

18. The system according to claim 11,
    wherein the serial bus is a bus adapted to or based on IEEE 1394 standards, where an isochronous transfer and an asynchronous transfer can be performed, and
    wherein the data transfer is performed via an isochronous transfer or via an asynchronous transfer.

19. The system according to claim 18, wherein the processing capability information is read via the asynchronous transfer.

20. The system according to claim 18, wherein a response in the asynchronous transfer includes data format information supported by the receiving device.

21. The system according to claim 20, wherein the transmitting device transmits data formatted in accordance with the data format information.

22. An image processing apparatus for processing image data received from a host device through a serial bus, comprising:
- a locking unit adapted to lock communication of the apparatus in accordance with a lock transaction on an IEEE 1394 transaction layer performed by the host device, prior to an image data transfer;
- a first memory adapted to store processing capability information, indicative of an image-data processing capability wherein the host device reads the processing capability information using a read transaction of the IEEE 1394 transaction layer, prior to the image data transfer; and
- a second memory adapted to write image data, in a data block size based on the processing capability information, wherein the host device writes the image data to said second memory using a write transaction of the IEEE 1394 transaction layer,
- wherein the processing capability information indicates a capability of data communication in which data block transfer is performed and is notified via the IEEE 1394 transaction layer.

23. The apparatus according to claim 22, wherein the processing capability information indicates a capacity of said second memory.

24. The apparatus according to claim 23, wherein said first memory stores address information indicative of spatial addresses of image data to be stored in said second memory.

25. The apparatus according to claim 22, wherein said image processing apparatus is a printer, and wherein the processing capability information is printing capability information indicative of a printing capability of a printer engine of the printer.

26. The apparatus according to claim 25, wherein the printing capability information includes information on a resolution and/or a printing speed of the printer engine.

27. The apparatus according to claim 22, wherein the processing capability information includes information on a memory size of a buffer for storing received data and/or information on a number of available buffers.

28. The apparatus according to claim 22,
- wherein the serial bus is a bus adapted to or based on IEEE 1394 standards, where an isochronous transfer and an asynchronous transfer can be performed, and
- wherein the image data transfer is performed via an isochronous transfer or via an asynchronous transfer.

29. The apparatus according to claim 28, wherein the processing capability information is read via the asynchronous transfer.

30. The apparatus according to claim 28, wherein a response in the asynchronous transfer includes data format information supported by said image processing apparatus.

31. The apparatus according to claim 30, wherein the host device transmits data formatted in accordance with the data format information.

32. The apparatus according to claim 22, wherein the host device includes an image recording/reproduction device, such as a digital camera, and a personal computer capable of modifying an image.

33. An image processing apparatus for processing image data sent to a target device through a serial bus, comprising:
- a locking unit adapted to lock communication of the target device by using a lock transaction of an IEEE 1394 transaction layer, prior to an image data transfer;
- a reader adapted to read processing capability information, indicative of an image-data processing capability of the target device, by using a read transaction of the IEEE 1394 transaction layer, prior to the image data transfer;
- a determination unit adapted to determine a data block size in data communication in accordance with the processing capability information read by said reader; and
- a transmitter adapted to sequentially transmit the image data in the data block size determined by said determination unit to the target device, by using a write transaction of the IEEE 1394 transaction layer,
- wherein the processing capability information indicates a capability of the data communication in which data block transfer is performed and is communicated via the IEEE 1394 transaction layer.

34. The apparatus according to claim 33, wherein the processing capability information indicates a capacity of a memory for storing received data, the memory being included in the target device.

35. The apparatus according to claim 34, wherein said determination unit determines the data block size based on address information indicative of spatial addresses of the image data to be stored in the memory.

36. The apparatus according to claim 33,
- wherein the receiving device is a printer, and
- wherein the processing capability information is printing capability information indicative of a printing capability of a printer engine of the printer.

37. The apparatus according to claim 36, wherein said determination unit determines the data block size based on the printing capability information.

38. The apparatus according to claim 36, wherein the printing capability information includes information on a resolution and/or a printing speed of the printer engine.

39. The apparatus according to claim 33, wherein the processing capability information includes information on a memory size of a buffer for storing received data and/or information on a number of available buffers.

40. The apparatus according to claim 33,
- wherein the serial bus is a bus adapted to or based on IEEE 1394 standards, where an isochronous transfer and an asynchronous transfer can be performed, and
- wherein the image data transfer is performed via an isochronous transfer or via an asynchronous transfer.

41. The apparatus according to claim 40, wherein the processing capability information is read via the asynchronous transfer.

42. The apparatus according to claim 40, wherein a response in the asynchronous transfer includes data format information supported by said image processing apparatus.

43. The apparatus according to claim 42, wherein said transmitter transmits data formatted in accordance with the data format information.

44. The apparatus according to claim 33, wherein said image processing apparatus includes an image recording/reproduction device, such as a digital camera, and a personal computer capable of modifying an image.

45. A data transmission method for host and target devices connected by a serial bus, said method comprising the steps of:
- locking communication of the target device by using a lock transaction of an IEEE 1394 transaction layer, prior to a data transfer;
- reading data amount information indicative of an amount of data in data communication between the host device and the target device by using a read transaction of the IEEE 1394 transaction layer;

transferring the data in accordance with the data amount information by using a write transaction of the IEEE 1394 transaction layer; and if a next data transfer is to be performed, performing the next data transfer without reading of the data amount information.

46. The method according to claim 45, wherein the data amount information includes information on a size of a buffer for receiving data, the buffer being included in the target device, or information on a number of available buffers.

47. The method according to claim 45, wherein the target device continuously ensures a buffer for receiving data based on the data amount information.

48. The method according to claim 45, wherein the serial bus is a bus adapted to or based on IEEE 1394 standards.

49. The method according to claim 45, wherein the host device outputs image data.

50. The method according to claim 45, wherein the target device forms a visible image on a recording medium based on image data.

51. An image processing apparatus for processing image data received from a host device through a serial bus, comprising:

a locking unit adapted to lock communication of the apparatus in accordance with a lock transaction on an IEEE 1394 transaction layer performed by the host device, prior to an image data transfer;

a first memory adapted to store data amount information indicative of an amount of data in data communication wherein the host device reads the data amount information using a read transaction of the IEEE 1394 transaction layer; and a second memory adapted to write image data in accordance with the data amount information, wherein the host device writes the image data to said second memory using a write transaction of the IEEE 1394 transaction layer, wherein, if a next data transfer is to be performed, the next data transfer is performed without reading of the data amount information.

52. The apparatus according to claim 51, wherein the data amount information includes information on a size of said second memory or information on the number of available buffers of said second memory.

53. The apparatus according to claim 51, wherein said image processing apparatus continuously ensures a buffer for receiving data based on the data amount information.

54. The apparatus according to claim 51, wherein the host device outputs image data.

55. The apparatus according to claim 51, further comprising a formation unit adapted to form a visible image on a recording medium based on the image data.

56. An image processing apparatus for processing image data sent to a target device through a serial bus, comprising:

a locking unit adapted to lock communication of the target device by using a lock transaction of an IEEE 1394 transaction layer, prior to an image data transfer;

a reader adapted to read data amount information indicative of an amount of data in data communication received by the target device by using a read transaction of the IEEE 1394 transaction layer; and a transmitter adapted to transmit image data to the target device in accordance with the data amount information read by said reader, by using a write transaction of the IEEE 1394 transaction layer, wherein, if a next data transfer is to be performed, the next data transfer is performed without reading of the data amount information.

57. The apparatus according to claim 56, wherein the data amount information includes information on a memory size of a buffer for storing received data or information on a number of available buffers.

58. The apparatus according to claim 56, wherein the target device continuously ensures a buffer for receiving data based on the data amount information.

59. The apparatus according to claim 56, wherein said image processing apparatus outputs image data.

60. The apparatus according to claim 56, wherein the target device forms a visible image on a recording medium based on the image data.

61. A computer program product storing a computer readable medium comprising computer program codes, for executing a data transmission method between devices connected by a serial bus, said method comprising the steps of:

locking communication of a receiving device that receives a data transfer from a transmitting device using a lock transaction of an IEEE 1394 transaction layer, prior to the data transfer;

reading processing capability information indicative of a data processing capability of the receiving device, said reading being performed by the transmitting device using a read transaction of the IEEE 1394 transaction layer, prior to the data transfer;

determining a data block size used in data communication by the transmitting device, in accordance with the read processing capability information; and transmitting the data in the determined data block size from the transmitting device to the receiving device by using a write transaction of the IEEE 1394 transaction layer, wherein the processing capability information indicates a capability of the data communication in which data block transfer is performed and is notified via the IEEE 1394 transaction layer.

62. A computer program product storing a computer readable medium comprising computer program codes, for executing a data transmission method between devices connected by a serial bus, said method comprising the steps of:

locking communication of a receiving device of an image data transfer by using a lock transaction of an IEEE 1394 transaction layer, prior to the image data transfer;

reading processing capability information, indicative of an image-data processing capability of the receiving device by using a read transaction of the IEEE 1394 transaction layer, prior to the image data transfer;

determining a data block size used in the data communication in accordance with the processing capability information read in the reading step; and sequentially transferring the image data in the data block size determined in the determining step from the transmitting device to the receiving device by using a write transaction of the IEEE 1394 transaction layer, wherein the processing capability information indicates a capability of the data communication in which data block transfer is performed and is communicated via an IEEE 1394 transaction layer.

63. A computer program product storing a computer readable medium comprising computer program codes, for executing a data transmission method between host and target devices connected by a serial bus, said method comprising the steps of:

locking communication of the target device by using a lock transaction of an IEEE 1394 transaction layer, prior to a data transfer;

reading data amount information indicative of an amount of data in data communication between the host device and the target device by using a read transaction of the IEEE 1394 transaction layer;

transferring the data in accordance with the data amount information by using a write transaction of the IEEE 1394 transaction layer; and if a next data transfer is to be performed, performing the next data transfer without reading of the data amount information.

64. A data transmission method for devices connected by a serial bus, said method comprising the steps of:

locking communication of a receiving device that receives a data transfer from a transmitting device using a locking transaction, prior to the data transfer;

reading processing capability information indicative of a data processing capability of the receiving device by the transmitting device, prior to the data transfer;

determining a data block size used in data communication by the transmitting device, in accordance with the read processing capability information; and transmitting the data in the determined data block size from the transmitting device to the receiving device, said transmitting being performed by the transmitting device, wherein the processing capability information indicates a capability of the data communication in which data block transfer is performed and is notified via an IEEE 1394 transaction layer.

65. A data transmission method for host and target devices connected by a serial bus, said method comprising the steps of:

locking communication of the target device by using a lock transaction, prior to a data transfer;

reading data amount information indicative of an amount of data in data communication between the host device and the target device;

transfering the data in accordance with the data amount information; and if a next data transfer is to be performed, performing the next data transfer without reading of the data amount information.

66. A computer product embodying executable instructions to cause a computer to perform data transmission method for devices connected by a serial bus, said method comprising the steps of:

locking communication of a receiving device that receives a data transfer from a transmitting device using a locking transaction, prior to the data transfer;

reading processing capability information indicative of a data processing capability of the receiving device by the transmitting device, prior to the data transfer;

determining a data block size used in data communication by the transmitting device, in accordance with the read processing capability information; and transmitting the data in the determined data block size from the transmitting device to the receiving device, said transmitting being performed by the transmitting device, wherein the processing capability information indicates a capability of the data communication in which data block transfer is performed and is notified via an IEEE 1394 transaction layer.

67. A computer product embodying executable instructions to cause a computer to perform data transmission method for host and target devices connected by a serial bus, said method comprising the steps of:

locking communication of the target device by using a lock transaction, prior to a data transfer;

reading data amount information indicative of an amount of data in data communication between the host device and the target device;

transferring the data in accordance with the data amount information; and if a next data transfer is to be performed, performing the next data transfer without reading of the data amount information.

* * * * *

UNITED STATES PATENT AND TRADEMARK OFFICE
CERTIFICATE OF CORRECTION

PATENT NO.       : 7,062,579 B2
APPLICATION NO.  : 09/025129
DATED            : June 13, 2006
INVENTOR(S)      : Jiro Tateyama et al.

It is certified that error appears in the above-identified patent and that said Letters Patent is hereby corrected as shown below:

ON COVER PAGE [56] REFERENCES CITED:

U.S. Patent Documents (page 2), "5,638,333  A    6/1997 Davidson, Jr. et al. ..... 395/114" should read --5,636,333   A    6/1997 Davidson, Jr. et al. ..... 395/114--

ON COVER PAGE [56] REFERENCES CITED:

Foreign Patent Documents, "EP  0  051  585  B1  11/1987" should read --EP  0  061  585 B1  11/1987--.

ON COVER PAGE [56] REFERENCES CITED:

Foreign Patent Documents (page 2), "EP  0  596  648  A1  3/1994" should read --EP  0  596  648  A1  5/1994--.

ON COVER PAGE [56] REFERENCES CITED:

Foreign Patent Documents (page 2), "EP  0  260  085  B1  6/1994" should read --EP  0  260  086  B1  6/1994--.

ON COVER PAGE [56] REFERENCES CITED:

Foreign Patent Documents (page 2), "EP  0  889  298  A2  12/1995" should be deleted.

ON COVER PAGE [56] REFERENCES CITED:

Foreign Patent Documents (page 2), "EP  0  889  298  A3  12/1995" should read --EP  0  689  296  A3  12/1995--.

ON COVER PAGE [56] REFERENCES CITED:

Foreign Patent Documents (page 2), "EP  0  800  299  B1  8/2003" should read --EP  0  800  299  B1  6/2003--.

ON COVER PAGE [56] REFERENCES CITED:

Foreign Patent Documents (page 2), "WO    WO96/1377    5/1996" should be deleted.

UNITED STATES PATENT AND TRADEMARK OFFICE
CERTIFICATE OF CORRECTION

PATENT NO.          : 7,062,579 B2
APPLICATION NO.     : 09/025129
DATED               : June 13, 2006
INVENTOR(S)         : Jiro Tateyama et al.

It is certified that error appears in the above-identified patent and that said Letters Patent is hereby corrected as shown below:

ON COVER PAGE [56] REFERENCES CITED:

Other Publications (after Compcon '95:), "Ubiquitos" should read --Ubiquitous--.

ON COVER PAGE [56] REFERENCES CITED:

Other Publications (after Teener, M.,:), "Alternative," should read -- Alternative,--.

ON COVER PAGE [56] REFERENCES CITED:

Other Publications (after Nass, R., page 2), "PCS" should read --PCs--; and "Device," should read --Devices,"; and "vol.44," should read --vol. 44,--.

ON COVER PAGE [56] REFERENCES CITED:

Other Publications, "R. Nass, "Firewire Interface Connects PCs To Consumer Electronics Devices", Electronic D Sign. vol. 44, No. 16, Aug. 5, 1996, pp. 57-60" should be deleted.

COLUMN 2:

Line 26, "for" should be deleted;
Line 33, "of" should read --the--; and
Line 62, "of" should read --the--.

COLUMN 6:

Line 20, "formats" should read --format--.

COLUMN 8:

Line 2, "device C" should read --devices C--;
Line 26, "recognizes" should read --recognizing--; and
Line 59, "manages, """ should read --managing--.

COLUMN 9:

Line 9, "ID. 48-Bit" should read --ID. ¶ 48-Bit--.

UNITED STATES PATENT AND TRADEMARK OFFICE
CERTIFICATE OF CORRECTION

| | |
|---|---|
| PATENT NO. | : 7,062,579 B2 |
| APPLICATION NO. | : 09/025129 |
| DATED | : June 13, 2006 |
| INVENTOR(S) | : Jiro Tateyama et al. |

It is certified that error appears in the above-identified patent and that said Letters Patent is hereby corrected as shown below:

COLUMN 11:

Line 48, "notifies" should read --notifying--.

COLUMN 12:

Line 4, "notifies" should read --notifying--;
    Line 47, "leave" should read --leaf--; and
    Line 48, "leave" should read --leaf--.

COLUMN 13:

Line 7, "is" should read --does--; and
    Line 34, ""0xFFFFF0000000." should read -- "0xFFFFF0000000".--.

COLUMN 14:

Line 4, "the link layer 812," (second occurrence) should be deleted.

COLUMN 15:

Line 58, "nodes" should read --nodes which--.

COLUMN 21:

Line 63, "S" should be deleted.

COLUMN 24:

Line 30, "group" should read --groups--; and
    Line 41, "31th" should read --31st--.

COLUMN 27:

Line 4, "sets" should read --setting--;
    Line 14, "The" should read --the--; and
    Line 36, "type" should read --types--.

COLUMN 28:

Line 26, "transfers" should read --transferring--.

UNITED STATES PATENT AND TRADEMARK OFFICE
CERTIFICATE OF CORRECTION

| | |
|---|---|
| PATENT NO. | : 7,062,579 B2 |
| APPLICATION NO. | : 09/025129 |
| DATED | : June 13, 2006 |
| INVENTOR(S) | : Jiro Tateyama et al. |

It is certified that error appears in the above-identified patent and that said Letters Patent is hereby corrected as shown below:

COLUMN 29:

Line 2, "has" should read --have--;
    Line 30, "of the printer" (second occurrence) should be deleted; and
    Line 42, "has" should read --have--.

COLUMN 32:

Line 41, "Indicates" should read --indicates--.

COLUMN 34:

Line 6, "methods" should read --method--;
    Line 15, "provide" should read --provides--;
    Line 36, "re-transfer" should read --re-transfer of--;
    Line 37, "transfer" should read --transfer of--; and
    Line 63, "has" should read --has been--.

COLUMN 35:

Line 6, "limitted" should read --limited--; and
    Line 14, "constructing" should read --constructed--.

COLUMN 40:

Line 26, "format" should read --formats--.

COLUMN 41:

Line 48, "receive" should read --receives--; and "perform" should read
        --performs--..

COLUMN 44:

Line 25, "according" should read --according to--.

COLUMN 45:

Line 5, "on" should read --of--.

UNITED STATES PATENT AND TRADEMARK OFFICE
CERTIFICATE OF CORRECTION

PATENT NO. : 7,062,579 B2
APPLICATION NO. : 09/025129
DATED : June 13, 2006
INVENTOR(S) : Jiro Tateyama et al.

It is certified that error appears in the above-identified patent and that said Letters Patent is hereby corrected as shown below:

COLUMN 47:

Line 26, "on" should read --of--.

COLUMN 49:

Line 43, "transfering" should read --transferring--.

COLUMN 50:

Line 5, "data" should read --a data--; and
    Line 28, "data" should read --a data--.

SHEET 27:

Figure F27B, "BROADCASING" should read --BROADCASTING--.

SHEET 38:

Figure F39, "FORAMT [1]" should read --FORMAT [1]--; and
    Figure F40, "FORAMT [2]" should read --FORMAT [2]--.

SHEET 61:

Figure F69, "CONTROLELR" should read --CONTROLLER--.

Signed and Sealed this

Twenty-fourth Day of April, 2007

JON W. DUDAS
*Director of the United States Patent and Trademark Office*